COMPUTER SYSTEM WITH HIGH CAPACITY RANDOM ACCESS MEMORY

Filed Jan. 3, 1955

31 Sheets-Sheet 1

May 7, 1963 G. E. HAGEN ETAL 3,089,124

COMPUTER SYSTEM WITH HIGH CAPACITY RANDOM ACCESS MEMORY

Filed Jan. 3, 1955 31 Sheets-Sheet 2

INVENTORS
GLENN E. HAGEN
CHARLES R. WILLIAMS
ARTHUR Y. BAKER
ROBERT L. JACKSON
BY Zalunder Mattingly & Huntley
ATTORNEYS INVENTORS
GLENN E. HAGEN
CHARLES R. WILLIAMS
ARTHUR Y. BAKER
ROBERT E. JACKSON
BY Zulwider Mattingly & Huntley
ATTORNEYS May 7, 1963 G. E. HAGEN ETAL 3,089,124

COMPUTER SYSTEM WITH HIGH CAPACITY RANDOM ACCESS MEMORY

Filed Jan. 3, 1955 31 Sheets-Sheet 4

INVENTORS
GLENN E. HAGEN
CHARLES R. WILLIAMS
ARTHUR Y. BAKER
ROBERT E. JACKSON
By Gulwider Mattingly & Huntley
ATTORNEYS

COMPUTER SYSTEM WITH HIGH CAPACITY RANDOM ACCESS MEMORY

Filed Jan. 3, 1955

INVENTORS
GLENN E. HAGEN
CHARLES R. WILLIAMS
ARTHUR Y. BAKER
ROBERT E. JACKSON
By Zulwider Mattingly & Huntley
ATTORNEYS

COMPUTER SYSTEM WITH HIGH CAPACITY RANDOM ACCESS MEMORY

Filed Jan. 3, 1955

31 Sheets-Sheet 6

INVENTORS
GLENN E. HAGEN
CHARLES R. WILLIAMS
ARTHUR Y. BAKER
ROBERT E. JACKSON
BY Gulwider Mattingly & Huntley
ATTORNEYS

COMPUTER SYSTEM WITH HIGH CAPACITY RANDOM ACCESS MEMORY

Filed Jan. 3, 1955

INVENTORS
GLENN E. HAGEN
CHARLES R. WILLIAMS
ARTHUR Y. BAKER
ROBERT E. JACKSON
By Zulwider Mattingly & Huntley
ATTORNEYS

COMPUTER SYSTEM WITH HIGH CAPACITY RANDOM ACCESS MEMORY

Filed Jan. 3, 1955 31 Sheets-Sheet 8

INVENTORS
GLENN E. HAGEN
CHARLES R. WILLIAMS
ARTHUR Y. BAKER
ROBERT E. JACKSON
BY [signature]
ATTORNEYS INVENTORS
GLENN E. HAGEN
CHARLES R. WILLIAMS
ARTHUR Y. BAKER
ROBERT E. JACKSON
BY Fulwider Mattingly & Huntley
ATTORNEYS INVENTORS
GLENN E. HAGEN
CHARLES R. WILLIAMS
ARTHUR Y. BAKER
ROBERT E. JACKSON
By Gulwider Mattingly & Huntley
ATTORNEYS INVENTORS
GLENN E. HAGEN
CHARLES R. WILLIAMS
ARTHUR V. BAKER
ROBERT E. JACKSON
BY Gulwider Mattingly & Huntley
ATTORNEYS May 7, 1963 G. E. HAGEN ETAL 3,089,124

COMPUTER SYSTEM WITH HIGH CAPACITY RANDOM ACCESS MEMORY

Filed Jan. 3, 1955 31 Sheets-Sheet 12

INVENTORS
GLENN E. HAGEN
CHARLES R. WILLIAMS
ARTHUR Y. BAKER
ROBERT E. JACKSON

BY Zulwider Mattingly & Huntley
ATTORNEYS

May 7, 1963 G. E. HAGEN ETAL 3,089,124

COMPUTER SYSTEM WITH HIGH CAPACITY RANDOM ACCESS MEMORY

Filed Jan. 3, 1955

31 Sheets-Sheet 13

INVENTORS
GLENN E. HAGEN
CHARLES R. WILLIAMS
ARTHUR Y. BAKER
ROBERT E. JACKSON
BY
By Zulwider Mattingly & Huntley
ATTORNEYS INVENTORS
GLENN E. HAGEN
CHARLES R. WILLIAMS
ARTHUR Y. BAKER
ROBERT E. JACKSON
By Bulwider Mattingly & Huntley
ATTORNEYS INVENTORS
GLENN E. HAGEN
CHARLES R. WILLIAMS
ARTHUR Y. BAKER
ROBERT E. JACKSON
BY
By Gulwider Mattingly & Huntley
ATTORNEYS INVENTORS
GLENN E. HAGEN
CHARLES R. WILLIAMS
ARTHUR Y. BAKER
ROBERT E. JACKSON
BY Bulwinkle, Mattingly & Huntley
ATTORNEYS

COMPUTER SYSTEM WITH HIGH CAPACITY RANDOM ACCESS MEMORY

Filed Jan. 3, 1955

INVENTORS
GLENN E. HAGEN
CHARLES R. WILLIAMS
ARTHUR Y. BAKER
ROBERT E. JACKSON
BY [signature]
ATTORNEYS INVENTORS
GLENN E. HAGEN
CHARLES R. WILLIAMS
BY ARTHUR Y. BAKER
ROBERT E. JACKSON
By Zuluider Mattingly & Huntley
ATTORNEYS INVENTORS
GLENN E. HAGEN
CHARLES R. WILLIAMS
ARTHUR Y. BAKER
ROBERT E. JACKSON
By Schneider, Mattingly & Huntley
ATTORNEYS May 7, 1963 G. E. HAGEN ETAL 3,089,124

COMPUTER SYSTEM WITH HIGH CAPACITY RANDOM ACCESS MEMORY

Filed Jan. 3, 1955

31 Sheets-Sheet 20

INVENTORS
GLENN E. HAGEN
CHARLES R. WILLIAMS
ARTHUR Y. BAKER
ROBERT E. JACKSON
BY Zulinder Mattingly & Huntley
ATTORNEYS

COMPUTER SYSTEM WITH HIGH CAPACITY RANDOM ACCESS MEMORY

Filed Jan. 3, 1955

INVENTORS
GLENN E. HAGEN
CHARLES R. WILLIAMS
ARTHUR Y. BAKER
ROBERT E. JACKSON

By Gulwider Mattingly & Huntley
ATTORNEYS

INVENTORS
GLENN E. HAGEN
CHARLES R. WILLIAMS
ARTHUR Y. BAKER
ROBERT E. JACKSON
By Zulwider Mattingly & Huntley
ATTORNEYS INVENTORS
GLENN E. HAGEN
CHARLES R. WILLIAMS
ARTHUR Y. BAKER
ROBERT E. JACKSON
By Gulwider Mattingly & Huntley
ATTORNEYS INVENTORS
GLENN E. HAGEN
CHARLES R. WILLIAMS
ARTHUR Y. BAKER
ROBERT E. JACKSON
By Gulwider Mattingly & Huntley
ATTORNEYS INVENTORS
GLENN E. HAGEN
CHARLES R. WILLIAMS
ARTHUR Y. BAKER
ROBERT E. JACKSON
BY Sulunder Mattingly & Huntley
ATTORNEYS May 7, 1963 G. E. HAGEN ETAL 3,089,124

COMPUTER SYSTEM WITH HIGH CAPACITY RANDOM ACCESS MEMORY

Filed Jan. 3, 1955 31 Sheets-Sheet 26

INVENTORS
GLENN E. HAGEN
CHARLES R. WILLIAMS
ARTHUR Y. BAKER
ROBERT E. JACKSON
By Gulwider Mattingly & Huntley
ATTORNEYS INVENTORS
GLENN E. HAGEN
CHARLES R. WILLIAMS
ARTHUR Y. BAKER
ROBERT E. JACKSON
BY
By Gulwider Mattingly & Huntley
ATTORNEYS May 7, 1963 G. E. HAGEN ETAL 3,089,124

COMPUTER SYSTEM WITH HIGH CAPACITY RANDOM ACCESS MEMORY

Filed Jan. 3, 1955 31 Sheets-Sheet 28

INVENTORS
GLENN E. HAGEN
CHARLES R. WILLIAMS
ARTHUR Y. BAKER
ROBERT E. JACKSON
By Gulwider Mattingly & Huntley
ATTORNEYS

COMPUTER SYSTEM WITH HIGH CAPACITY RANDOM ACCESS MEMORY

Filed Jan. 3, 1955 31 Sheets-Sheet 29

INVENTORS
GLENN E. HAGEN
CHARLES R. WILLIAMS
ARTHUR Y. BAKER
ROBERT E. JACKSON
By [signature]
ATTORNEYS INVENTORS
GLENN E. HAGEN
CHARLES R. WILLIAMS
ARTHUR Y. BAKER
ROBERT E. JACKSON
By Bulwider Mattingly & Huntley
ATTORNEYS INVENTORS
GLENN E. HAGEN
CHARLES R. WILLIAMS
ARTHUR Y. BAKER
ROBERT E. JACKSON
By Fulwider Mattingly & Huntley
ATTORNEYS

United States Patent Office 3,089,124
Patented May 7, 1963

3,089,124

COMPUTER SYSTEM WITH HIGH CAPACITY RANDOM ACCESS MEMORY

Glenn E. Hagen, Manhattan Beach, Charles R. Williams, Palos Verdes, Arthur Y. Baker, Hermosa Beach, and Robert E. Jackson, Redondo Beach, Calif., assignors, by mesne assignments, to Alwac International Incorporated, a corporation of Panama Filed Jan. 3, 1955, Ser. No. 479,328
14 Claims. (Cl. 340—172.5)

This invention relates generally to the computing machine art, and has particular reference to a machine providing a central high capacity memory for concurrent use by a plurality of computing devices, wherein each such computing device has rapid random access to all of the data stored in the memory. The invention finds particular utility when used under circumstances requiring a high memory capacity in connection with computational requirements of a relatively simple sort, such circumstances being encountered often in the keeping and processing of business records.

As the modernization and mechanization of offices has progressed, the number of manual operations has correspondingly increased. Many bookkeeping operations are now performed by machines, and many other operations are similarly mechanized, increasing both the speed and accuracy with which the records are kept. Inventory control, by way of example, is one of the fields in which up-to-the-minute accurate records are necessary for the proper operation of a business. However, if the establishment has several branches, or is spread over a fairly large area, it is difficult to keep track of the stock and keep this information strictly current and instantly available. It will be appreciated, of course, that orders for various items of merchandise are received in random sequence, and must be processed as they are received if the information is to be kept current.

Consequently, random access to the inventory records is essential, and if automatic machinery and equipment are to provide any substantial advantages, the access time to any unit of data must be quite short.

In inventory control operations, as in many other operations involving the keeping and processing of business records, the extremely large number of individual units of data which must be stored is greatly in excess of the number of units involved in actual computation. Thus, at any given time, only a small fraction of the required memory capacity will be used for computational purposes. Therefore, the large capacity memory device of this invention, providing random access with a relatively short access time, is most effectively utilized when such a device is used as a central data repository to which a plurality of computing devices have access. Thus, a high capacity memory device of the character provided by this invention may serve a plurality of independent computing devices, each adapted to operate upon, or in accordance with, a large number of individual units of data stored in the memory device.

For example, in the keeping of inventory records, the entire current inventory data of a large commercial establishment may be stored in one such central data storage system. Separate computing devices may be provided for the various departments such as retail sales, mail order sales, and the like, each such computing device having rapid access to any unit of such inventory data and being capable of such computation operations as may be required to so amend or alter the stored data as to reflect accurately the effect of individual transactions.

As will be appreciated, one of the prime requisites of such a storage system is an adequately large storage capacity coupled with an appropriately fast random access to the stored data. Computing machines of the general type making use of electrical and electronic computing elements normally have a high operational speed, and some a short random access time to the stored information or memory. Usually, however, if the memory is large, the access time is greatly increased, i.e., a longer time is required to find a given bit of information. By way of example, a great amount of information may be stored on a series of punched cards, but the greater the number of cards, the longer it requires to select any particular card. On the other hand, the access time to a bit of information stored upon a small, high speed magnetic drum is very short, but only a small amount of information can be stored on such a memory or data storage device.

Another requirement of a machine suitable for use in business and industry is that the original information be permanently stored independently of any power supply or other facility, and that provision be made for preserving intact the original information despite malfunctioning of the machine, so that in the event of an error or other difficulty, the original data will be preserved and made available and the records will in no event be lost or destroyed.

Machines having these general attributes may be constructed to perform a variety of functions, but one of the most easily understood forms of machine is a so-called inventory machine for providing current information concerning the stock on hand of each of a large number of different articles or commodities. As hereinafter more fully pointed out, the quantity in stock of a large number of different items is recorded upon a single drum, and as the items are received and sold, the total is revised to provide strictly current data. By having a group of appropriate computers controlling the processing of the data stored in such a single repository, the capabilities of the machine are further developed. The particular construction herein described permits the storage of a very large quantity of data to which access may be had in a very short time.

It is therefore a major object of this invention to provide an improved high speed computing machine.

It is another object of the invention to provide a computing machine having a large memory storage capacity, with a high speed random access thereto.

Still another object of the invention is to provide, in such a machine, a plurality of computing devices, each capable of controlling the processing of the data stored in a single such high capacity memory.

It is an additional object of this invention to provide a machine of the character set forth in the preceding paragraph wherein means is provided for preventing interference by any of the plurality of computing devices with any operations performed by any of the others.

It is still another object of the invention to provide a computing device adapted to receive data from a plurality of sources, and to deliver requested information to the correct sources.

It is also an object of this invention to provide a computing machine of the aforesaid type which includes for each computing device means for transmitting data to the machine and for controlling the operation of the machine, and which includes means for reading out the data stored in the machine and the results of any computations stored.

These and other objects and advantages of this invention will become apparent from the following description of one form thereof, and from the drawings illustrating that form, in which.

Figure 1:
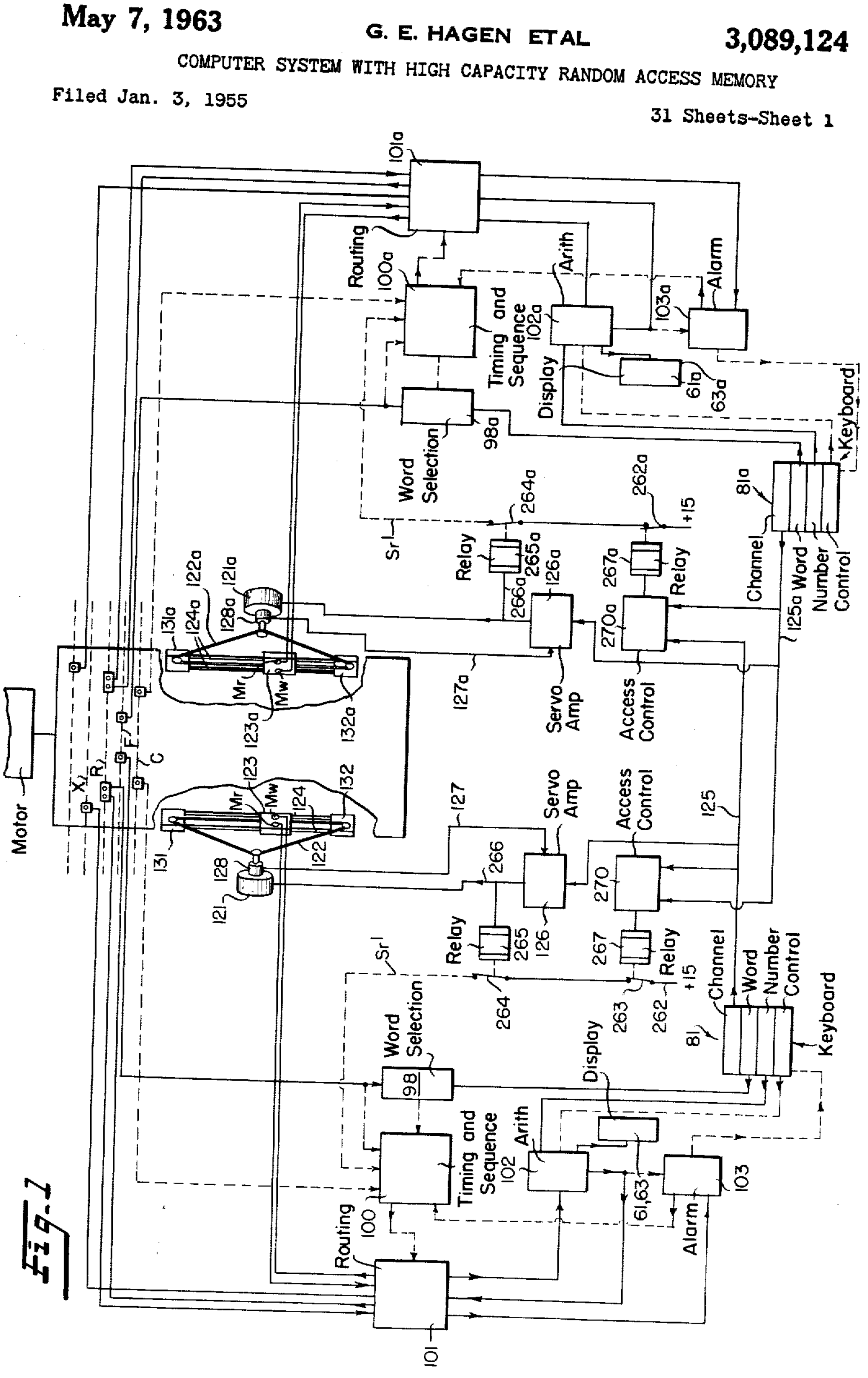
FIGURE 1 is a schematic diagram of the invention claimed in this application.

The ensuing description relates to a preferred embodiment of the invention, the various features of construction and the mode of operation thereof being set forth in various sections and sub-sections according to the following:

TABLE OF CONTENTS

| | Column |
|---|---|
| General Description | 6 |
| Summary of Operation | 8 |
| Central Data Storage System | 9 |
| High Capacity Random Access Memory | 9 |
| Input-Output, Logic, and Control Apparatus | 11 |
| Basic Elements | 13 |
| Operation | 15 |
| Sequence Zero | 15 |
| Channel Selection | 15 |
| Word Selection | 17 |
| Basic Timing | 22 |
| Sequence One | 26 |
| Sequence One-One | 31 |
| Sequence Two | 31 |
| Verification of Copy | 31 |
| Numerical Input | 34 |
| Sequence Three | 36 |
| Input Register Circulation | 36 |
| Computations | 38 |
| Excess-Three Code Correction | 41 |
| Example of Computation and Correction | 47 |
| Entry of Result in Memory | 48 |
| Sequence Four | 52 |
| Proof Computation | 53 |
| Input Register Stepping | 55 |
| Error Detection | 57 |
| Read Out Result | 60 |
| Alternative Computations | 62 |
| Complete Logic | 63 |

GENERAL DESCRIPTION

In its broader aspects the present computing machine includes a high capacity memory device, such as a large magnetic drum, with the provision of high speed means for securing random access to any portion of the memory and the information stored therein. Furthermore, the large storage capacity makes it practical for a number of different computing devices to be connected to the single memory means, so that the basic capacity of the machine may be more fully utilized.

The present machine, by way of example, is intended primarily to handle inventory problems such as might be encountered in a factory or store of moderate size. An actual machine embodying the invention provides a magnetic drum memory upon which may be permanently recorded more than four and one-half million discrete pulses or "bits" of information. These "bits" are divided among 256 separate and independent channels, each containing 17,920 bits, or 896 independent groups of 20 bits each, each such group being referred to as a "word," each of the 896 words within a channel being subdivided into five "syllables" of four "bits" each. Each syllable is used to represent a decimal digit so that each word may comprise a five-digit decimal number, giving the memory a capacity of approximately 230,000 such five-digit numbers. The drum is approximately four feet in diameter and eighteen inches long.

One of the major features of this invention resides in the provision of an apparatus by which the time required to locate any given word or bit of information is reduced to a very short interval. By way of example, any desired word can be located and read from the memory of the above-described machine in a period of less than one second after the machine is given the necessary instructions. This is a great deal less than the time, usually measured in minutes, that is required to search several thousand feet of magnetic tape. Similarly, the length of time necessary to select a particular punched card and to read the information from it likewise requires a much longer period of time. Once the desired word is located, all computing, data transfer, checking, and display functions are completed in one and one-quarter seconds.

In the operation of the machine, the desired channel is first selected, and in this connection, a magnetic head that may be moved across the surface of the drum is of great value. Preferably, the head is one that has a so-called air bearing, and is separated a very slight distance from the surface of the drum by a film or cushion of air so that there is no actual physical contact between the head and the drum. An example of a head of this type is shown in the patent application of Glenn E. Hagen, Serial No. 432,534, filed May 26, 1954, and entitled "Floating Magnetic Transducing Head." Clearly, other methods may be used to permit fast selection of a desired channel, but the use of the air floating head as disclosed in the aforesaid application produces very satisfactory results.

The information is stored upon the magnetic drum in the form of very small magnetized areas, and when such an area passes beneath a properly designed magnetic reading head, an electrical pulse is obtained. Such a system is very similar to that used in magnetic tape recorders, but essentially provides for only two conditions, an area magnetized with one polarity, and an area magnetized with the opposite polarity. Alternatively, the areas may be magnetized and non-magnetized, but in either event, since an output signal is produced by a change in the magnetization, only two conditions are possible. As a result, the usual decimal system of numbering cannot readily be used in a magnetic drum computer, and instead a binary system of notation is used.

A binary system of notation employs only two characters; conventionally, "0" and "1" having nominal values of zero and one, respectively. The system is a "radix two" system wherein the value of a "1" in a given column or position is twice the value thereof in the next lower place or denominational order, "0's" always having a value of zero.

In order to write all of the decimal digits from 0 through 9, inclusive, four binary denominational orders must be used. Four binary orders, each embracing two digits (0 or 1) give sixteen possible combinations, or the possibility of writing the decimal numbers 0 through 15. Additional numbers may be written, of course, by adding more binary orders, but the complications of a direct decimal-to-binary converter make such a solution impractical. Consequently, a system is used in which each decimal digit is represented by a code group of four binary orders.

While various coding systems may be used, the machine herein described is based upon a well known coding system oftentimes referred to as the "excess-three" code. In this system, each of the decimal digits 0–9 is represented by a four place binary number having a value which exceeds by three the value of the decimal digit represented. A comparison of the decimal, binary, and excess-three code representations for the quantities from zero through nine is given in Table I.

TABLE I

| Quantity | Decimal | Binary | Excess-three code |
|---|---|---|---|
| Zero | 0 | 0 | 0011 |
| One | 1 | 1 | 0100 |
| Two | 2 | 10 | 0101 |
| Three | 3 | 11 | 0110 |
| Four | 4 | 100 | 0111 |
| Five | 5 | 101 | 1000 |
| Six | 6 | 110 | 1001 |
| Seven | 7 | 111 | 1010 |
| Eight | 8 | 1000 | 1011 |
| Nine | 9 | 1001 | 1100 |

In using this system, each decimal order is represented by a separate code group. Thus, decimal 23 is represented by "0101 0110." Furthermore, whenever the addition of two decimal numbers produces a carry from one order to the next higher order, the addition of the corresponding code groups produces a carry to the next higher code group, so that operations in ordinary binary arithmetic may be performed on a series of excess-three code groups without destroying the separate identity of the individual code groups. However, when two excess-three numbers are added or subtracted, the result is no longer in excess-three notation, but in one or another of two different codes, depending upon whether the numbers were added or subtracted and whether a carry or borrow was produced. Thus, when two excess-three numbers are added and the last digits do not produce a carry, the sum may be corrected so as to be correctly represented in excess-three code by subtracting a binary three (0011). If a carry is produced, a binary three is added. In the case of subtraction, if a carry (borrow) is not produced, three is added, but if a carry is produced, three is subtracted.

Since each decimal digit is represented by a syllable comprising four binary bits, five such syllables comprising one word containing twenty binary bits are used in the present machine to represent any decimal number from 00000 to 99,999.

As an example of a computing machine embodying the various novel features of this invention, the machine herein described is arranged to perform addition and subtraction, which are the normal operations performed in keeping inventory records. However, it will be appreciated that other computing machines capable of performing more complex mathematical operations, may be used with the high speed random access high capacity memory and the other novel features and arrangements of the invention.

SUMMARY OF OPERATION

The operation of the machine is described in detail hereinafter in connection with an assumed computation typical of inventory problems. According to such assumption, the permanent memory contains a record of the fact that the stock on hand of a certain article of merchandise identified by the Catalogue No. 127,777 consists of 1,076 such articles. It is assumed that 339 articles have just been removed from stock, thus requiring the recorded quantity of 1,076 to be altered by subtracting 339 therefrom to provide the correct current figure of 737.

Such a function of the machine is considered as constituting one normal cycle of operation. Each operating cycle is divided into a succession of sequences, one for each successive revolution of the memory drum, the operation proceeding normally from sequence to sequence until the cycle is completed. In the starting sequence, designated as Sequence Zero, the machine operates to locate the desired word in response to the manual operation of setting the Catalogue Number (127,777) into a keyboard device, generally similar to the well known desk type adding machine. The first three digits (127) of the Catalogue Number designate the channel containing the information, and the last three digits (777) designate the proper one of the 896 words in that channel.

The number (339) to be subtracted from the number in the memory (1,076) is set in a numerical section of the keyboard, and a "subtract" control key is actuated. When the machine locates the designated word, the operation proceeds to Sequence One.

During Sequence One, the entire contents of the selected channel are copied into a check channel, an operation which is performed in one revolution of the drum. The machine then idles for one-quarter of a second during a phase designated Sequence One-One, during which time certain of the components are stabilized. From Sequence One-One, the operation proceeds to Sequence Two during which the information copied into the check channel is compared with the original information in the selected main memory channel in order to insure that no error in copying has occurred. The verified copy is thus prepared and checked in three-quarters of a second.

The operation next advances to Sequence Three which also requires only one revolution of the drum. During this one-quarter of a second, the selected main memory channel is read, the number (339) set in the keyboard is subtracted from the number (1,076) comprising the selected word, and the result (737) is recorded in the main memory in place of the original number. The operation then goes into Sequence Four.

During Sequence Four the selected main memory channel containing the new information (737), is again read and the new total (737) is added to the number (339) set into the keyboard to give a proof total (1,076). The proof total (1,076) is compared with the original information (1,076) preserved as a verified copy in the check channel to thereby verify the accuracy of the computation. At the same time, the new revised information (737) is placed in a display register which permits the new result to be seen by the operator. If desired, a printer may be operated to print out the results. This completes the normal cycle of operation, the sequence control resetting to Sequence Zero in readiness for another operating cycle.

In the case of replenishment of stock, the operation is similar except that an "add" key on the keyboard is actuated instead of the "subtract" key. As a consequence, the computation performed in Sequence Three is addition, and the proof computation during Sequence Four is subtraction.

The machine of this invention also provides means for checking the stock on hand without performing any computations. Such an operation requires only that the catalogue number (127,777) be set into the keyboard and that a "read" key be actuated. The machine locates the designated word during Sequence Zero as above described, and immediately shows on the display register or the printing device the quantity (1,076) on hand.

Thus, a normal operating cycle comprises six sequences, the first being Sequence Zero during which the designated word is located, an operation which is completed in less than one second. The ensuing sequences each require only one revolution of the memory drum and last for about one-quarter of a second; during Sequence One the selected channel is copied into the check channel; in Sequence Two the copy is verified; in Sequence Three the computation is performed and the result is entered in the main memory in place of the original data; and in Sequence Four the proof computation is performed and the accuracy of the computations and data transfer operations is determined.

CENTRAL DATA STORAGE SYSTEM

Figure 1A:
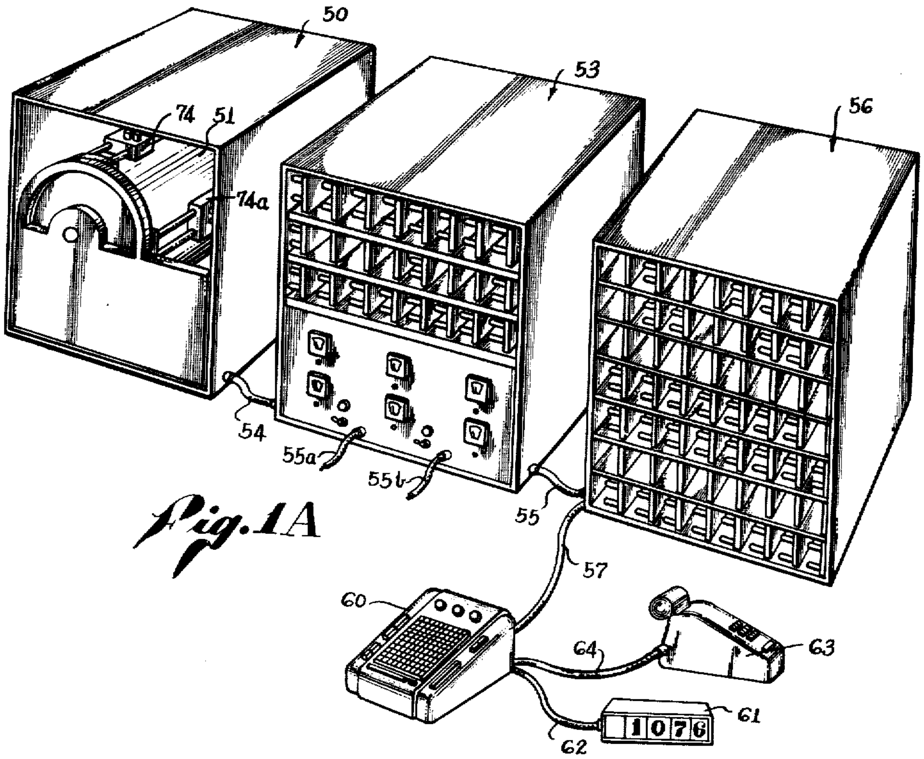
FIGURE 1A is a perspective view of a complete computing machine according to a preferred embodiment of the invention, and illustrating a typical input-output station.

Referring now to the drawings, FIGURE 1A is a representation of a computer installation showing the complete central data storage system and one of a plurality of input-output and control stations. Thus, the numeral 50 designates generally a cabinet that houses a rotating drum 51 constituting the main memory device, together with various magnetic heads, and an electric motor to drive the drum 51. A second cabinet 53 contains the power supply and similar equipment, and is connected to the cabinet 50 by suitable means such as a cable 54. From the power supply cabinet 53 another cable 55 connects to various control and computing equipment located in another cabinet 56, herein referred to as the logic cabinet, which contains the various items of equipment necessary to establish the sequence of operations of any given input-output device, or control station, the computing elements associated with that station, and other items that are special for each such station.

From the cabinet 56, connection is made by a cable 57 to a keyboard or input device 60 for controlling and supplying information to the machine and output information provided by the computer is indicated on a display register 61 that may be connected to the logic cabinet 56 by means of a cable 62 that may pass through the keyboard 60. Where a printed record of the result is desired, a printer or printing register 63 may likewise be connected to the keyboard 60 by means of a cable 64, it being understood, of course, that a printer is not essential to the operation of the device.

For the operation of the computer, only a single keyboard 60 and display register 61 is necessary, these devices being connected to the associated logic cabinet 56. Additional input-output control stations, each comprising a keyboard 60, a display register 61, and a logic cabinet 56, are connected by other cables **55*a* and 55*b* through the power supply cabinet 53 to appropriate heads on the magnetic drum 51**. However, since the input-output stations and their associated logic and control are essentially similar, only one such station will be described in detail herein.

*High Capacity Random Access Memory*

Figure 2:
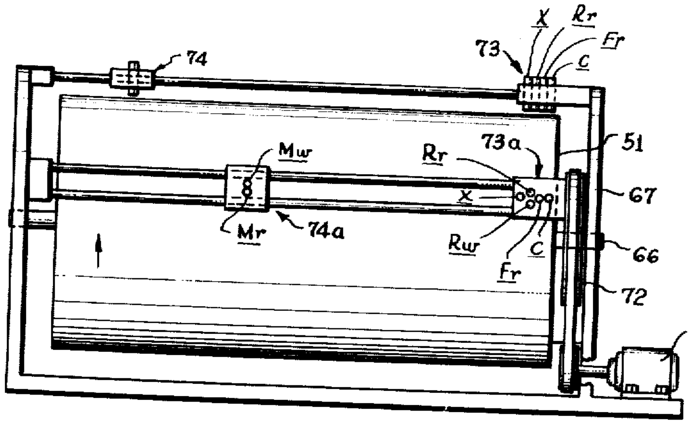
FIGURE 2 is a front elevational view of the magnetic drum which forms the permanent memory or data repository.
Figure 3:
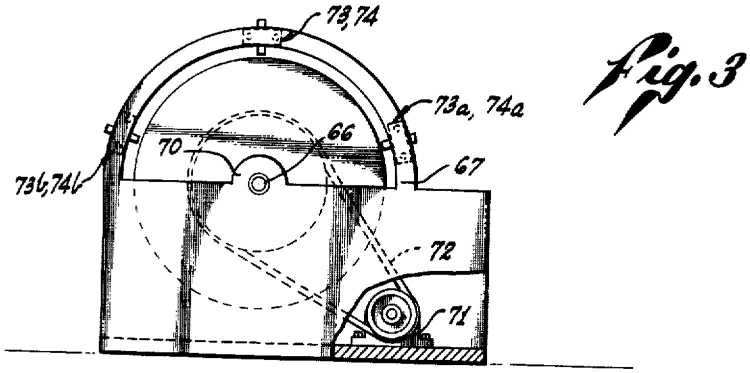
FIGURE 3 is an end elevational view of the drum shown in FIGURE 2 illustrating the plurality of heads or transducers which cooperate with the drum.

The magnetic drum 51 that forms the memory of the computer, together with some of the magnetic heads that read and write the information on the drum, are shown in FIGURES 2 and 3. Although various sizes and proportions may be used in the production of a drum, as well as the associated equipment, the design shown is both practical and satisfactory. The drum 51 is mounted upon a shaft 66 supported in a frame 67 by suitable bearings 70, and a motor 71 is coupled by suitable transmission means such as a belt and pulley arrangement 72 to the shaft 66 to turn the drum 51 at the desired speed.

The drum 51 is preferably of fairly large diameter, for example, four feet, and its outer surface is coated with a magnetizable material such as one of the iron oxides used in the well-known magnetic recording tapes. The information or data is recorded on this coating in the form of a plurality of adjacent, narrow, and closely spaced channels that extend around the periphery of the drum, the information being invisibly recorded in the form of magnetized areas.

Figure 4:
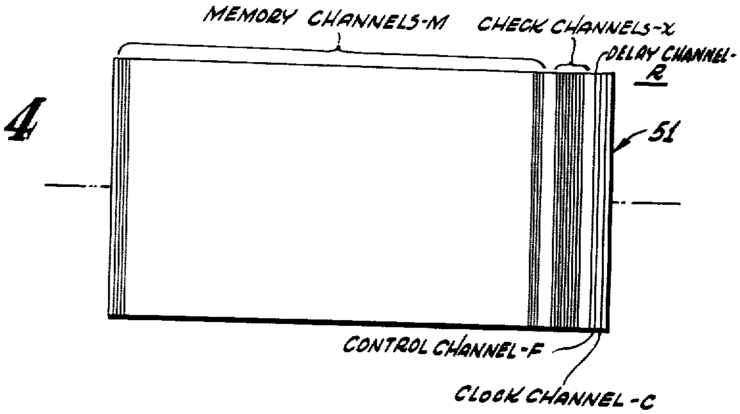
FIGURE 4 is a plan view of the drum showing diagrammatically the location of the various channels.

The surface of a drum constructed in accordance with a preferred embodiment of the invention is indicated diagrammatically in FIGURE 4. At the right hand end of the drum there is located a clock channel C upon which is recorded a timing or clock signal used to control the timing and synchronizing of the various functions of the machine, and next to it is placed a control channel F upon which is recorded certain control signals and word identification signals used to control the selection of a desired unit of data. A delay channel R is located beside the control channel F. As will be explained, circumferentially spaced read and write heads are used on the delay channel to introduce a delay in the transmission of signals to the main memory, the delay being coordinated with the operating time of various circuits to permit altered data to be recorded on the drum in the same physical location as the data which it replaces. A group of check channels X are provided, there being one such check channel for each input-output device associated with the drum. The check channels are used to preserve a verified copy of original data to be processed to ensure against inadvertent loss of data through malfunctioning of the machine. The timing, control, delay, and check channels may be termed operating channels, and the remainder of the drum area contains the separate memory channels M. The length of the drum may be extended to any reasonable value to provide additional storage capacity.

It will be realized, of course, that the individual channels are not visible to the unaided eye, since they are merely areas or strips extending around the periphery of the drum 51, and comprise magnetized areas that are read by various magnetic heads. Each of these strips or channels may be very narrow, and their spacing axially of the drum may be as small as 16 channels per inch. Thus, a drum having an effective axial length of 18 inches will readily accommodate a total of 275 channels.

To record the information in these channels and to read the information as it is needed, a plurality of magnetic heads are mounted upon suitable supports that are rigidly connected to the frame 67. Preferably, there is a set of magnetic heads and an associated support for each of the various stations associated with a drum, each such set comprising a fixed group 73 and a movable group or pair 74, and in FIGURES 2 and 3, three such sets are identified by the reference characters 73, 74; **73*a*, 74*a*; and 73*b*, 74*b*. Each head of each group 73 is fixed in position and always scans the same associated channel, while each pair 74 of heads is movable back and forth along the drum 51** to scan any desired channel.

The fixed head group 73 comprises four heads that scan the clock channel C, the control channel F, the delay channel R, and the associated check channel X, respectively. The head that scans the clock channel is designated the $\underline{C}$ head, while the head that scans the control channel is designated the $\underline{Fr}$ head. There are a pair of heads $\underline{Rw}$ and $\underline{Rr}$ that scan the R channel, these heads both scanning the same channel, but being circumferentially displaced so that one scans the channel a small fraction of a second after the other. The $\underline{Rw}$ head is adapted to write information upon the delay channel, and the $\underline{Rr}$ head is adapted to read such information. The read head $\underline{Rr}$ is spaced from the write head $\underline{Rw}$ circumferentially in the direction of drum rotation so that a given pulse recorded in the delay channel by the write head $\underline{Rw}$ is reproduced a fraction of a second later by the read head $\underline{Rr}$. In this manner, a time delay is introduced, the amount of such delay being governed by the circumferential spacing of the heads Rw and Rr. The head that scans the check channel X is designated as the X head.

The X head is used both to read and write information, the C, Rr and Fr heads are used only to read information, and the Rw head is used to write information. Since the spacing between the Rr and Rw heads is a very small fraction of the circumference of the drum 51, it is possible to use a number of sets of delay channel heads aligned with the same delay channel. Thus, a single delay channel serves a plurality of separate stations, each using the channel without interference among the plurality of stations.

The C head, the Fr head, and the Rw, Rr heads thus are aligned with the three corresponding channels recorded upon the drum 51, and the corresponding head in each of the separate groups is aligned with the same channel. Thus, the C heads in the groups 73, **73*a*, and 73*b* are all aligned with the one C channel, and the same is true for the Fr heads and the F channel, and the Rw, Rr heads and the R channel. However, each of the groups has its own check channel X. When the original information recorded in a selected channel of the main memory is copied into a check channel X, the entire contents of that channel are copied. Since the original channel so copied embraces the full circumference of the drum 51, the same information recorded in the check channel X will likewise extend completely around the periphery of the drum. Consequently, it is not practical for a plurality of groups to share the same check channel. As a result, the X head of group 73 has its own individual X channel, while each X head of the groups 73*a* and 73*b*** has its own separate and independent X channel.

To read and write in the several hundred main memory channels M, there are provided corresponding read and write heads Mr and Mw, respectively, that constitute the traveling head groups 74, **74*a*, 74*b*. The traveling heads are mounted for movement along the length of the drum 51**, and may be positioned in alignment with any desired memory channel M by means of a suitable servo mechanism (not shown in FIGURES 2 and 3). The read and write heads Mr and Mw are aligned with each other and both may be aligned with any desired memory channel.

Where a plurality of head assemblies or sets of heads 73, 74 are used, as indicated in FIGURES 2 and 3, each associated with a corresponding input-output station, it is quite possible that the main memory read and write heads Mr and Mw of one head assembly would be aligned with a particular channel that is already being used by the corresponding traveling heads of another head assembly. While such alignment of traveling heads is permissible, two separate stations cannot work upon the same channel at the same time without interference. Consequently, access control means, hereinafter described, are provided to insure that at any given time only one input-output station performs computations or data transfer operations involving a given main memory channel.

The leads from the various heads, the power leads for the motor 71, as well as various other related associated conductors, are preferably cabled and led to the power cabinet 53, as previously mentioned. In this cabinet are the various common supplies and equipment, such as the controls for the motor 71, auxiliary emergency power equipment, a direct current power supply, and various other devices and equipment common to all of the different input-output devices.

*Input-Output, Logic, and Control Apparatus*

The various separate independent input-output stations and their associated logic and control equipment are connected to the power cabinet 53, as above described. The logic and control equipment consists of a novel arrangement of comparatively simple circuits and components such as are commonly used in digital computers. This new arrangement provides the instrumentalities for performing the various data transfer, computing and checking operations previously mentioned.

Figure 5:
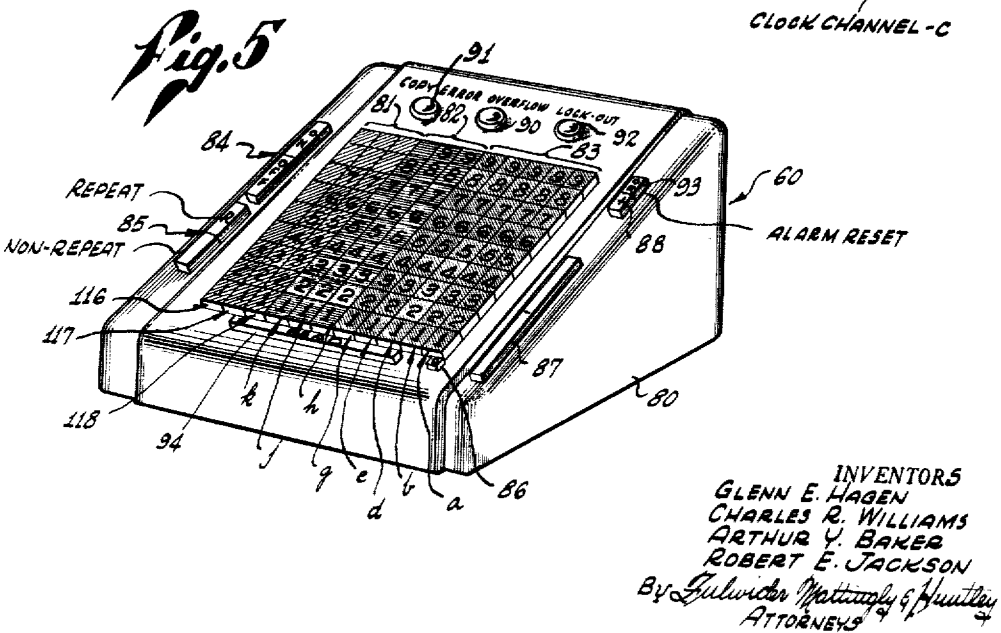
FIGURE 5 is a perspective view of the keyboard of an input-output station.

To control the machine and deliver the necessary information, the keyboard 60 is provided, as previously mentioned. FIGURE 5 illustrates a suitable form of keyboard 60 which may resemble the keyboard and housing of a conventional desk calculator. Thus, a housing 80 provides a sloping upper surface through which a number of keys project. In addition to certain operational keys hereinafter described, there are provided a plurality of columns of digital or numbered keys for use in setting up the catalogue number of a desired article, and for entering the number of such articles withdrawn from or added to the stock. Preferably, the groups of columns associated with different functions are distinctively colored or identified. For example, the first six columns are used to set up the catalogue number and are preferably divided into two groups of three, the first three columns 81 designating the channel address may be darker, while the next three columns 82 designating the word address may be lighter in color. The remaining five columns, hereinafter referred to as the numerical section 83 of the keyboard, may again be of a darker or different color. In addition to the digital keys, there is provided an "on-off" or "start-stop" switch 84 that controls the operation of the entire computer, a repeat and non-repeat selector 85 as is customary on desk-type calculators, and a "clear" button 86 which may be used before the computation is begun to correct an error made in depressing the keys.

In inventory work, as handled by most retail stores and similar establishments, the most common operation is that of subtraction, as sales are made and items are earmarked or removed from stock. Less frequently, the stock is replenished and the total quantity of items is increased. Reflecting the more frequent use of subtraction, a large operating key or bar 87 is provided that is depressed when it is desired to subtract a number from the total held in the permanent memory. A somewhat smaller bar or key 88 is depressed when it is desired to add a number to the number in the permanent memory.

The various warning indications previously mentioned are provided by warning lights 90, 91, and 92, and also by other means such as a bell (not shown). The previously mentioned reset button is shown at 93, and 94 designates the "read" key hereinabove described.

Figure 6:
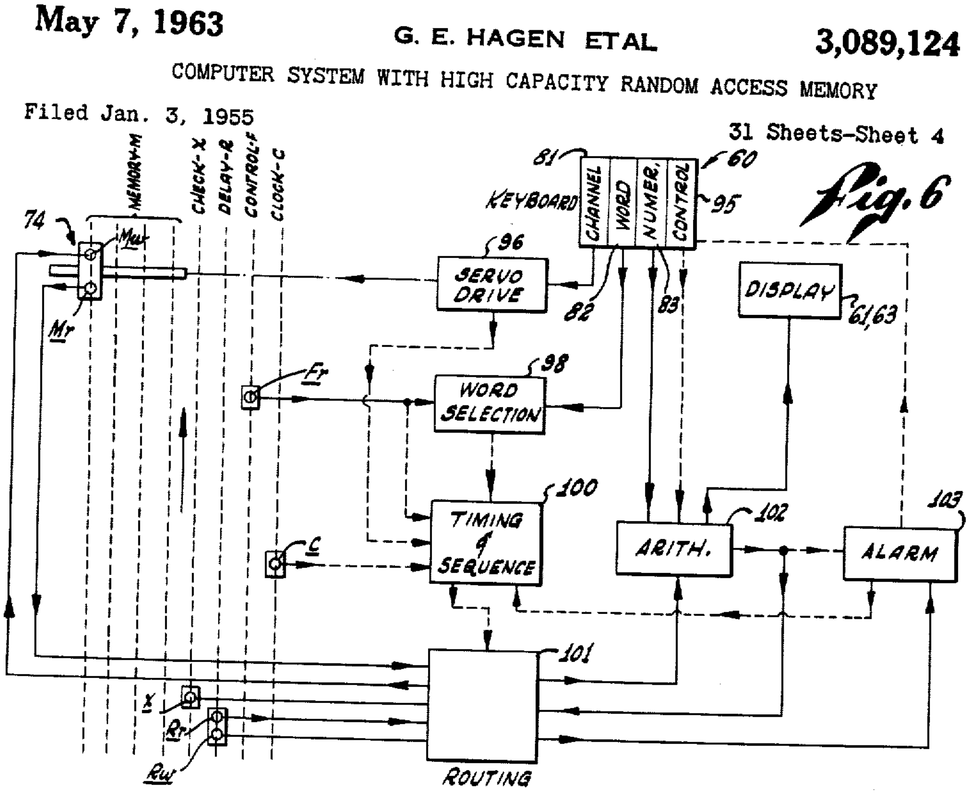
FIGURE 6 is a block diagram indicating in a schematic manner the functional correlation of the various elements of a computing machine comprising the central data repository and one input-output station with associated logic and computing circuits.
Figure 7:
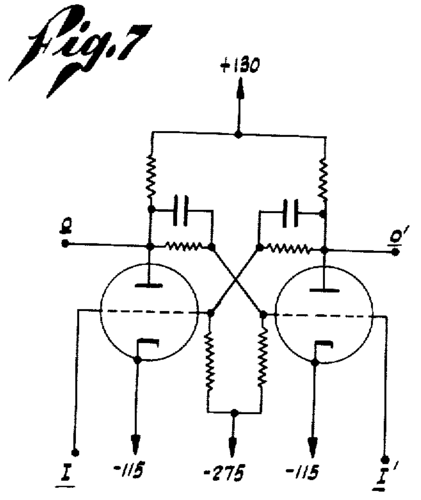
FIGURE 7 is a schematic diagram representing a conventional form of flip-flop or bi-stable state circuit.
Figure 8:
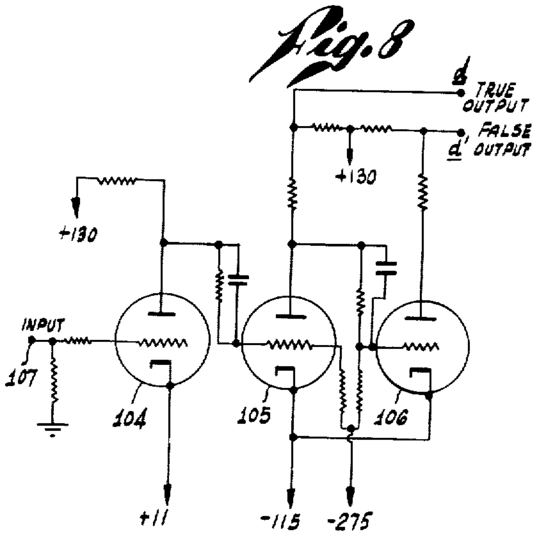
FIGURE 8 is a schematic diagram representing a suitable form of driver circuit.
Figure 9:
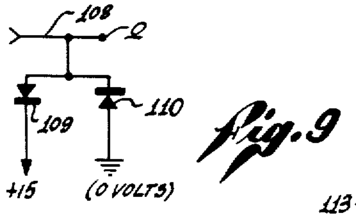
FIGURE 9 is a schematic diagram illustrating a clamping circuit which may be used in connection with the output circuits of flip-flops and drivers.
Figure 10:
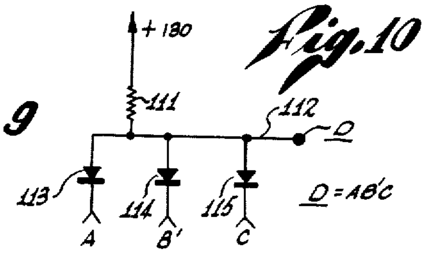
FIGURE 10 is a schematic wiring diagram illustrating an "and" gate as used in the automatic computer art.
Figure 11:
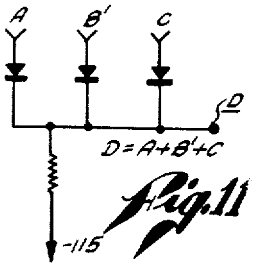
FIGURE 11 is a schematic wiring diagram illustrating an "or" gate as likewise used in the automatic computer art.

The cooperative relations among the various mechanisms above described are shown in FIGURES 1 and 6, the latter of which is a schematic representation of the operational interconnection and functional interrelations of the different major components of a single control station and associated head assembly. Thus, the keyboard 60, with its channel address section 81, word address section 82, and numerical section 83, is represented as including a control section 95 comprising the various control devices mentioned. The channel selecting mechanism includes a servo drive 96 that is electrically connected to the channel selection keys 81 of the keyboard, and is mechanically connected to the traveling head pair 74 of the main memory. The word address section 82 is connected to a word selection unit 98 that receives also a signal from the Fr head in the stationary group 73. The clock channel head C is connected to a timing and sequence section 100 that receives other signals from the servo drive 96 and from the word selection unit 98, in addition to a signal from the control section 95 of the keyboard.

The servo drive 96 acts to position the movable heads 74 in alignment with the selected channel, and the word selection unit 98 compares the signal received from the word address section 82 of the keyboard with the word identification signals recorded in the F channel, in this way locating the desired word. Information from the word selection unit 98 is fed to the timing and sequence control 100, together with a signal from the servo drive 96, and a signal from the F channel head $\underline{Fr}$. Depending upon the status of the timing and sequence system, various signals will be differently routed during different phases or sequences of a complete cycle of operation of the machine. To this end, the timing and sequence section 100 controls a routing control system 101 which, in turn, transmits the various signals received from the main memory, the check channel X, and the delay channel R, to the desired destinations, such as the arithmetic section 102 and the alarm control 103.

In general, the lines interconnecting the various elements shown in FIGURE 6 and similar figures following are dotted to indicate a control function, or solid to indicate the transmission of information. It will be appreciated that the various components and functions indicated by FIGURE 6 are not necessarily separated or physically grouped in the manner indicated, but for ease in understanding, this presentation has been chosen. For example, the manner in which the signals are differently routed during different sequences is best explained by representing the controls generally as constituting the routing control system 101. However, in practice, as will clearly appear from the detailed description to follow, the routing function is actually performed by a large number of electronic gates arranged in a plurality of networks which are associated with various of the components and which function to admit or exclude certain signals at certain times, as required.

The modes of operation of the machine peculiar to the various sequences are delineated by the emphasized lines in the reproductions of FIGURE 6 presented as FIGURES 15, 29, 34, 40, 48, 54, and 55.

*Basic elements.*—In addition to the memory drum and the input-output devices (keyboard and registers), the machine uses a number of new and novel circuits incorporating certain basic elements, such as flip-flops, drivers, gates, logic networks, etc.

According to Boolean algebra as used herein, capital letters (e.g. A, B, C, etc.) represent the "true" quantities in the logic equations, whereas such letters followed by a prime (e.g. A′, B′, C′, etc.) represent the "false" quantities, being read "not A," "not B," etc.

All of the logic equations presented in this specification are variations and combinations of two basic combinations known respectively as the logical "or" and logical "and" combinations. The logical "or" relationship is typified by: $D=A+B'+C$, wherein the plus (+) sign is used to represent the "or" relationship. This equation means that D is true if A is true *or* if B is false *or* if C is true. The logical "and" relationship is typified by: $D=A(B'\ C)$, wherein the multiplications represented by the parentheses and the absence of any plus signs between letters are used to represent the "and" relationship. This equation means that D is true *only if* A is true *and* B is false *and* C is true.

A logic equation may contain both "and" and "or" combinations, and the laws of ordinary algebra regarding the factoring and expansion of expression hold true. For example, the equation $D=A(B'+C)$ may be written $D=AB'+AC$, and vice versa. In either form the equation means that D is true if A is true *and* B is false, *or*, if A is true *and* C is true.

Logic equations as above described are used herein to define the actual construction of the various circuits employed. As so used, the capital letters (e.g. A, B, C, etc.) are used to represent electrical signals produced on similarly designated output terminals of various devices, underscoring being used to distinguish the terminal from the signal. In the machine herein described the signals so represented constitute, in most cases, a positive direct potential of the order of 15 volts. Thus "A" means that output terminal $\underline{A}$ is at +15 volts, whereas "B′" means that output terminal $\underline{B}'$ is at +15 volts. The various devices are given the same designating letter as the output terminal, so that "$\underline{A}$" means the "true" output terminal of device $\underline{A}$, and "$\underline{B}'$" means the "false" output terminal of device $\underline{B}$. Furthermore, since it is the control (function and apparatus) of the various circuit components that is defined by the logic equations, the equations most often relate to the device itself, rather than to its output signal. Thus, instead of writing (as above)

$$D=A+B'+C$$

an "or" equation is written $\underline{D}=A+B'+C$, meaning that device $\underline{D}$ will be actuated to produce a +15 volt signal at its "true" output terminal, if such a signal obtains at the "true" output terminals of either of devices $\underline{A}$ or $\underline{C}$ or at the "false" output terminal of device $\underline{B}$.

The various gating networks used in this apparatus are readily defined by logic equations of the character above-described. These gating networks preferably comprise interconnected diodes and resistances arranged in such manner as to deliver an output signal whenever certain input signal configurations exist, the input signal configurations being defined by logical "and" and logical "or" relations, or by both logical "and" and logical "or" relations.

Figure 12:
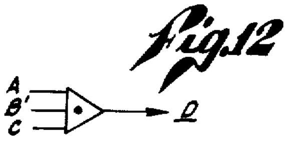
FIGURE 12 is a schematic representation of an "and" gate as used in various block diagrams herein, this "and" gate being the equivalent of the gate shown in FIGURE 10.
Figure 13:
FIGURE 13 is a schematic representation of an "or" gate of the type illustrated in FIGURE 11.
Figure 14:
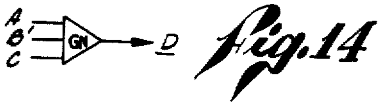
FIGURE 14 is a general schematic designation of a gating network that may include "and" networks, "or" networks, or a combination of the two.

In the various block and functional diagrams which are included in the accompanying drawings, a symbol such as is shown in FIGURE 12 is used to diagrammatically represent an "and" gate, whereas a symbol such as that shown in FIGURE 13 is used to diagrammatically represent an "or" gate. When it is desired to represent a gate generally, or to indicate a more complex network involving combinations of "and" gates and "or" gates, the symbol in FIGURE 14 is employed.

Gates and gating networks, such as above-described, are used to control the functioning of the various flip-flops, drivers, and the like, and are therefore connected to the input terminals. This is reflected in the logic equations. For example, a set of equations defining the control of a flip-flop $\underline{D}$ might be:

$$\underline{D}=A\ B'\ C$$
$$\underline{D}'=A+B'+C$$

In other words, the "and" gate is connected to the "true" input terminal (the connection required to produce the "true" output signal under the conditions specified), and the "or" gate is connected to the "false" input terminal. In the case of a driver $\underline{E}$, an equation such as $\underline{E}=A\ B'\ C$ defines an "and" gate connected to the single input terminal to produce an output signal E or +15 volts on the "true" output terminal when the input conditions are satisfied, and to produce an output signal E′ of +15 volts on the "false" output terminal when the input conditions are not satisfied.

Because flip-flops operate as toggle devices, as above explained, and because the times of operation may be delayed as explained hereinafter, all devices other than flip-flops are distinguished in the logic equations by enclosing their designation in parentheses, thus: $(\underline{E})=A\ B'\ C$, for a driver such as above-mentioned.

The logic equations set forth in this specification, taken together with the foregoing description of the construction and operation of flip-flops, drivers, clamps, and diode gates, thus constitute a complete and accurate description of the construction of the apparatus. To one understanding such type of equations, the construction is disclosed much more accurately and in a more readily understandable form than is possible with the more conventional drawings, wiring diagrams, and the like.

Since the construction and operation of each of the various circuits and mechanical arrangements used in the machine are best understood by relating them to the various circuits and arrangements with which they are associated, such features are described in connection with the following explanation of the operation of the machine, and the various underlying concepts involved.

OPERATION

Reviewing very briefly the operation of the machine, the unit of data desired to be processed is selected by setting the catalogue number into the keyboard to thereby define its location by designation of the channel and word space wherein such data are stored. If it is desired to read out the information so specified, the "read" button 94 on the keyboard is depressed, causing the selected data to be read out by the output printer 63 or display device 61. If it is desired to amend such unit of data by adding or subtracting a quantity therefrom, the number to be so added or subtracted is set into the numerical section 83 of the keyboard. The proper operating key designating addition or subtraction is then depressed, and the remainder of the operation is automatic.

The cycle of automatic operation of the machine comprises a plurality of successive sequences, with the proper word and channel of the permanent memory being selected in Sequence Zero, and the entire selected channel being copied into the check channel in Sequence One. The machine idles for a brief period during Sequence One-One, and during Sequence Two the check channel copy is verified. If the copy cannot be verified, the normal sequence of operations is arrested and an alarm is given requiring the machine to be reset to Sequence Zero so that the operation may be started anew. This serves to insure against loss of original data by requiring that a verified copy of the original data be contained within the check channel before the normal sequence of operations is allowed to proceed. Also during Sequence Two, the contents of the numerical section of the keyboard are transferred to an input register in the arithmetical section of the machine so that the desired computation may be performed during the ensuing sequence.

In Sequence Three the contents of the permanent memory channel are read and the quantity set into the keyboard is added or subtracted from the number in the selected word to produce the new result. This new result or answer is then written in the permanent memory channel in place of the original number. When this operation is completed, Sequence Four comes on and during that sequence the converse of the computation, whether addition or subtraction, is performed, and the result compared with the information in the check channel, thereby proving the results of the computation. Also during Sequence Four the results of the first computation are read out by the display device or output printer.

If the proof computation establishes the accuracy of the new data recorded in the main memory channel, the machine automatically resets the sequence control to Sequence Zero and is ready for the next cycle of operation. However, if the results do not prove, the cycle is extended to Sequence Five wherein the verified copy of the original data is copied from the check channel into the permanent memory channel. During the next sequence, designated Sequence Four-Five, the contents of the check channel and the permanent memory channel are compared to ascertain the accuracy of the copying. If this comparison shows that the original information has been correctly restored to the main memory channel, the machine resets the sequence control to Sequence Zero. However, if this comparison shows an error in copying, the machine will cease operation and thereafter refuse to respond to its controls until after the trouble has been corrected. When the trouble is corrected, the act of placing the machine in operation causes Sequences Five and Four-Five to be repeated so as to correctly copy the original data back into the main memory channel and check the accuracy of such copying. When the correctness of the information so restored to the main memory channel is established, the machine automatically resets to Sequence Zero.

*Sequence Zero*

*Channel selection.*—During Sequence Zero, the unit of data desired to be processed is selected by depressing the appropriate keys in the six left hand columns 81 and 82 of the keyboard 60 (FIGURES 1 and 5). In an inventory control machine, such as herein described, it is convenient to think of the number represented by the six keys so depressed as defining the catalogue number of the item in question. These six columns of keys are divided into two groups of three columns each, the keys in the three left hand columns 116, 117 and 118, defining the channel number in which the desired unit of data is recorded. An octal numbering system is used for the channel designation to simplify the electrical circuits, and the keys are numbered correspondingly 1 to 7.

Figure 16:
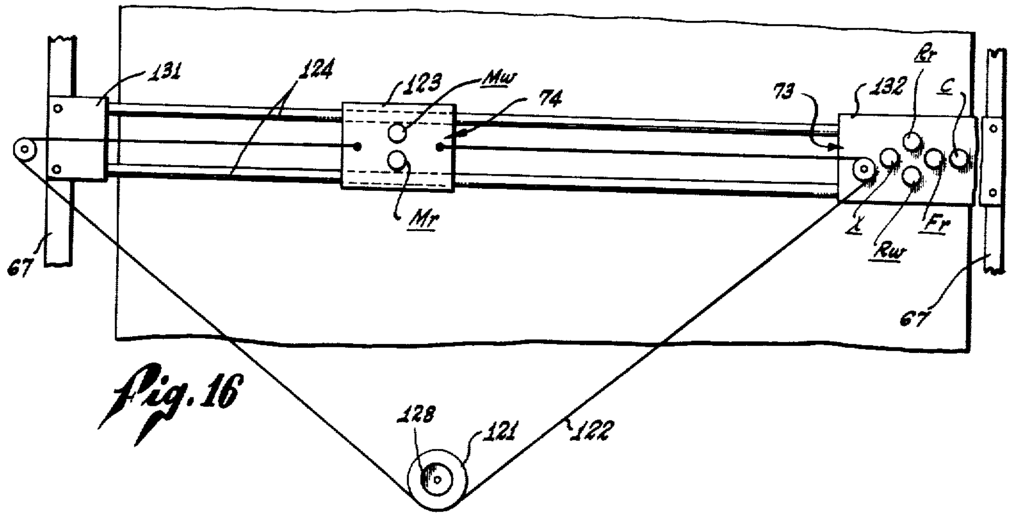
FIGURE 16 is a front elevational view of one form of servo-drive mechanism that may be used to position the traveling heads at a desired point along the length of the memory drum.
Figure 17:
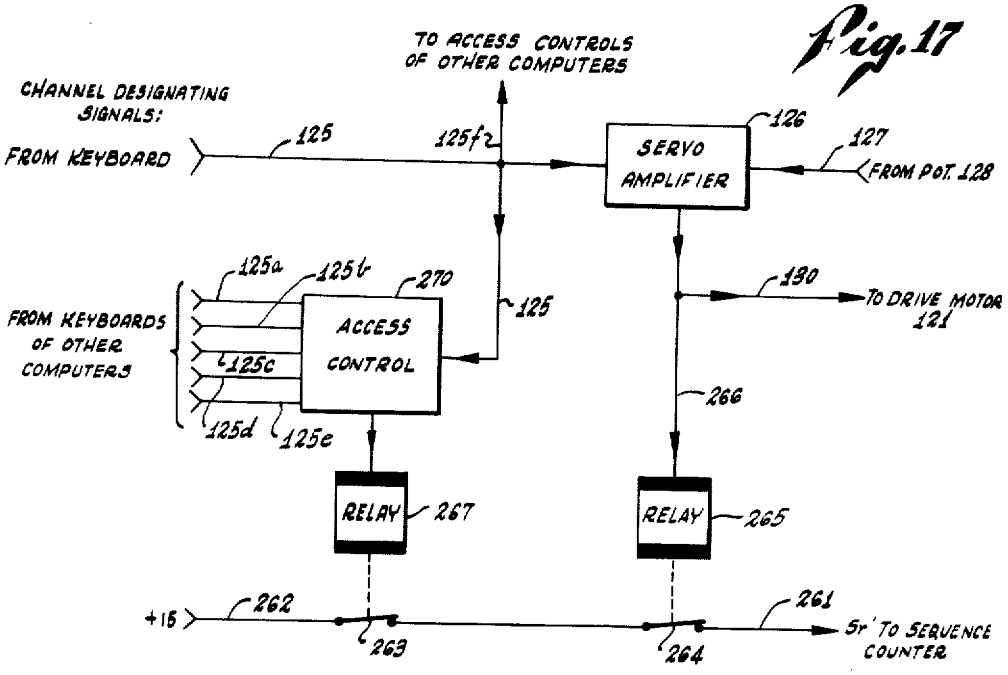
FIGURE 17 is a schematic block diagram showing that portion of the machine which controls the channel selection by the traveling heads, and showing the access control means which prevents two computers from operating in the same channel at the same time.

Each of the keys so depressed closes individual switches within the keyboard as explained hereinafter to produce an appropriate signal which is transmitted as indicated by the line 120 of FIGURE 15 to the servo drive mechanism 96. The servo drive mechanism controls the movement of the main memory read-write heads $\underline{Mr}$ and $\underline{Mw}$ along the large rotating drum to align these heads with the selected channel. In its broader aspects the servo drive is indicated in FIGURES 16 and 17 where a reversible motor 121 is indicated as driving a cord or cable 122, the ends of which are connected to a traveling block or carriage 123. The carriage 123 rides upon a pair of rods or ways 124 that extend across the face of the magnetic drum, the main memory read and write heads $\underline{Mr}$ and $\underline{Mw}$ being appropriately mounted on the carriage 123.

While any appropriate mounting may be used for the main memory read-write heads $\underline{Mr}$, $\underline{Mw}$ and for the various other heads used in this machine, it is preferred to utilize the air-floating head mounting which is disclosed and claimed in the co-pending application Serial No. 432,534, previously mentioned, since such a mounting is particularly adapted for use with a large diameter memory drum of the character incorporated in the instant device.

In the present device a total of 256 separate memory channels is provided upon the drum, and the servo system is so designed that depressing the particular keys designating a specific channel causes a signal from a voltage divider to be delivered as indicated at 125 in FIGURE 17 to one input of a servo amplifier 126. The servo amplifier 126 compares the keyboard signal with a feed-back signal or follow-up voltage which is applied to the other input of the servo-amplifier 126 as indicated at 127. This follow-up voltage may be developed by any suitable means, such as a potentiometer 128 (FIGURE 16) connected to the driving mechanism for the carriage 123. The servo-amplifier 126 is connected as indicated at 130 to control the drive motor 121 so as to move the carriage in such direction as to balance the feed-back signal against the keyboard signal and deenergize the motor 121 when the desired carriage position has been reached.

For more exact positioning of the carriage 123, a detent arrangement may be used, if desired, to insure precise and unvarying location.

As mentioned hereinbefore, it is desired to use the one memory drum as a data source and repository for a plurality of computing devices. It is also desired that the various read and write heads utilized by each such computer be capable of being positioned in any desired circumferential location about the drum. Accordingly, it is preferred to utilize a unitary mounting for all of the heads associated with a single computer to provide a subassembly which may be so mounted as desired. To this end, there are provided frame members 131 and 132 which may be securely mounted on the main framework 67 which supports the drum and the driving mechanism therefor. Frame members 131 and 132 together provide the necessary support for the carriage ways 124 previously described, while member 132 is elongated to provide a mounting for the fixed heads 73.

*Word selection.*—To complete the selection of the particular unit of data desired to be processed, it is necessary to select the one particular word desired from the large number of words recorded upon the selected channel. The desired word, identified by the last three digits of the catalogue number set up in the keyboard, is designated by electrical signals produced by the depressed keys. Word identification signals permanently recorded in the control channel F are reproduced or read from the drum and compared with the keyboard signals. When the identification corresponding to the keyboard designation is found, a control signal is produced which is used to appropriately control the ensuing functions of the machine.

It will be understood that one series of word identification signals serves for all channels because such signals define the angular position of the drum at which the designated word space comes under the read head Mr.

Various switching arrangements may be used to produce the desired signals representing the keyboard setting. However, since the excess-three binary code is used for the reasons explained hereinbefore, the switching arrangement (see FIGURE 18) is such as to affirmatively indicate the true or false condition of four binary bits in order to represent the decimal digits 0 through 9 of each column of keyboard keys. Thus, each column of ten keys is provided with four pairs of conductors, each pair corresponding to a binary bit, and the two conductors of each pair corresponding respectively to the true and false conditions of the corresponding binary bit. For convenience in reference, the three word selection key columns have been designated as the *h*, *j* and *k* columns, the *h* column corresponding to the least significant decimal digit and the *k* column corresponding to the most significant digit. The eight wires associated with each column are designated by the column letter followed by one of the Arabic numerals 1, 2, 3, or 4, the numeral "1" designating the least significant bit and the primes (′) being used to designate the false conditions. Thus, the three groups of eight wires are designated *h1*, *h1′* to *h4*, *h4′*; *j1*, *j1′* to *j4*, *j4′*; and *k1*, *k1′* to *k4*, *k4′*.

Figures 18, 19, 20, 21:
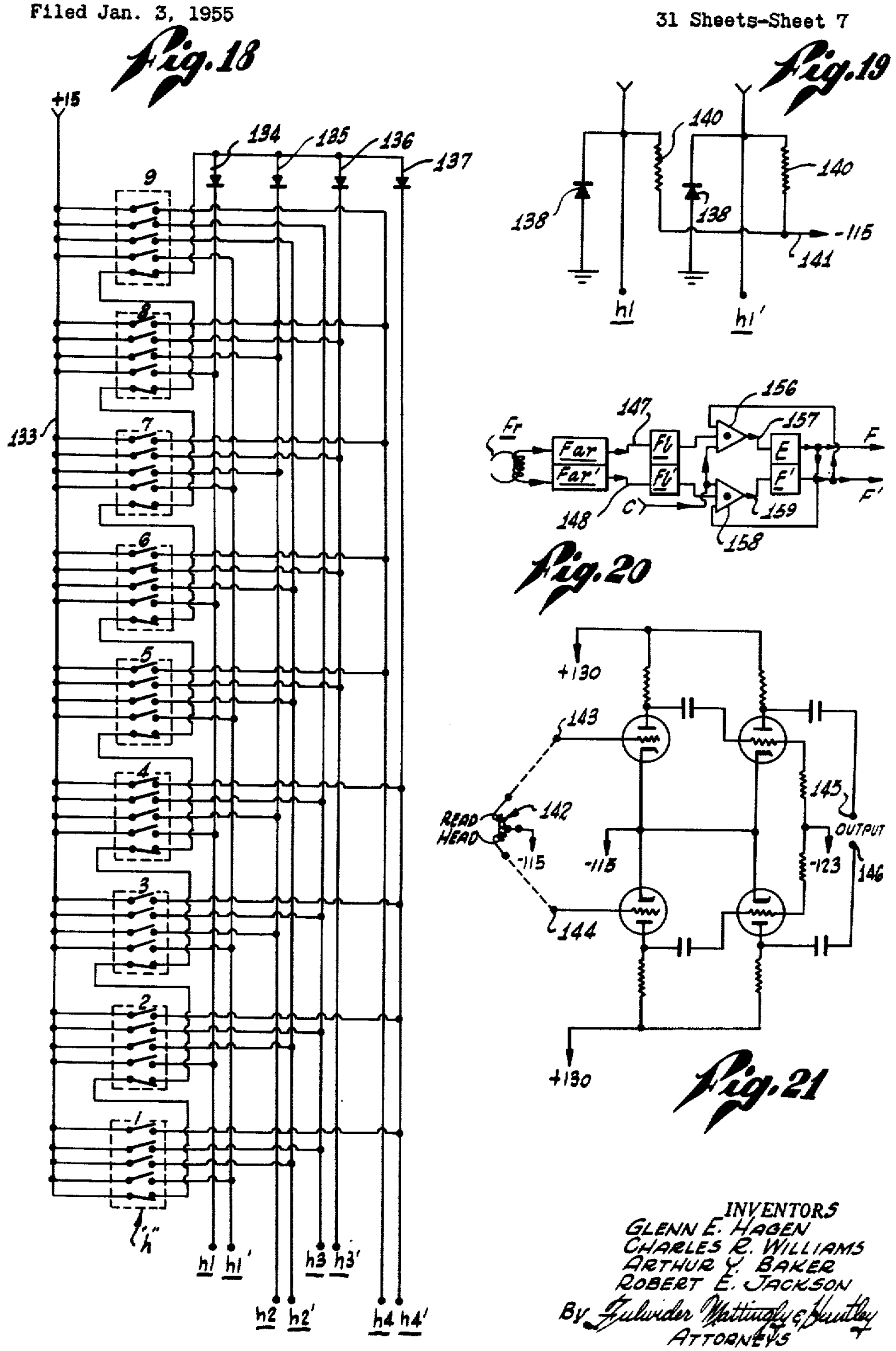
FIGURE 18 is a schematic wiring diagram of a plurality of switches which are controlled by the keys in one column of the word selection portion of the keyboard.
FIGURE 19 is a schematic wiring diagram illustrating a clamping network that is associated with each pair of output leads from the keyboard switches of FIGURE 18.
FIGURE 20 is a schematic diagram of the head, amplifier, flip-flops, and gates comprising the control channel read circuitry.
FIGURE 21 is a schematic diagram illustrating a suitable form of read amplifier used in connection with the various read heads or transducers.

Each of the keys is mechanically coupled to a multiple contact switch, and the switches are connected to the four pairs of conductors in the manner illustrated in FIGURE 18. Each of the switches provides five sets of contacts, four of which are normally open (closed when the key is depressed), and one of which is normally closed (opened by the depression of the key). The four normally open contacts of each switch interconnect a supply bus 133, understood to be connected to a suitable source of positive direct potential of the order of +15 volts, to one or the other of the two conductors of all four pairs. As may be seen by inspection of the drawing, the connections are so arranged that the depression of the individual keys will apply the +15 volts potential to the individual conductors in the manner summarized in the following tabulation, wherein a "1" is used to represent the +15 volt potential and a "0" represents zero volts:

TABLE II

| Key number | Excess-three binary Code | Conductor | | | | | | | |
|---|---|---|---|---|---|---|---|---|---|
| | | *h4* | *h4′* | *h3* | *h3′* | *h2* | *h2′* | *h1* | *h1′* |
| 1 | 0100 | 0 | 1 | 1 | 0 | 0 | 1 | 0 | 1 |
| 2 | 0101 | 0 | 1 | 1 | 0 | 0 | 1 | 1 | 0 |
| 3 | 0110 | 0 | 1 | 1 | 0 | 1 | 0 | 0 | 1 |
| 4 | 0111 | 0 | 1 | 1 | 0 | 1 | 0 | 1 | 0 |
| 5 | 1000 | 1 | 0 | 0 | 1 | 0 | 1 | 0 | 1 |
| 6 | 1001 | 1 | 0 | 0 | 1 | 0 | 1 | 1 | 0 |
| 7 | 1010 | 1 | 0 | 0 | 1 | 1 | 0 | 0 | 1 |
| 8 | 1011 | 1 | 0 | 0 | 1 | 1 | 0 | 1 | 0 |
| 9 | 1100 | 1 | 0 | 1 | 0 | 0 | 1 | 0 | 1 |
| (0) | 0011 | 0 | 1 | 0 | 1 | 1 | 0 | 1 | 0 |

As is conventional in keyboards of this class, no "zero" key is provided. However, in the excess-three binary code, a decimal "zero" is represented by the binary number 0011, and means is therefore provided for energizing the corresponding conductors when all of the keys are released. This is the office of the above-mentioned normally closed contacts. These contacts are all connected in series, one end of the series circuit being connected to the +15 volt bus 133 and the other end being connected to the positive terminal of each of four diodes 134, 135, 136 and 137. The negative terminals of these four diodes are connected respectively to the conductors *h1*, *h2*, *h3′*, and *h4′*, and serve to apply the +15 volt potential to those conductors whenever all nine keys are released. Depression of any key interrupts the circuit so as to leave them under the control of the normally open contacts. The diodes 134–137 are provided to prevent feed-back from one conductor to the other when one of the nine keys is depressed. The circuits for the "*j*" and "*k*" columns are identical to the "*h*" column circuits above-described.

Depression of any of the nine keys in any column serves to apply the +15 volt potential to only four of the eight associated conductors. The other four conductors, which are all connected to normally open key switch contacts, are held at ground potential or zero volts by a clamping system. FIGURE 19 shows the clamping system used with conductor pair *h1*, *h1′*, it being understood that similar clamping systems are used for all of the other pairs. As is shown in FIGURE 19, each of the conductors is connected to ground through a diode 138 oriented with its positive terminal grounded. The conductor is also connected through a high resistance 140 to supply bus 141 which will be understood to be connected to a suitable source of a relatively high negative potential.

When the conductor *h1*, for example, is not connected through one of the keyboard switches to the positive bus 133, current will flow from ground through the diode 138 in the direction of the arrowhead on FIGURE 18 and through the high resistance 140 to the negative supply bus 141. With the current flowing in this direction, the resistance of the diode 138 is extremely low and substantially no voltage drop occurs across the diode. As a consequence, the conductor *h1* is held substantially at ground potential or zero volts. However, when, as a consequence of depressing one of the keys, a +15 volt potential is applied to the conductor *h1*, the polarity of the diode 138 is reversed tending to cause current flow in the opposite direction. Under these conditions, the diode has an extremely high resistance and thus has substantially no effect on the conductor voltage.

By depressing the appropriate keys in the word address columns *h*, *j*, and *k*, the three corresponding groups of eight conductors are energized in such wise as to produce a binary signal, designating in excess-three notation, the word desired. The 896 words of each channel are identified by corresponding word identification signals recorded on the control channel F. These signals comprise 1's and 0's recorded in the first twelve pulse spaces of each word space and designate the various word numbers according to the excess-three code. Selection of the designated word is effected by comparing the signal produced by the keyboard setting with each word identification signal as it is read from the F channel, and producing a control signal when identity of the two is established. The comparison is made by a logic network controlling a flip-flop which produces the control signal.

The word identification signals are read from the F channel by the F channel read head Fr. As is shown in FIGURE 20, the signals produced by the head Fr are amplified by a dual channel read amplifier Far/Far′. This read amplifier, which is typical of other read amplifiers used in the present invention, is of known construction as may be seen from FIGURE 21. The read head Fr preferably has a center-tapped winding 142 providing two outputs which are applied to corresponding input terminals 143 and 144. The amplifier has two output terminals 145 and 146, and the circuit operates to produce on output terminal 145 a negative-going pulse whenever the recorded information changes from a "0" to a "1," and to produce such a pulse on the other output terminal 146 whenever the change is from "1" to "0." These two output terminals are designated "true" and "false" respectively, and the output signals are designated "Far" and "Far'" to correspond.

Since the output signals F*ar* and F*ar'* identify only the time and direction of change of the recorded data, a pulse shaping or buffer flip-flop F*b* (FIGURE 20) is used to produce signals representative of the recorded data, the true and false input terminals of flip-flop F*b* being connected to corresponding output terminals of the read amplifier F*ar*/F*ar'*, as indicated at 147 and 148. Thus, a negative-going F*ar* signal representing a change from "0" to "1" will trip flip-flop F*b* to its true state to produce an output signal F*b* representing one or more 1's, depending on its duration. The signal F*b* will continue until the recorded data changes to "0" and produces the output signal F*ar'*. This negative pulse, applied to the false input terminal of F*b*, will trigger the flip-flop to its false condition and produce an output signal F*b'* representing 0's.

The logic equations defining the above-described arrangement are:

$$(\underline{Far})=Fr$$
$$(\underline{Far'})=Fr'$$
$$\underline{Fb}=Far$$
$$\underline{Fb'}=Far'$$

Because all operations are synchronized by the timing or clock signal recorded on the aforementioned clock channel, and because of circuit delays encountered in the read amplifier F*ar*/F*ar'*, the signals F*b* and F*b'* are used to control an input flip-flop F, the operation of which is gated to the clock signal C as shown in FIGURE 20. The clock signal C is represented in FIGURE 22, which is a timing chart showing the clock signal and other timing and control signals derived therefrom.

Figure 22:
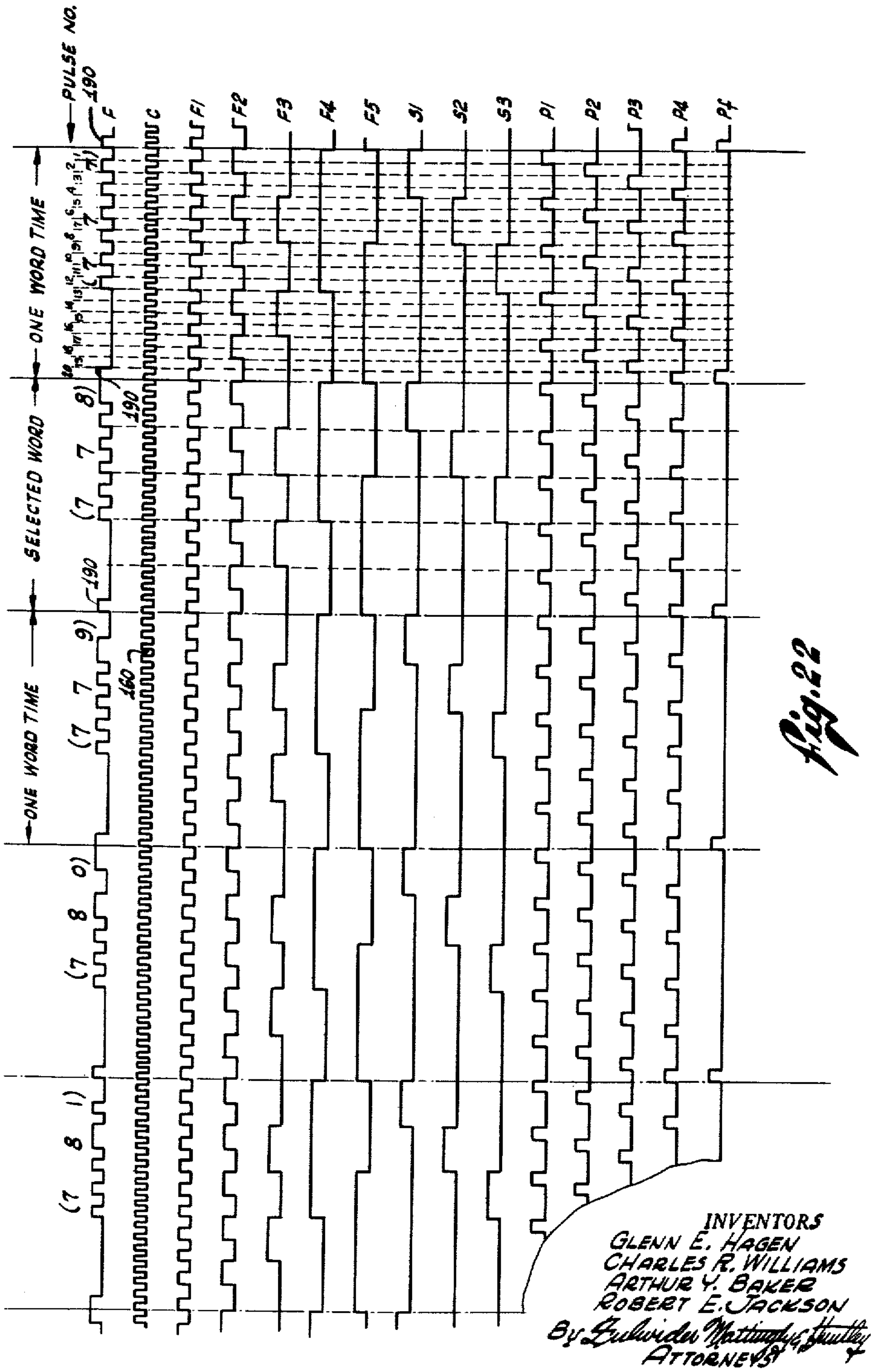
FIGURE 22 is a timing chart showing the relative timing of various signals produced by the basic timing circuitry.

In FIGURE 22 the sequence of operation is from right to left, any condition or action represented at any given point occurring after all actions or conditions to the right of that point, and before any actions or conditions to the left of that point. As is shown in FIGURE 22, the clock signal (which is permanently recorded on the drum in the clock channel) has a rectangular wave pattern.

Figures 23, 24:
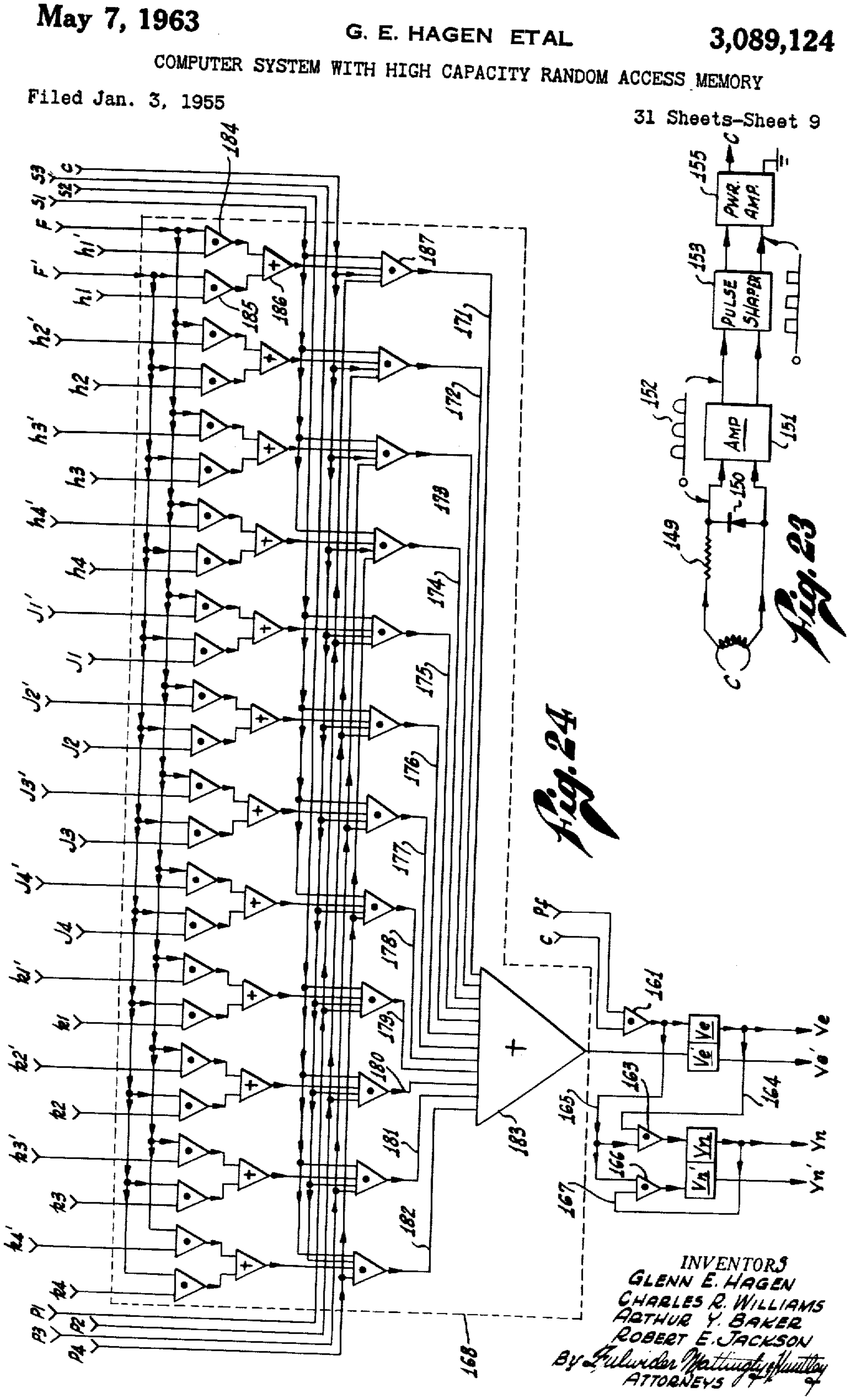
FIGURE 23 is a schematic diagram showing the clock read head and associated components comprising the clock read circuitry.
FIGURE 24 is a schematic diagram of the word selection portion of the apparatus showing the flip-flops and gating networks associated therewith.

The clock signal is reproduced from the drum by an appropriate read head, amplifiers, and the like, as shown in FIGURE 23. As is shown therein, a clipper comprising resistance 149 and diode 150 is interposed between the read head C and an amplifier 151 to eliminate the negative half cycle in the manner indicated at 152. The resulting signal is amplified by the amplifier 151 and passed to a pulse shaper 153 which gives the signal its desired rectangular form, as indicated in the drawing at 154. The shaped signal is amplified by a power amplifier 155, the output of which constitutes the clock signal C, above referred to. The amplifier 151 may be of conventional construction, and any suitable pulse shaper 153 may be used. A properly controlled blocking oscillator has been found to constitute a pulse shaper well suited to the use described.

The operation of the input flip-flop F is controlled by the clock signal C, and the signals F*b* and F*b'*, and by output signals F and F' taken from the output terminal of the flip-flop F, by the circuit arrangement shown in FIGURE 20. A true input "and" gate 156 is connected to the true input F as shown at 157, and a similar gate 158 is connected to the false input F' as indicated at 159. Each gate has three inputs connected as shown, these connections and the operation of the input flip-flop F being defined by the following logic equations:

$$\underline{F}=Fb\ F'\ C$$
$$\underline{F'}=Fb'\ F\ C$$

Flip-flop F, timed by the clock signal C as described below, follows F*b*, producing a signal F representing 1's in response to a similar signal F*b* produced by F*b*, and producing a signal F' representing 0's in response to a similar signal F*b'* produced by F*b*. The terms F' and F in the logic for F and F', respectively, require F to be in the logic for F and F', respectively, require F to be off before it can receive an "on" trigger, and vice versa, thus protecting against faulty operation which might result if triggering signals were inadvertently applied to both input terminals at the same time.

The clock signal C appearing in the logic for both F and F' provides the required negative-going trigger pulses. As is shown in FIGURE 22, a single cycle of the clock signal occupying a single pulse time comprises a negative half cycle followed by a positive half cycle, the signal falling from the positive value to the negative value at the end of each pulse time as indicated at 160. It is this "fall of the clock" that produces the required negative-going pulse. Since this pulse occurs at the end of the pulse time, the flip-flop is triggered to be in its new condition the following pulse time.

The operation of the flip-flop F under the conditions described will be apparent from the ensuing example. Let it be assumed that the beginning of a given pulse time, the flip-flop F is "off," producing the signal F', and that flip-flop F*b* is "on," producing the signal F*b*. This satisfies two of the three conditions (F*b* F' C) required to produce a positive output signal from the "and" gate 156. The third condition is satisfied midway of the given pulse time when the clock signal goes to its positive half cycle. As a result, a positive voltage is at this time applied as at 157 to the true input terminal of the flip-flop F, but no operation results because the flip-flop will not respond to a positive-going pulse.

At the end of the given pulse time, the clock falls, the gating conditions are no longer met, and the voltage on the true input terminal of F falls to zero. This negative pulse triggers the flip-flop to be "on" during the next pulse time. In other words, the operating conditions are defined by two factors; i.e., the input signal configuration F*b* F' and the clock signal C. The input signal configuration may be thought of as cocking the mechanism and the fall of the clock as pulling the trigger.

Thus, the F signal appears one pulse later than the F*b* signal which produced it. All flip-flops which are gated to the clock delay the signals one pulse time in a like manner. A driver, on the other hand, does not produce such a delay, since it is not gated to the clock and its output signals follow the input signal, changing at the same time and persisting only so long as the input signal persists.

As previously stated, the word identification signals are recorded on the F channel which is read by the read head F*r*. The reproduced signals appear at the outputs of the flip-flop F as signals F and F' which are compared with the keyboard signals to produce the previously mentioned control signal when the designated word is found. The apparatus for producing this control signal is shown in FIGURE 24 and comprises a flip-flop V*n* and its associated controls which are so arranged that V*n* is "on" during the time the selected word is passing under the main memory read head M*r*, and "off" for all other times.

Flip-flop V*n* is controlled by a comparison flip-flop V*c* which is controlled in turn by the gating network shown on FIGURE 24. The word identification numbers which are recorded in the first twelve bits of each word space in the F channel precede the words which they identify, so that when the designated word number is found, it is known that the next following word is the designated word. Accordingly, the control for $\underline{Vn}$ is arranged to turn $\underline{Vn}$ "on" whenever $\underline{Ve}$ is "on" at the twentieth pulse time, and to turn $\underline{Vn}$ "off" twenty pulses later; the control for $\underline{Ve}$ is arranged to turn $\underline{Ve}$ "on" for the first pulse of every word, and to turn it "off" as soon as the keyboard and F channel word designations differ. Thus, $\underline{Ve}$ remains "on" at the twentieth pulse time only for the one word where the keyboard and F channel designations are identical, and $\underline{Vn}$ is turned "on" only during the time the designated word is passing under the main memory read head $\underline{Mr}$.

The control for turning $\underline{Ve}$ on at the beginning of each word time comprises the gate 161 (FIGURE 24) controlled by signals $Pf$ and C and connected to the true input terminal of $\underline{Ve}$ as shown at 162, the circuit arrangement being defined by the following logic equation:

$$\underline{Ve} = Pf\ C$$

The signal $Pf$ is a timing signal, the production of which is described hereinafter. As will then be understood, the signal $Pf$ is on during the twentieth or final pulse time only of each word time.

The control for turning $\underline{Vn}$ on is effected by the gate 163 which is connected to the true input of $\underline{Vn}$ and which has as inputs the signal $Ve$ taken from the flip-flop $\underline{Ve}$ as shown at 164 and the signal configuration $Pf$ C taken from the output of the gate 161 as indicated at 165. $\underline{Vn}$ is turned off by the output of a gate 166 connected to the false input terminal and having as inputs the aforementioned signal configuration $Pf$ C and a signal $Vn$ taken from the true output of $\underline{Vn}$ as shown at 167. This control for $\underline{Vn}$ is defined by the following logic equations:

$$\underline{Vn} = Ve\ Pf\ C$$
$$\underline{Vn'} = Vn\ Pf\ C$$

As stated above, $\underline{Ve}$ is turned off as soon as the keyboard and F channel word designations differ. In this connection, it will be realized that the twelve bits comprising the F channel designation are presented sequentially on one pair of conductors by the flip-flop $\underline{F}$, whereas the keyboard designation is presented statically on twelve pairs of conductors. This requires that each F channel signal be compared with a different pair of keyboard conductors. Thus, at the first pulse time, the F channel signals are compared with the signals on conductors $\underline{h1}$ and $\underline{h1'}$; at the second pulse time they are compared with the signals on $\underline{h2}$ and $\underline{h2'}$; then with $\underline{h3}$ and $\underline{h3'}$, and so on until all twelve bits have been thus compared. Also, since $\underline{Ve}$ is to be turned off by a difference between the two designations, the true of one is compared with the false of the other, and vice versa, to provide an actuating output signal whenever a 1 and a 0 coincide. The mechanism for controlling $\underline{Ve}$ in this fashion comprises the gating network shown on FIGURE 24 within the dashed line 168 as defined by the following logic equation:

| | Pulse Number | Digit and bit number |
|---|---|---|
| $\underline{Ve'}$ = (S1 P1)(F $h1'$ + F' $h1$)C | 1 | 1-1 |
| +(S1 P2)(F $h2'$ + F' $h2$)C | 2 | 1-2 |
| +(S1 P3)(F $h3'$ + F' $h3$)C | 3 | 1-3 |
| +(S1 P4)(F $h4'$ + F' $h4$)C | 4 | 1-4 |
| +(S2 P1)(F $j1'$ + F' $j1$)C | 5 | 2-1 |
| +(S2 P2)(F $j2'$ + F' $j2$)C | 6 | 2-2 |
| +(S2 P3)(F $j3'$ + F' $j3$)C | 7 | 2-3 |
| +(S2 P4)(F $j4'$ + F' $j4$)C | 8 | 2-4 |
| +(S3 P1)(F $k1'$ + F' $k1$)C | 9 | 3-1 |
| +(S3 P2)(F $k2'$ + F' $k2$)C | 10 | 3-2 |
| +(S3 P3)(F $k3'$ + F' $k3$)C | 11 | 3-3 |
| +(S3 P4)(F $k4'$ + F' $k4$)C | 12 | 3-4 |

In the above, the signals enclosed by the first parentheses in each line comprise timing signals, the production of which will be explained hereinafter. As will then be apparent, the signals S1, S2, and S3 coincide with the first, second, and third syllables respectively of each word, whereas the signals P1, P2, P3, and P4 coincide with the first, second, third, and fourth bits respectively of each syllable. It is seen, therefore, that the pairs of signals enclosed by the first parentheses in each line define the first twelve bits of each word, as indicated by the tabulation at the right of the equation.

The signals enclosed in the second parentheses of each line of the equation above comprise the word designating the signals which are compared as indicated. Thus, the signal F is compared with the signals on the twelve "false" keyboard conductors, and the signal F' is compared with the signals on the twelve "true" keyboard conductors. The only time the result of any such a comparison can affect $\underline{Ve}$ is during the one pulse defined by the accompanying timing signals enclosed in the first parentheses.

It will be appreciated that in FIGURE 24, as in the other detailed circuit diagrams including in the drawings and herein described, there is shown by way of example one arrangement of gates, circuits, and the like, conforming to the logic equation given, and that other arrangements may be used which are equivalent in all respects and which are defined by the same logic equation, the precise arrangement depending, in part, on the manner in which the equation is factored or expanded, and the degree to which relatively complex networks are subdivided into individual gates for the purpose of illustration.

The twelve lines of the above equation thus may be considered as defining twelve separate control circuits such as are shown at 171 to 182 in FIGURE 24, each such circuit being operative through an "or" gate 183 to turn $\underline{Ve}$ off during a different pulse time as defined by the signal configuration enclosed in the first parentheses. Each circuit is inoperative at all other times.

In each of the twelve circuits, the F signal is compared with a "false" keyboard signal in an "and" gate 184, and the F' signal is compared with a "true" keyboard signal in an "and" gate 185, the outputs from gates 184 and 185 constituting the inputs to an "or" gate 186. The output from the "or" gate 186 is combined in an "and" gate 187 with the appropriate timing signals and the clock signal C, the outputs from the gates 187 constituting the inputs to the control circuits 171–182.

During the one pulse time that each control circuit is operative, it will turn $\underline{Ve}$ off if the F channel designation is then a 1 and the keyboard designation is a 0, or vice versa; otherwise $\underline{Ve}$ remains on. Thus, $\underline{Ve}$ will remain on so long as the two designations agree, and is turned off as soon as a difference is encountered. Therefore, $\underline{Ve}$ will always be off at the twentieth pulse except in the one case where all twelve bits of the keyboard and F channel designations agree. In this one case, $\underline{Vn}$ is turned on as previously described, and remains on during the time the designated word is passing under the read head $\underline{Mr}$.

*Basic Timing.*—The aforementioned timing signals are all derived from the clock signal C and a synchronizing pulse 190 (see FIGURE 22) recorded in the F channel as the final or twentieth bit of each word time. These signals are shown on FIGURE 22 along with the other timing signals similarly derived, and are produced by a group of gates flip-flops, and drivers (referred to generally as the "F chain") arranged as shown in FIGURE 25.

An understanding of the construction and operation of the F chain will be facilitated by assuming that the F4 signal has the wave form illustrated in FIGURE 22, that is, "on" for the first twelve pulse times and "off" for the last eight. The validity of the assumption will appear from the ensuing description. In accordance with this assumption it will be seen that the period during which F4 is off (the last eight pulses) defines that portion of each word time of the F channel in which there is no recording on the F channel except the synchronizing pulse 190 at the twentieth pulse time. Thus, the twentieth pulse of each word time is uniquely defined by the coincidence of an F signal with the "off" portion of the F4 signal. It is this coincidence which is used to develop the signal P*f* which, as can be seen from FIGURE 22, consists of a single pulse occurring during the twentieth pulse time of each word. This signal is developed by applying to an "and" gate 191 the F signal as indicated at 192 and an F4′ signal as indicated at 193, the F4′ signal being taken from the "false" output of a flip-flop F4, as shown. The resulting coincidence signal is applied as indicated at 194 to the input of a driver P*f* to produce the output timing signal P*f* shown on FIGURE 22.

Figure 25:
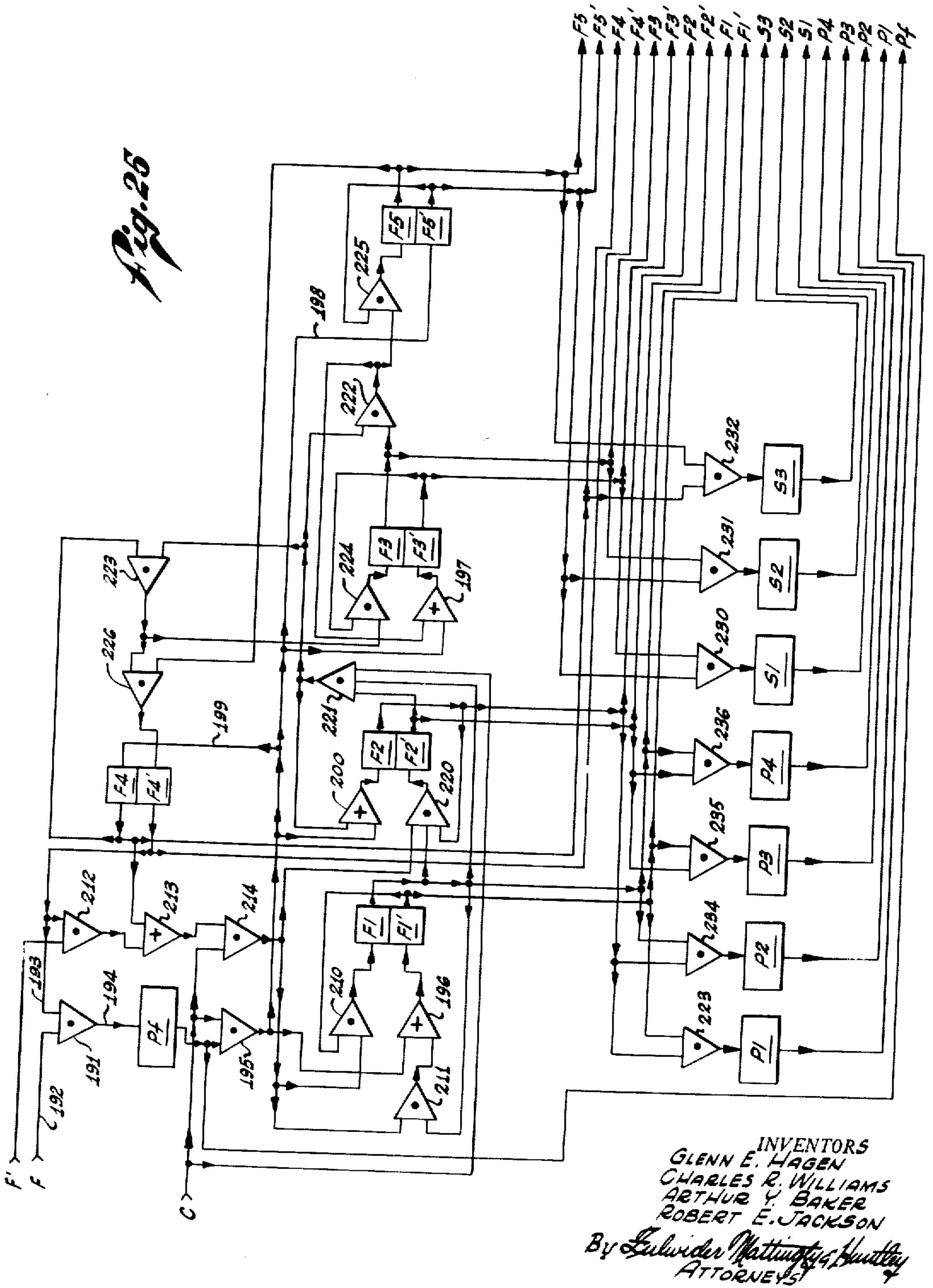
FIGURE 25 is a schematic diagram showing the various flip-flops, drivers, and gating networks comprising the basic timing circuitry herein designated as the "F" chain.

The remainder of the F chain comprises a series of five flip-flops designated F1, F2, F3, F4, and F5, seven drivers designated P1, P2, P3, P4, S1, S2, and S3, and associated gates, arranged as shown in FIGURE 25. The various timing signals shown on FIGURE 22 are taken from the true output terminals of these flip-flops and drivers. The signals taken from the "false" outputs are not shown, but it will be understood that they are the complements of the signals shown. The circuitry of the F chain is defined by the following equations:

$$(\underline{Pf})=F\ F4'$$
$$\underline{F1}=(F4+F'\ F4')F1'\ C$$
$$\underline{F1'}=(F4+F'\ F4')F1\ C+Pf\ C$$
$$\underline{F2}=F1\ F2'\ C+Pf\ C$$
$$\underline{F2'}=(F4+F'\ F4')F1\ F2\ C$$
$$\underline{F3}=(F1\ F2'\ F4)F3'\ C$$
$$\underline{F3'}=F1\ F2'\ F3\ C+Pf\ C$$
$$\underline{F4}=Pf\ C$$
$$\underline{F4'}=F1\ F2'\ F5\ F4\ C$$
$$\underline{F5}=(F1\ F2'\ F3)F5'\ C$$
$$\underline{F5'}=Pf\ C$$
$$(\underline{P1})=F2\ F1'$$
$$(\underline{P2})=F2\ F1$$
$$(\underline{P3})=F2'\ F1'$$
$$(\underline{P4})=F2'\ F1$$
$$(\underline{S1})=F5'\ F3'$$
$$(\underline{S2})=F5'\ F3$$
$$(\underline{S3})=F5\ F4$$

The signal P*f* is combined in an "and" gate 195 (FIGURE 25) with the clock signal C to provide a synchronizing signal P*f* C which is applied to the "off" inputs of flip-flops F1 and F3 through "or" gates 196 and 197, and directly to the "off" input of flip-flop F5 as shown at 198. The synchronizing signal P*f* C is also applied directly to the "on" input of flip-flop F4 as indicated at 199, and to the "on" input of flip-flop F2 through an "or" gate 200. Thus, flip-flops F1, F3, F5 will be actuated by the signal P*f* C at the end of the twentieth pulse time to be in their false state during the first pulse time at least of the following word. In the same way flip-flops F2 and F4 will be actuated by the P*f* C signal to be on at the first pulse time. The signal P*f* C thus synchronizes the F chain by setting all of the flip-flops to predetermined initial conditions.

As shown by the logic set forth above, flip-flop F1 is off during the first pulse time, and thereafter alternates between off and on once each pulse time, being on during the even numbered pulses and off during the odd number pulses. It is turned on by the clock signal C whenever it is off, and it is turned off by the clock signal C whenever it is on, the signals F1′ and F1 being combined in "and" gates 210 and 211 respectively with a signal (*F4*+*F′ F4′*) C. This latter signal is obtained by combining F′ and F4′ in an "and" gate 212, the resulting F′ F4′ signal being applied to an "or" gate 213 along with the signal F4, and the output (*F4*+*F′ F4′*) from the "or" gate 213 being combined with the clock signal C in an "and" gate 214. As may be seen from FIGURE 22, the signal *F4*+*F′ F4′*), which control the "on" side of flip-flop F1 and which is also applied as one of the inputs to the "or" gate 196 controlling the "off" input of the flip-flop F1, defines the first nineteen pulses during which time the alternating control of F1 is operative. The alternating control is thus rendered inoperative during the twentienth pulse to ensure that the synchronizing signal P*f* C will control exclusively at that time Flip-flop F2 also alternates on and off, but at half the frequency of F1, as may be seen from FIGURE 22. It is turned on by the synchronizing signal P*f* C as previously explained, and is turned off thereafter by the clock signal C whenever it is on and F1 is also on. This control is limited to the first nineteen pulses by combining in an "and" gate 220 signals F1 and F2 with the signal (*F4*+*F4′ F4′*) C from gate 214. Flip-flop F2 is turned on by the clock signal C whenever it is off and F1 is on. To this end, signals F1, F2′ and C are combined in an "and" gate 211 which supplies one of the inputs to the "or" gate 200. It will be seen that since F2 cannot be controlled while F1 is off its alternating control operates at one half the frequency of the alternations of F1; that is, every two pulses.

Flip-flop F3 is caused to alternate at half the frequency of F2 by limiting its control by the clock signal C to the times when F1 is on and F2 is off, so that F3 is on for four pulse times and off for four. In this way, F3 is caused to be on during the even numbered syllables, and off during the odd. To this end, a signal F1 F2′ C taken from the gate 221 is combined with a signal F3 in an "and" gate 222, the output from which is applied as one of the inputs to the gate 197 controlling the false input to F3. The signal F1 F2′ C from gate 221 is combined in an "and" gate 223 with a signal F4, and the resulting coincidence signal F1 F2′ F4 C is combined in an "and" gate 224 with a signal F3′ and applied to the "on" input to F3. Thus, at the times F1 and F2 are on and off, respectively, F3 will be turned off by the clock signal C if F3 is on, and will be turned on by the clock signal C if it is off, providing F4 is also on. Since F4 is on (as initially assumed) only during the first three syllables, the signal F4 is included in the condition controlling the "on" side of F3 to prevent the application of an "on" trigger at the twentieth pulse in conflict with the "off" trigger P*f* C.

The circuitry for controlling flip-flop F5 is arranged to cause it to be off during the first two syllables and on for the last three. This is accomplished by turning it off at the start of each word by the synchronizing signal P*f* C as explained, and turning it on by the clock signal C when it is at the time F1 and F3 are both on and F2 is at that time off. Accordingly, a signal F1 F2′ F3 C taken from the gate 222 is combined in an "and" gate 225 with a signal F5′ to provide the control signal for the "on" side of F5. As may be seen from FIGURE 22 and what has gone before, the first time that F1 and F3 are on and F2 is off is the eighth pulse, so that F5 comes on for the ninth and following pulse times. The signal P*f* C at the twentienth pulse actuates F5 to be off from the first to eighth pulses, inclusive.

Flip-flop F4 is turned on by the synchronizing signal P*f* C as above explained, and the circuits are arranged to cause it to remain on until it is turned off by the clock signal C when F1 and F5 are both on and F2 is off. Accordingly, a signal F1 F2′ F4 C taken from the gate 223 is combined in an "and" gate 226 with a signal F5, and the resulting coincidence signal is applied to the "off" side of F4. It will be seen that the input condition F1 F2′ F4 F5 is satisfied for the first time during the twelfth pulse, so that flip-flop F4 is caused to occupy its false condition from and after the thirteenth pulse time. Since the only signal which will change F4 to its true condition is the synchronizing signal P*f* C, it stays off for the last eight pulses, as shown in FIGURE 22, and as initially assumed.

In the foregoing explanation, it was assumed that the synchronizing signal Pf C was produced at the first reading of the synchronizing pulse 190 by the F channel read head. This assumption is valid only if flip-flop F4 is at that time in its false state, otherwise the synchronizing signal Pf C will not be produced. Such a signal will be produced, however, one word time later, because the next time the synchronizing pulse 190 comes under the F channel read head, the flip-flop F4 must necessarily be in the off condition, the F chain control being such as to turn flip-flop F4 off once and only once during such following word time.

As will more clearly appear hereinafter, the outputs from the flip-flops F1, F2, F3, F4, and F5, and from the driver Pf are used to control the times and conditions under which certain operations occur. It will be seen, for example, that F1 identifies the even numbered pulses, while F1' identifies the odd; F2 and F2' distinguish the first half of each syllable from the second; F3 and F3' distinguish the even numbered syllables from the odd; F4 and F4' distinguish the first three syllables from the last two; and F5 and F5' distinguish the first two syllables from the last three.

As previously explained, the control for the comparison flip-flop Ve is arranged so that each of the twelve circuits is operative during a different one only of the first twelve pulse times of each word. This is achieved by suitably combining signals S1, S2, and S3, identifying the first, second, and third syllables of each word, with signals P1, P2, P3, and P4, identifying the first, second, third, and fourth bits of each syllable. All of these signals are obtained from drivers arranged as shown in FIGURE 25 to be controlled by the outputs of the F chain flip-flops F1, F2, F3, F4, and F5.

Signal S1 comprises the output of a driver S1, the input to which is controlled by an "and" gate 230 serving to combine signals F3' and F5', the coincidence of which defines the first syllable of each word. In like fashion, drivers S2 and S3 are controlled by "and" gates 231 and 232 which serve to combine signals F5' and F3, and signals F5 and F4, respectively, to define the second and third syllables of each word. The four bits of each syllable are defined by the outputs of flip-flops F1 and F2, signals F2 and F1' being combined in an "and" gate 233 which controls a driver P1 to produce a signal P1 during the first bit; signals F2 and F1 are combined in an "and" gate 234 which controls a driver P2 to produce a signal P2 during the second bit; signals F2' and F1' are combined in an "and" gate 235 which controls a driver P3 to produce a signal P3 during the third bit; and signals F2' and F1 are combined in an "and" gate 236 which controls a driver P4 to produce a signal P4 during the fourth bit.

Figure 15:
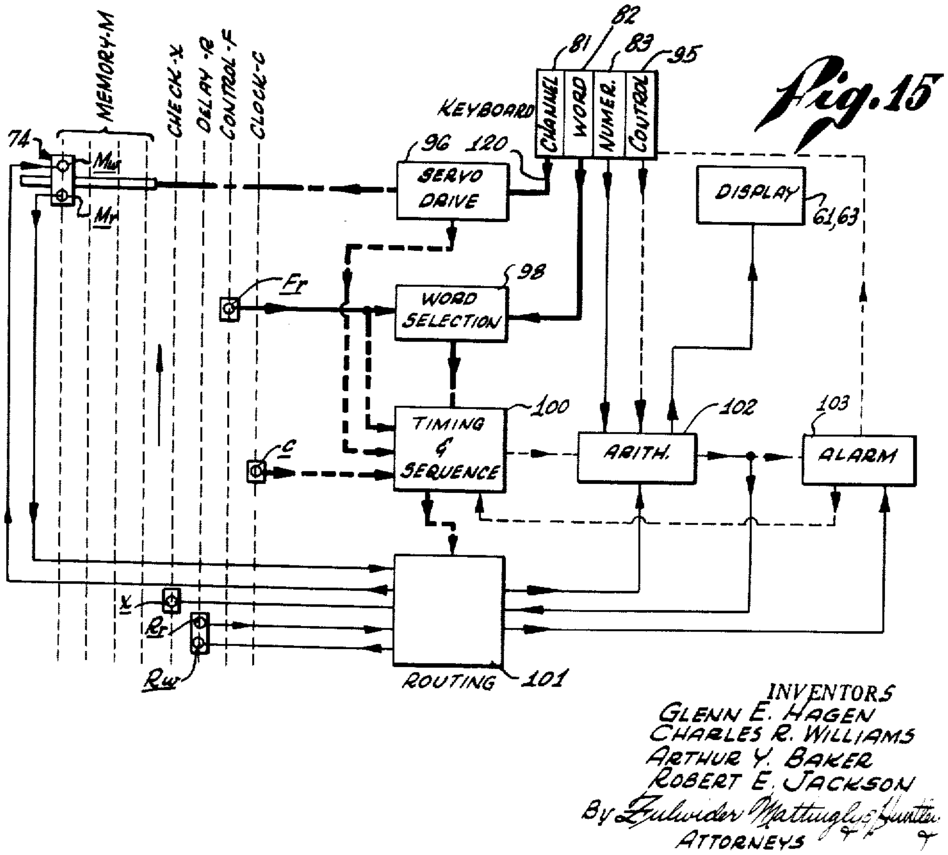
FIGURE 15 is the block diagram of FIGURE 6 reproduced with certain of the interconnections emphasized to indicate the principal functional correlations utilized during Sequence Zero.

Reviewing briefly the word selection operation, it will now be seen that the comparison between the word number designated by the depressed keys in the keyboard and the word identification number read from the F channel is effected in the word selection portion 98 of the apparatus shown in FIGURE 15 of the drawings. This section consists of the comparison flip-flop Ve, the inputs of which are so controlled by the gating network 168 as to turn flip-flop Ve on at the beginning of the word and to turn it off at the first failure of the two numbers to compare. The signals representing the word identification numbers are recorded in the first twelve bits of each word space in the F channel, the words preferably being numbered consecutively around the circumference of the drum. Each word number precedes the word which it identifies, so that when the designated word number is found, it is known that the next following word is the designated word. The comparison is effected sequentially; that is, the least significant bit of the first digit is first tested and one pulse time later the second bit is tried, and so on until all twelve bits of every word number have been tested in this fashion. Flip-flop Ve is turned off whenever, in any bit, the keyboard signal is true and the F channel signal is false, or vice versa.

The binary representations of word numbers 777 through 781 are indicated in the F channel on FIGURE 22, the decimal representation being placed immediately above the pulse pattern and enclosed in parentheses. It is assumed in FIGURE 22 that word number 777 has been designated by the keyboard. Thus, the flip-flop Ve is turned on at the beginning of every word time and is always turned off before the thirteenth pulse time of that word, except in the one instance assumed where the word identification number (777) recorded in the F channel is identical with the keyboard setting. In this one instance, the flip-flop Ve is not turned off, but is on at the twentieth pulse time immediately preceding the designated word. This circumstance is used to control the operation of the flip-flop Vn which is used to mark the selected word time and distinguish it from the other word times.

The signals produced by the flip-flops Ve and Vn thus comprise timing signals based upon identification of the selected word, and are also shown on the timing chart, FIGURE 22. The signal configuration Ve Pf C marks the beginning of the selected word time. Vn is on for the one word time during which the selected word may be read from the drum, and the signal configuration Vn Pf C marks the end of the selected word time. Each of the various sequences following Sequence Zero corresponds to a single revolution of the memory drum, and, for reasons which will become apparent as the description proceeds, the identification of the selected word is used to cause each sequence to start at the time the selected word is read from the memory drum so that the word which is first read in each sequence is the selected word.

As previously mentioned, the operator of the machine, in addition to depressing the appropriate keys defining a particular catalogue number, either presses the read key (to read out the designated data) or sets up in the numerical section of the keyboard the quantity to be added or subtracted from the number contained in the selected word. The appropriate "add" or "subtract" key is operated, depending upon the desired computation. This completes the input operation, all necessary information having then been fed into the machine, the machine is ready to start the automatic phases of the operation. If the channel selected is busy (e.g., previously selected and still in use by another computing device connected to the same main memory apparatus), the machine idles in Sequence Zero until the selected channel is released by the other computing device. When the selected channel is free, the operating cycle advances to Sequence One.

*Sequence One*

Figure 26:
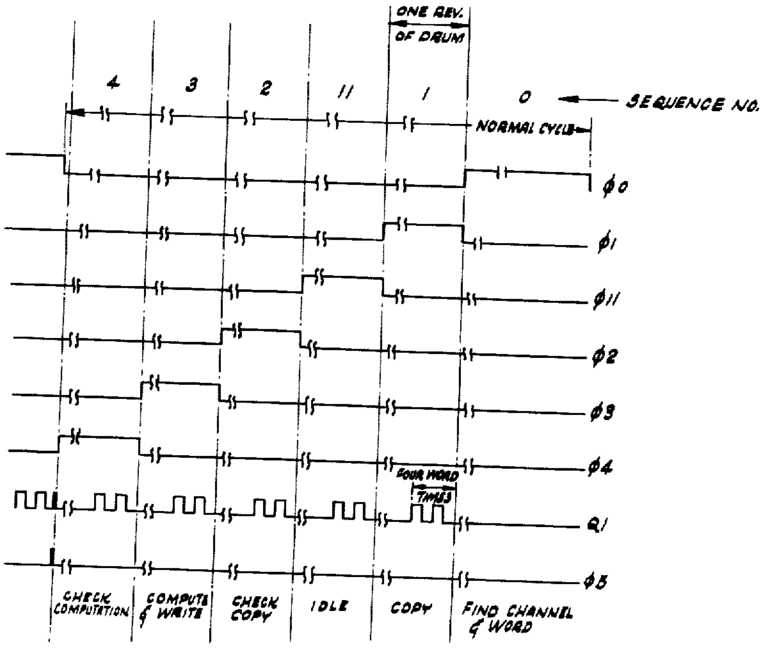
FIGURE 26 is a timing chart showing the succession of phases or sequences of operation comprising a normal cycle of operation.

As previously pointed out, a complete cycle of operation of the machine is divided into a plurality of successive sequences, all of which, except Sequence Zero, last for one revolution of the memory drum. These sequences are defined by a sequence counter consisting of seven flip-flops $\phi 0$, $\phi 1$, $\phi 11$, $\phi 2$, $\phi 3$, $\phi 4$, and $\phi 5$. A particular sequence is defined by the corresponding sequence flip-flop being in its on or true state with the other flip-flops in the opposite condition. This relationship is illustrated in FIGURE 26 which is a time chart showing the character of the true output signals from the flip-flops of the sequence counter during a normal cycle of machine operation. The functions of the machine and its various components are different in each sequence, being controlled during each sequence by signals taken from these sequence flip-flops in a manner which will appear as the description proceeds.

In accordance with the foregoing, Sequence Zero is defined by Sequence flip-flop $\phi 0$ occupying its on condition and the remaining six flip-flops being off. The change from Sequence Zero to Sequence One is effected by turning off the $\underline{\phi 0}$ flip-flop and turning on the $\underline{\phi 1}$ flip-flop in the manner defined by the following logic:

$$\underline{\phi 0}' = (\phi 0 \phi 1' \phi 11' \phi 2' \phi 3' \phi 4' \phi 5')(VePf)(s+t)Sr'C$$

$$\underline{\phi 1} = (\phi 0 \phi 1' \phi 11' \phi 2' \phi 3' \phi 4' \phi 5')(VePf)(s+t)Sr'C$$

The terms included within the first parentheses of the above transfer signal configuration require that in order to transfer to Sequence One, the machine must first be in Sequence Zero with all of the other sequence flip-flops in their off conditions. The *Ve Pf* signal enclosed in the second parentheses sets the time of the transfer as coinciding with the beginning of the selected word. The alternative signals included in the third parentheses are those produced by actuation of the "subtract" and "add" keys respectively, these signals being included to prevent a transfer from Sequence Zero to Sequence One unless such a key has been actuated. The signal S*r*′, which also must be present for the transfer to take place, is a signal transmitted by the channel selecting servo mechanism indicating that the traveling heads have been positioned opposite the selected channel.

Figure 27:
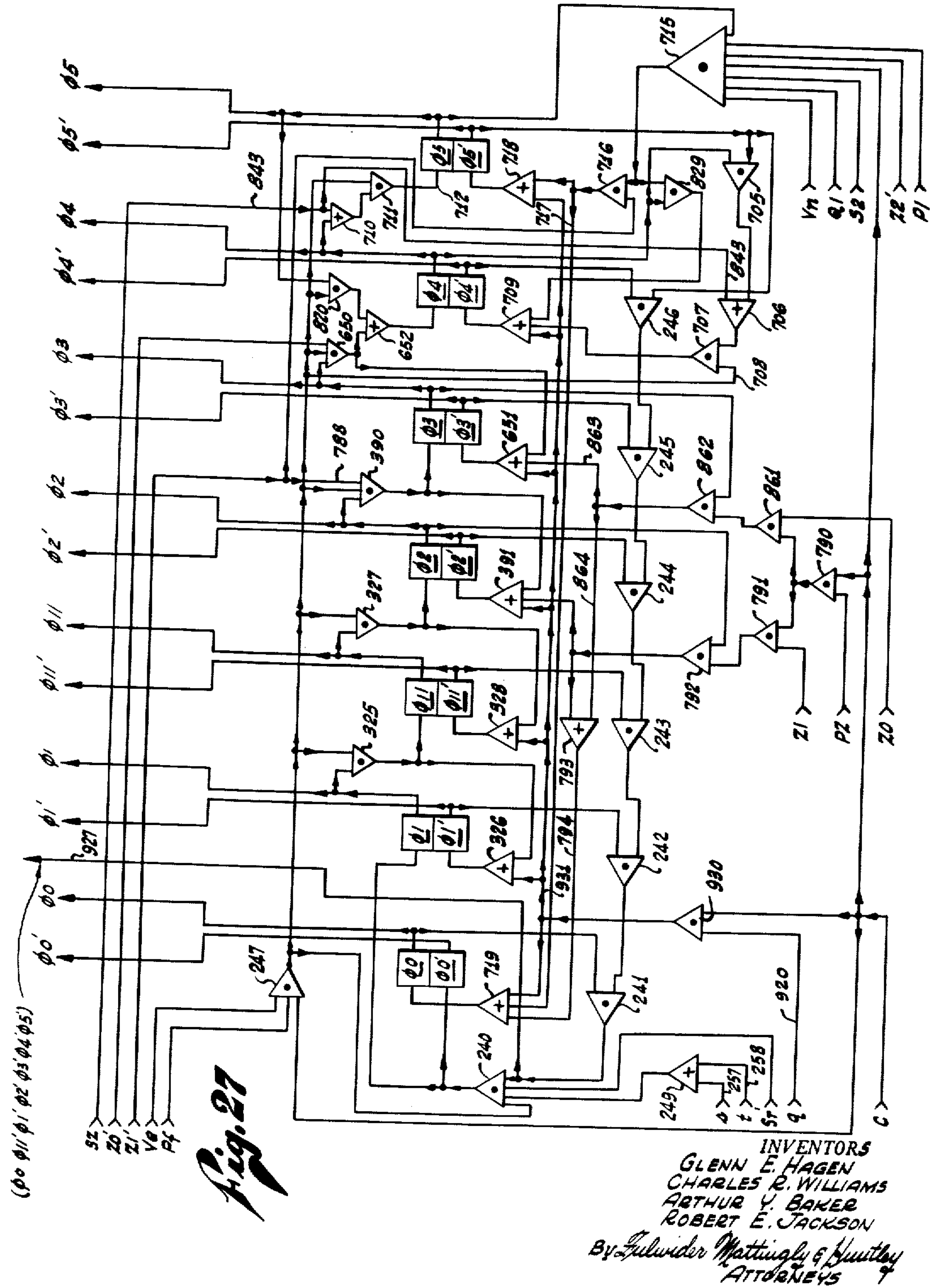
FIGURE 27 is a schematic diagram illustrating the flip-flops, gating networks, and associated circuitry comprising the sequence counter.

The circuit arrangement of the sequence counter is shown in FIGURE 27 from which it will be seen that the "off" input to flip-flop $\underline{\phi 0}$ and the "on" input to flip-flop $\underline{\phi 1}$ are both supplied by an "and" gate 240 having four inputs. One of these inputs comprises the signal configuration represented by the first parenthetical term in the above logic equations, the signals $\phi 0$, $\phi 1'$, $\phi 11'$, $\phi 2'$, $\phi 3'$, $\phi 4'$, and $\phi 5'$ being combined by a series of "and" gates 241, 242, 244 245, and 246. A second input to the gate 240 supplies the signal configuration *Ve Pf* C, these three signals being combined in an "and" gate 247. The third input comprises the signal S*r*′ which is applied as shown at 248, and the fourth input comprises the signal configuration $(s+t)$ produced by an "or" gate 249.

Figure 28:
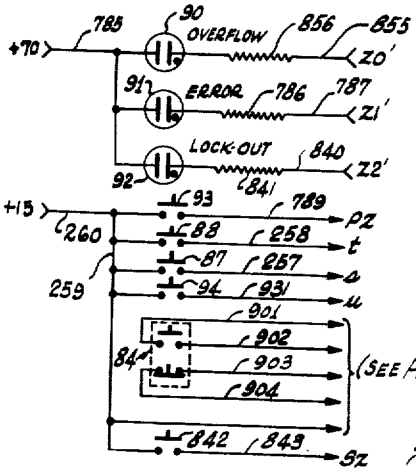
FIGURE 28 is a schematic diagram illustrating the components and wiring associated with various keyboard controls.

The –*s*– and –*t*– signals are produced by actuation of the subtract and add keys 87 and 88, respectively. As is indicated in FIGURE 28, these keys comprise normally open momentary contact switches arranged to connect associated conductors 257 and 258 to a bus 259 which is connected as indicated at 260 to a suitable +15 volt source. Conductors 257 and 258 constitute the two inputs to the "or" gate 249.

The S*r*′ signal is generated by connecting a conductor 261 (FIGURES 1 and 17) to an appropriate source 262 of +15 volt potential through normally closed relay contacts 263 and 264. Contact 264 is attached by a suitable relay mechanism 265 which is in turn controlled as indicated at 266 by the servo-amplifier 126, relay 265 being energized with the drive motor 121 until the traveling heads are aligned with the selected channel. When the heads are so operatively aligned with the selected channel, relay 265 is deenergized, closing contacts 264 and completing the circuit to conductor 261 to produce the required S*r*′ signal.

The S*r*′ signal will be generated as described so long as relay contact 263 is closed. This contact is operated by a relay 267 which is controlled by an access control mechanism 270. The access control mechanism 270 may comprise a plurality of bridge circuits similar to that incorporated in the servo-amplifier 126, each of such bridge circuits serving to compare the channel designating signal 125 from the keyboard with corresponding signals **125*a*–125*e* generated by the keyboards of other computers. If the channel designating signal 125 is the same as any of the other signals 125*a*–125*e*, indicating that the same channel has already been selected by some other keyboard, relay 267 will be energized to open contacts 263**, thus preventing generation of the S*r*′ signal. As soon, however, as any such other keyboard is cleared, the access control device will deenergize relay 267, closing its contacts 263, thus transmitting the S*r*′ signal to the sequence counter.

At the time of transfer from Sequence Zero to Sequence One, flip-flop $\underline{\phi 0}$ is on, and the other flip-flops of the sequence counter are off. In order for the transfer to take place, the selected channel must be free so that the signal S*r*′ is produced, and either the subtract or add keys 87 or 88 must be depressed. When these conditions are satisfied, the transfer takes place upon the next occurrence of the signal group V*e* P*f* C; that is, at the time the reading of the selected word is begun. As is explained hereinafter, Sequence One lasts for one revolution of the memory drum during which time the entire selected channel is read, it being understood that the channel is considered as beginning with the first bit of the selected word and ending with the twentieth bit of the word preceding the selected word.

As previously mentioned, one of the important aspects of this invention comprises the various provisions which have been made to preserve the original data and to guard against the loss or destruction of such information by reason of malfunctioning of the machine, or otherwise. One of the very important phases of this aspect of the invention is the provision of certain apparatus which functions to make and verify a physically separate copy of the original information before any computations are made, and before any changes are made in the recorded data. Accordingly, the principal operation performed during Sequence One is that of copying the entire contents of the selected memory channel into the check channel so that there is no reasonable possibility of the information contained in the main memory channel being lost or destroyed, regardless of the non-functioning or malfunctioning of certain elements. This duplicating of the information also provides a means of checking the numerical computations as is hereinafter described.

Figure 29:
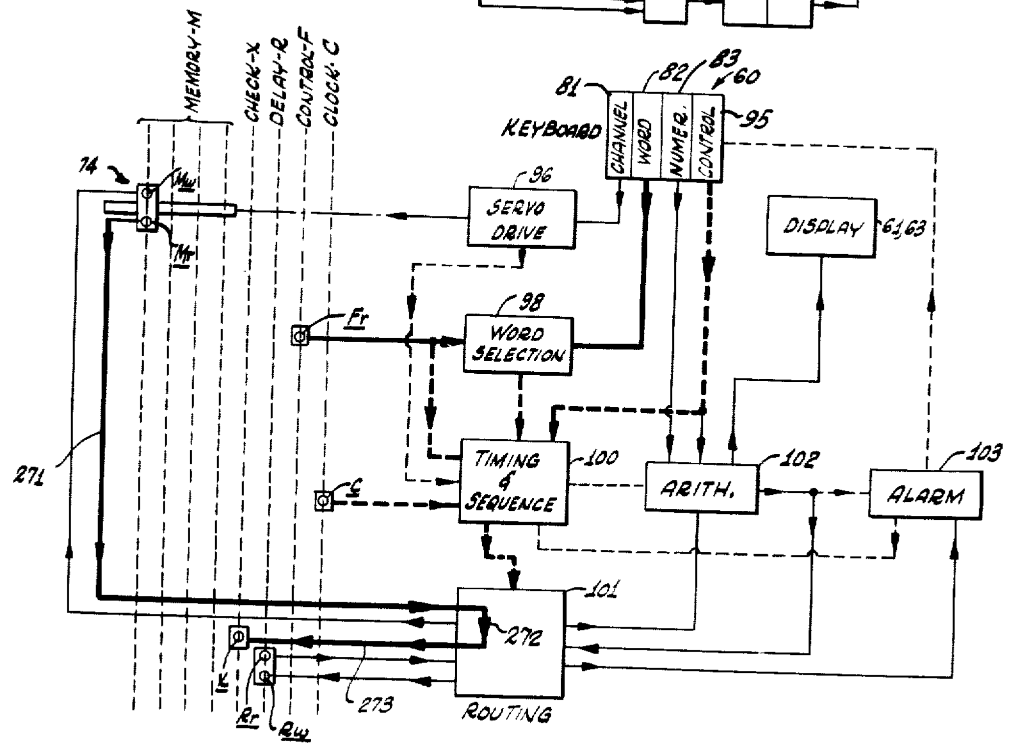
FIGURE 29 is the block diagram of FIGURE 6 reproduced and emphasizing the particular correlations utilized during Sequence One.

The principal circuits that are effective during Sequence One are indicated in heavy outline in FIGURE 29. The output of the main memory read head $\underline{Mr}$ is conducted as indicated at 271 to the routing control 101 and from that as indicated at 272 to the transmisison circuit 273 connected to the check channel head $\underline{X}$.

Figure 30:
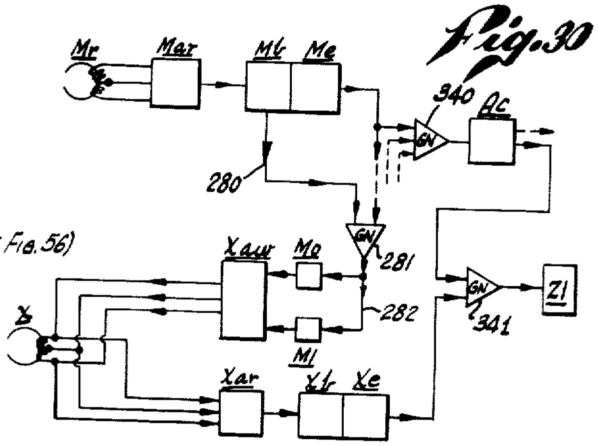
FIGURE 30 is a schematic block diagram illustrating the process of copying the data from a selected main memory channel into a check channel, and the checking of that copying.
Figures 31, 32:
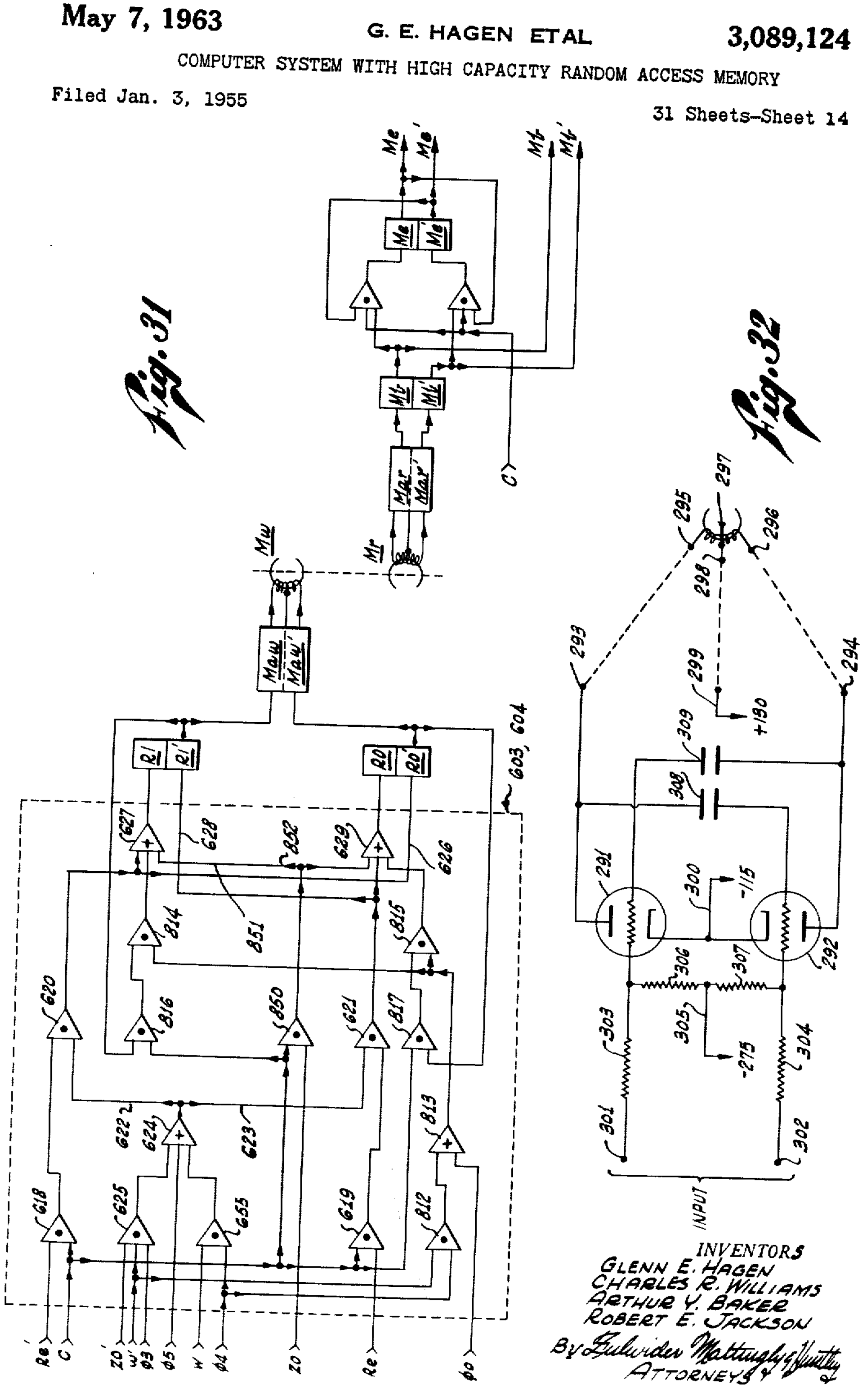
FIGURE 31 is a schematic diagram showing the main memory read and write heads, the amplifiers and flip-flops associated therewith, and the associated control circuits and gating networks, comprising the main memory read circuitry and the main memory write circuitry.
FIGURE 32 is a schematic diagram representing a suitable form of write amplifier used for recording information on the memory drum.

FIGURE 30 is a block diagram of a portion of the circuitry involved in the copying operation. The main memory read head $\underline{Mr}$ is connected to a read amplifier $\underline{Mar}$ which in turn is connected to a buffer flip-flop $\underline{Mb}$ that feeds an input flip-flop $\underline{Mc}$. These components and the associated circuitry are shown in FIGURE 31 and, as may be seen by reference to FIGURE 20, are identical in construction and operation to the F channel read circuitry comprising the read head $\underline{Fr}$, the read amplifier $\underline{Far}$, the buffer flip-flop $\underline{Fb}$, and the input flip-flop $\underline{F}$.

In Sequence One, the data reproduced from the selected main memory channel are taken from the outputs of the buffer flip-flop $\underline{Mb}$, and the signal is fed as indicated at 280 to a gating network 281 whose other input terminals are presently unimportant. From the network 281 the signal is carried as indicated at 282 to a pair of recording flip-flops $\underline{M0}$ and $\underline{M1}$ which serve to drive a check channel write amplifier $\underline{Xaw}$ connected to the check channel head $\underline{X}$.

The check channel write amplifier $\underline{Xaw}$ may comprise any suitable power amplifier, preferably of the dual channel or push-pull type to cooperate with the center-tapped winding provided by the head $\underline{X}$. FIGURE 32 shows schematically a form of write amplifier which is particularly adapted for use as the amplifier $\underline{Xaw}$ as well as for other write amplifiers hereinafter referred to. As is shown in FIGURE 32, the preferred form of write amplifier comprises a pair of thermionic amplifier tubes 291 and 292 having their plates connected to a pair of output terminals 293 and 294. As is indicated in the drawing, the output terminals 293 and 294 will be operatively connected to corresponding end terminals 295 and 296 of the center-tapped head winding 297, and the center-tap 298 will be connected to a suitable source of +130 volt potential as indicated at 299, thus constituting the two halves of the winding 297 the respective load impedance for the tubes 291 and 292. The cathodes of the tubes 291 and 292 are both preferably connected to a suitable source of −115 volt potential as shown at 300.

The grids of the tubes 291 and 292 are connected to associated input terminals 301 and 302 through series resistances 303 and 304, respectively, and are also each connected to a suitable source of −275 volt potential, as indicated at 305, through grid return resistances 306 and 307. Since the input terminals 301 and 302 will be either at zero volts or +15 volts, depending upon the absence or presence of a signal to be recorded, the ohmic values of resistances 303, 304, 306, and 307 are so proportioned with respect to the grid bias supply voltage of −275 and the cathode voltage of −115 as to bias the tubes 291 and 292 substantially at cut-off when the associated input terminal 301, 302 is at zero volts, and to cause the tubes to draw a substantial plate current when the input terminal is at +15 volts. Preferably, condensers 308 and 309 are connected as shown between the plate of one tube and the grid of the other to pass a strong negative pulse to the grid of the other tube when the one tube conducts, thus insuring against faulty operation of the nonconducting tube.

It will be seen that when both input terminals are at zero volts, neither tube draws appreciable plate current. Furthermore, such plate current as may be drawn will be equal in the two tubes, and since this current flows in opposite directions in the two halves of the head winding 297, no magnetization of the recording surface results. However, if a +15 volt signal is applied to one input terminal, the corresponding tube will draw a large plate current which flows in one direction in the associated half of the head winding 297, thus magnetizing the recording medium to one polarity, whereas such a signal applied only to the other terminal will cause the other tube to draw plate current in the opposite direction through the associated half of the head winding 297, thus magnetizing the recording medium to an opposite polarity. Accordingly, signals representative of 1's are applied to one input terminal to produce one polarity of magnetization, and signals representative of 0's are applied to the other input terminal to produce an opposite polarity of magnetization.

The logic equations defining the circuitry represented in the block diagram FIGURE 30 and thus far described are as follows:

$$(\underline{Mar})=Mr$$
$$(\underline{Mar}')=Mr'$$

$$\underline{Mb}=Mar$$
$$\underline{Mb}'=Mar'$$

$$\underline{M0}=\phi 1\ Mb\ M0'\ C+\phi 1'\ M0'\ C$$
$$\underline{M0}=\phi 1\ Mb'\ M0\ C$$

$$\underline{M1}=\phi 1\ Mb'\ M1'\ C+\phi 1'\ M1'\ C$$
$$\underline{M1}'=\phi 1\ Mb\ M1\ C$$

$$(\underline{Xaw})=M1'$$
$$(\underline{Xaw}')=M0'$$

$$(\underline{X})=Xaw$$
$$(\underline{X}')=Xaw'$$

Figure 33:
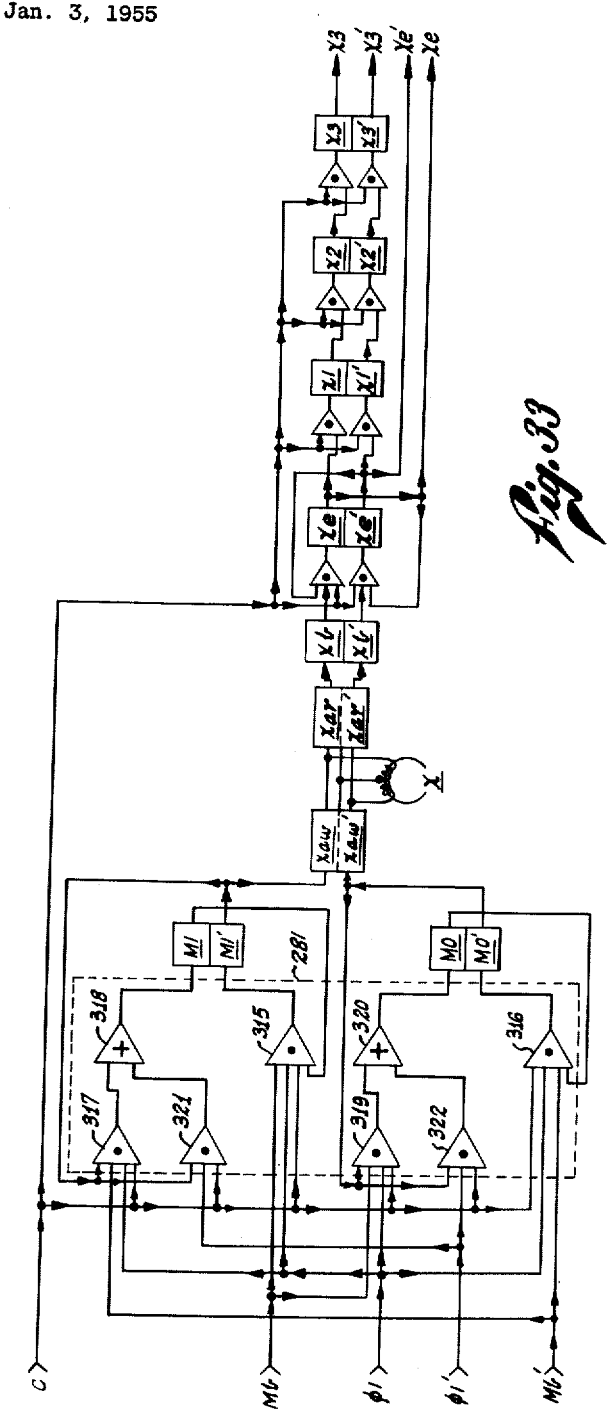
FIGURE 33 is a schematic diagram showing the check channel head and amplifiers, flip-flops, and gating networks associated therewith and comprising the check channel read circuitry and check channel write circuitry.

The check channel write circuitry is shown in FIGURE 33 wherein it will be seen that the input signals for driving the write amplifier Xaw, are taken from the false outputs of recording flip-flops M0 and M1. The false output signal M1′ from flip-flop M1 is used to write 1's in the check channel, and the false output signal M0′ from flip-flop M0 is used to write 0's.

Two flip-flops are used to control the writing or recording function because a single flip-flop can define only two states (e.g., corresponding to commands "write" and "don't write"), whereas three states or conditions are required for control of the writing function. These three conditions correspond to the commands "write 1," "write 0," and "don't write." The first ("write 1") is defined by the signal M1′, the second ("write 0") is defined by the signal M0′, and the third ("don't write") is defined by the signals M0 *and* M1. From the logic given above for M0 and M1, it will be seen that during Sequence One, M1′ follows M*b* to record the 1's, and M0′ follows M*b*′ to record the 0's. When not in Sequence One (i.e., $\phi 1'$), both flip-flops are turned to their true states so that neither M1′ nor M0′ signals are produced, thus limiting the writing in the check channel to Sequence One.

The aforementioned gating network 281 comprises a plurality of gates such as are shown enclosed by the broken line marked 281 in FIGURE 33. Signal M*b* is applied to the false input terminal of flip-flop M1 through an "and" gate 315, and the signal M*b*′ is applied to the false input terminal of flip-flop M0 through an "and" gate 316; both of these gates have three other inputs, two of which comprise the clock signal C and the signal $\phi 1$, to limit operation to Sequence One, the remaining input being the signals M1 and M0 respectively which preclude the possibility of an "off" trigger being applied coincidentally with an "on" trigger. Also, the signal M*b* is applied to the true input of flip-flop M0 through an "and" gate 317 and an "or" gate 318, and the signal M*b*′ is applied to the true input of flip-flop M1 through an "and" gate 319 and an "or" gate 320, for the purpose of causing the flip-flops M0 and M1 to have complementary states during the recording process. As in the case of gates 315 and 316, the signals $\phi 1$ and C and the false output from the associated flip-flop comprise the other inputs to the gates 317 and 319.

Since writing in the check channel occurs only during Sequence One, it is necessary, when not in Sequence One, to set the flip-flops M0 and M1 to the "on" conditions corresponding to the command "don't write." To this end, the second inputs to the "or" gates 318 and 320 are taken from the outputs of associated "and" gates 321 and 322, the inputs to which comprise the signals $\phi 1'$ and C and a signal taken from the false output of the corresponding flip-flop. In this way, both flip-flops M0 and M1 are caused to be on continuously at all times except during Sequence One to thereby hold the inputs of the write amplifier Xaw at zero volts.

Thus, during Sequence One the contents of the entire selected memory channel are read, the information signals appearing at the output terminals of the flip-flop M*b*. These signals, and the information represented thereby, are copied into the check channel through the recording flip-flops M0/M1, the write amplifier Xaw, and the check channel head X, this being accomplished during one revolution of the magnetic drum. When the drum has made one revolution and the selected word again comes under the read head, Sequence One is turned off and Sequence One-One is turned on by that part of the circuitry of FIGURE 27 which is defined by:

$$\underline{\phi 1}'=\phi 1\ Ve\ Pf\ C$$
$$\underline{\phi 11}=\phi 1\ Ve\ Pf\ C$$

The signal configuration V*e* P*f* C, taken from the "and" gate 247, is combined in an "and" gate 325 with the signal $\phi 1$ taken from the true output of flip-flop $\phi 1$, and the resulting coincidence signal is applied to the "on" input terminal of the flip-flop $\phi 11$ and to the "off" input terminal of flip-flop $\phi 1$ through an "or" gate 326. Since the signal configuration $\phi 1$ V*e* P*f* defines the time of reproduction of the last bit of the selected channel, flip-flop $\phi 1$ is turned off and $\phi 11$ is turned on to start Sequence One-One with the reproduction of the first bit of the selected word.

*Sequence One-One*

During this sequence, the main portion of the computer is at rest, the sequence being provided to afford an opportunity for certain electronic circuits, which may have been subjected to considerable shock, to recover so that they may operate in a normal fashion.

Referring again to FIGURES 30 and 33, it will be noted that the check channel write amplifier $\underline{Xaw}$ and the check channel read amplifier $\underline{Xar}$ are both connected to the check channel head $\underline{X}$. Consequently, during recording, a strong signal from the write amplifier $\underline{Xaw}$ is applied to the input of the read amplifier $\underline{Xar}$, and the latter amplifier is designed primarily for relatively weak input signals from the head $\underline{X}$ during a reading function. A strong signal applied to an amplifier intended to operate with a weak signal will normally paralyze or otherwise interfere with the operation of the amplifier unless a short period of time is allowed for the amplifier to recover from its blocked or paralyzed state. By rotating the memory drum one extra revolution during Sequence One-One between the end of Sequence One and the beginning of Sequence Two, ample time is provided to allow the amplifier $\underline{Xar}$ to recover.

The next time the selected word comes beneath the read heads, Sequence One-One is turned off, and Sequence Two is turned on by that part of the circuitry of FIGURE 27 which is defined by:

$$\underline{\phi 11'} = \phi 11\ Ve\ Pf\ C$$
$$\underline{\phi 2} = \phi 11\ Ve\ Pf\ C$$

The signal configuration V*e* P*f* C, taken from the "and" gate 247, is combined in an "and" gate 327 with the signal $\phi 11$, and the resulting coincidence signal is applied to the "on" input terminal of flip-flop $\phi 2$ and to the "off" input terminal of the flip-flop $\phi 11$ through an "or" gate 328. Sequence Two thus starts with the reproduction of the first bit of the selected word.

*Sequence Two*

As previously stated, an important feature of this invention concerns the preservation of the original data by means of a separate copy of such data which is made, as described above, before any computations are performed. In that connection, another important feature of this invention is found in the provision of apparatus for verifying the accuracy of such copy. This is one of the principal functions performed in Sequence Two, during which the copied information in the check channel is compared with the original information in the main memory channel. If any copying error is detected, an alarm is sounded and the machine is "frozen" or locked in this sequence. If no error is found, the machine proceeds to Sequence Three, when the ordered computation is performed. Also, the contents of the numerical section of the keyboard are transferred into a register portion of the arithmetic section during Sequence Two, so that the necessary information is available at the start of Sequence Three to permit immediate computation.

Figure 34:
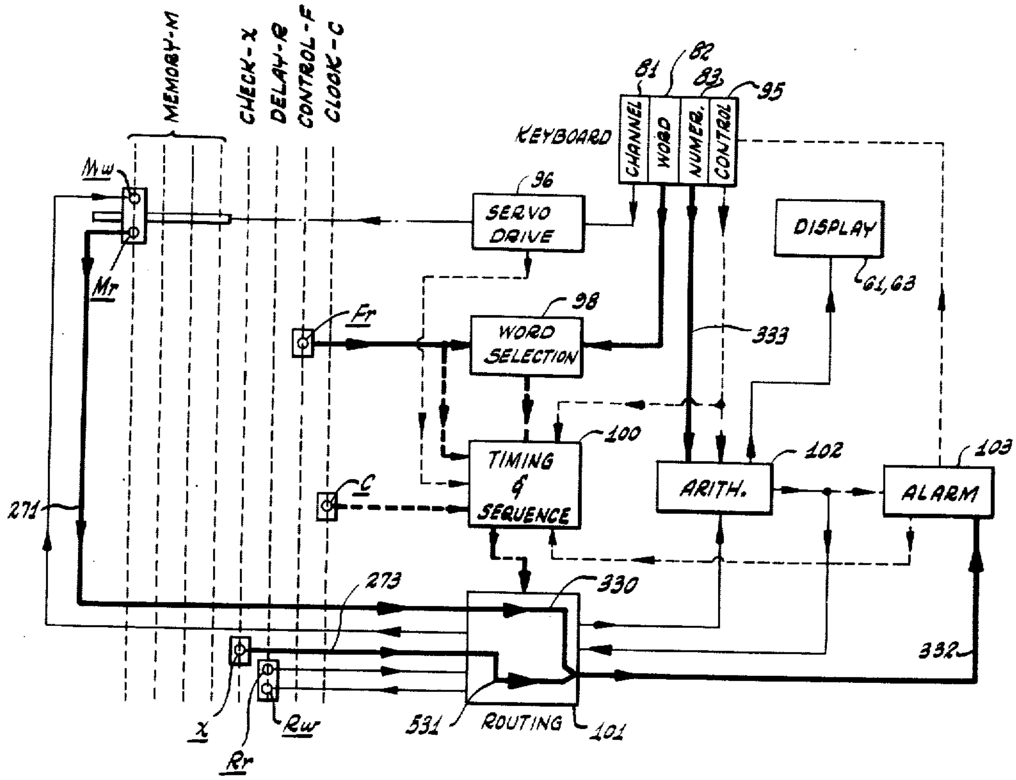
FIGURE 34 is the block diagram of FIGURE 6 reproduced and emphasizing the correlations utilized during Sequence Two.

The operation during Sequence Two is represented diagrammatically in FIGURE 34 where it will be seen that the main memory read head $\underline{Mr}$ is connected as indicated at 271 to the routing control 101, and the check channel head $\underline{X}$ is also connected to that control as indicated at 273. From there as indicated at 330 and 331 a circuit is established to the alarm control 103 as represented at 332. The transfer of the numerical data from the keyboard to the arithmetic section is represented by the heavy line 333.

*Verification of copy.*—To make the necessary comparison between the information recorded in the check channel and that contained in the selected main memory channel, the main memory channel is read by the head $\underline{Mr}$, and the signal, after passing through the read amplifier $\underline{Mar}$, the buffer flip-flop $\underline{Mb}$, and the input flip-flop $\underline{Me}$, as indicated in the block diagram, FIGURE 30, is transmitted through a gating network, 340, to a flip-flop $\underline{Ac}$, the information signals produced by the reading of the selected memory channel appearing at the outputs of this latter flip-flop.

At the same time, the check channel is read by the head $\underline{X}$ and the signal is amplified by the check channel read amplifier $\underline{Xar}$, and after passing through a buffer flip-flop $\underline{Xb}$, is used to operate an input flip-flop $\underline{Xe}$, the information signals produced by reading the check channel appearing at the outputs of this latter flip-flop.

Two sets of information signals supplied by the flip-flops $\underline{Ac}$ and $\underline{Xe}$ are compared in a gating network 341 connecting $\underline{Ac}$ and $\underline{Xe}$ to an alarm flip-flop $\underline{Z1}$ in such wise that if the two sets of signals are not identical, $\underline{Z1}$ will be turned on and a signal will be sent to the keyboard indicating that an error has been made in copying.

If no error is found, conditions are then right for the transfer from Sequence Two to Sequence Three the next pulse time. However, if the $\underline{Z1}$ alarm flip-flop has been turned on, the transfer will not be made, and the device will remain in Sequence Two as is explained in detail hereinafter.

The circuits utilized in reading the main memory channel and controlling the input flip-flop $\underline{Me}$ are shown in FIGURE 31 and are defined by the following logic equations:

$$(\underline{Mar}) = Mr$$
$$(\underline{Mar'}) = Mr'$$

$$\underline{Mb} = Mar$$
$$\underline{Mb'} = Mar'$$

$$\underline{Me} = Mb\ Me'\ C$$
$$\underline{Me'} = Mb'\ Me\ C$$

These circuits are the same as the F channel read circuitry previously explained in connection with FIGURE 20.

The circuits utilized in reading the check channel and controlling the input flip-flop $\underline{Xe}$ are shown in FIGURE 33 and are defined by the following logic equations:

$$(\underline{Xar}) = X$$
$$(\underline{Xar'}) = X'$$

$$\underline{Xb} = Xar$$
$$\underline{Xb'} = Xar'$$

$$\underline{Xe} = Xb\ Xe'\ C$$
$$\underline{Xe'} = Xb'\ Xe\ C$$

These circuits are also the same as the F channel read circuitry previously explained in connection with FIGURE 20.

The control of the flip-flop $\underline{Ac}$, insofar as it is operative during the verification process, is defined by:

$$\underline{Ac} = (\phi 11 + \phi 2) Me\ C$$
$$\underline{Ac'} = (\phi 11 + \phi 2) Me'\ C$$

Figure 35:
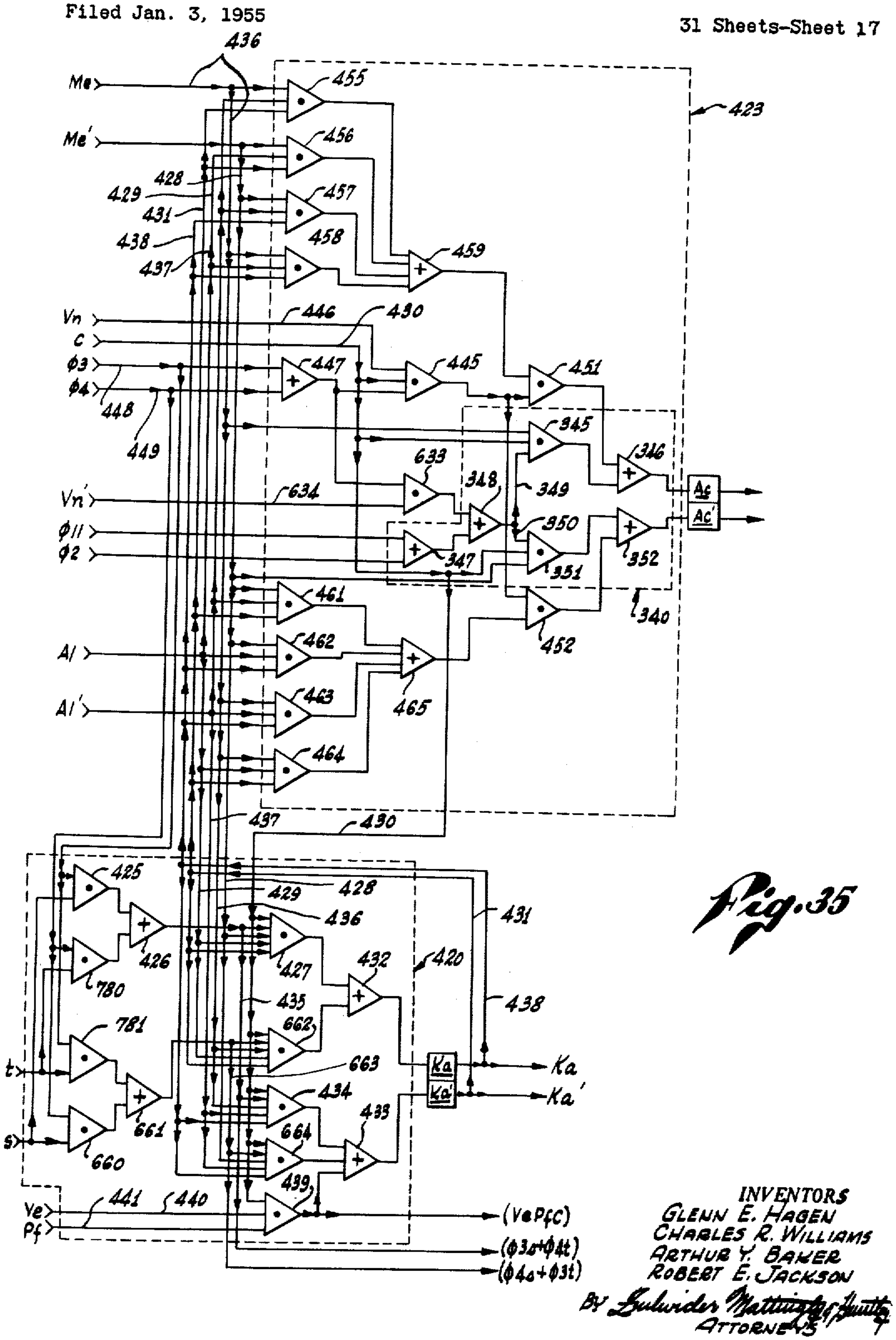
FIGURE 35 is a schematic diagram illustrating the components and circuitry utilized in a computing section of the apparatus for performing the computations of addition and subtraction.

In FIGURE 35, which illustrates the various circuits controlling the flip-flop $\underline{Ac}$, the group of gate circuits embraced by the broken line comprises the gating network 340. Information signal Me, clock signal C, and sequence control signal $(\phi 11 + \phi 2)$ are combined in an "and" gate 345, and the resulting coincidence signal is passed through an "or" gate 346 to the "on" input of flip-flop $\underline{Ac}$. To obtain the sequence control signal $(\phi 11 + \phi 2)$, signals $\phi 11$ and $\phi 2$ are applied as inputs to an "or" gate 347, the output of which is passed through an "or" gate 348 and applied as indicated at 349 to one input of the "and" gate 345. Control of the "off" side of $\underline{Ac}$ is obtained in a similar manner, the sequence control signal $(\phi 11 + \phi 2)$ being taken from the "or" gate 348 as indicated at 350 and combined in an "and" gate 351 with information signal Me' and clock signal C. The resulting coincidence signal is passed through an "or" gate 352 to the "off" input terminal of Ac.

Figure 36:
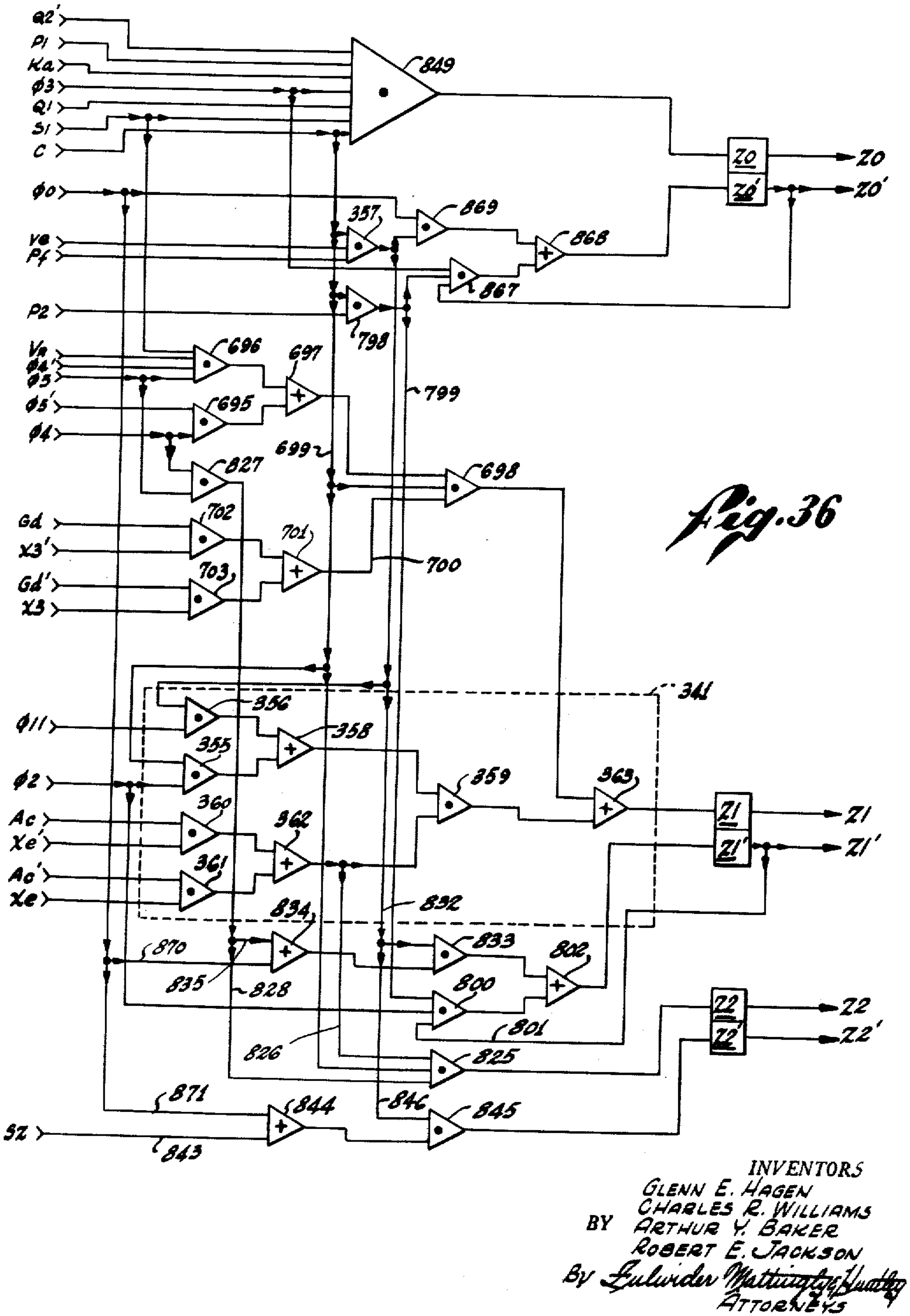
FIGURE 36 is a schematic wiring diagram showing the flip-flops, gating networks, and associated circuitry comprising an alarm system.

The gating network 341, in which the two sets of information signals are compared to control the operation of the alarm flip-flop Z1, comprises the various gates embraced by the broken line 341 in FIGURE 36. The circuitry and operation of the gating network 341 are defined by:

$$\underline{Z1}=(\phi 11\ Ve\ Pf\ C+\phi 2\ C)(Ac\ Xe'+Ac'\ Xe)$$

To obtain the timing and sequence control signal defined by the terms enclosed in the first parentheses, signals $\phi 2$ and C are combined in an "and" gate 355, and signal $\phi 11$ is combined with a signal Ve Pf C in an "and" gate 356, the later signal being supplied by an "and" gate 357 having the signals Ve, Pf, and C as inputs. The outputs from gates 355 and 356 are passed through an "or" gate 358, the output ($\phi 11\ Ve\ Pf\ C+\phi 2\ C$) from which constitutes one of the two inputs to an "and" gate 359.

The comparison signal represented by the terms enclosed by the second parentheses of the logic equation above is obtained by combining signals Ac and Xe' in an "and" gate 360, and combining the signals Ac' and Xe in an "and" gate 361, the outputs from the gates 360 and 361 being passed through an "or" gate 362, the output ($Ac\ Xe'+Ac'\ Xe$) from the gate 362 constituting the second input to the "and" gate 359. The two signals passed by the gates 358 and 362 are combined in the "and" gate 359, and the resulting coincidence signal is passed through an "or" gate 363 to the "on" input terminal of flip-flop Z1.

It will be seen from the above that the described control for Z1 is operative throughout Sequence Two. However since Z1 is gated to the clock signal C and is thereby delayed one pulse time, flip-flop Z1 will come on one pulse time after an error is detected. Therefore, an error detected during the last pulse time would be discovered too late to prevent the transfer from Sequence Two to Sequence Three. To provide the necessary time for the control of Z1, the checking is actually started before Sequence Two comes on, by starting the comparison during the last pulse time of Sequence One-One as is shown by the expression $\phi 11$ Ve Pf in the above logic equation.

Because the comparison starts with the last pulse time of Sequence One-One, and because the outputs of flip-flops Ac and Xe are both delayed one pulse time, the first signals produced by Ac and Xe are the next to the last bits of the channels. The checking continues through Sequence Two, ending with the last pulse time (Ve Pf) of that sequence, thus ending with the next to the last bit which is checked for the second time during the last pulse of the sequence. Since the next to the last bit in the channel is first checked, and the remainder of the channel is then checked, the checking is completed before the last pulse time of the sequence, and there is an opportunity for the alarm flip-flop Z1 to be turned on during the last pulse time, or before, if any error exists anywhere in the whole channel, thereby making it possible to prevent the transfer to Sequence Three, as is hereinafter more fully explained.

It will also be seen from the above that during the time the above described control for Z1 is operative, Z1 will be turned on if a "1" in the selected main memory channel has been copied into the check channel as a "0," or vice versa; so long as the indivdiual bits of the two channels agree, Z1 will not be turned on. This requires, of course, that corresponding bits be compared; i.e., that when the output from Ac represents a given bit in the main memory channel, the output from Xe must represent the same bit in the check channel. It is for this this reason that the information read from the main memory channel is taken from Ac rather than Me, the additional one pulse delay in Ac compensating for a one pulse displacement of the information in the X channel resulting from a one pulse delay in the recording flip-flops M0/M1. The timing relationships involved are represented diagrammatically in FIGURE 37.

Figure 37:
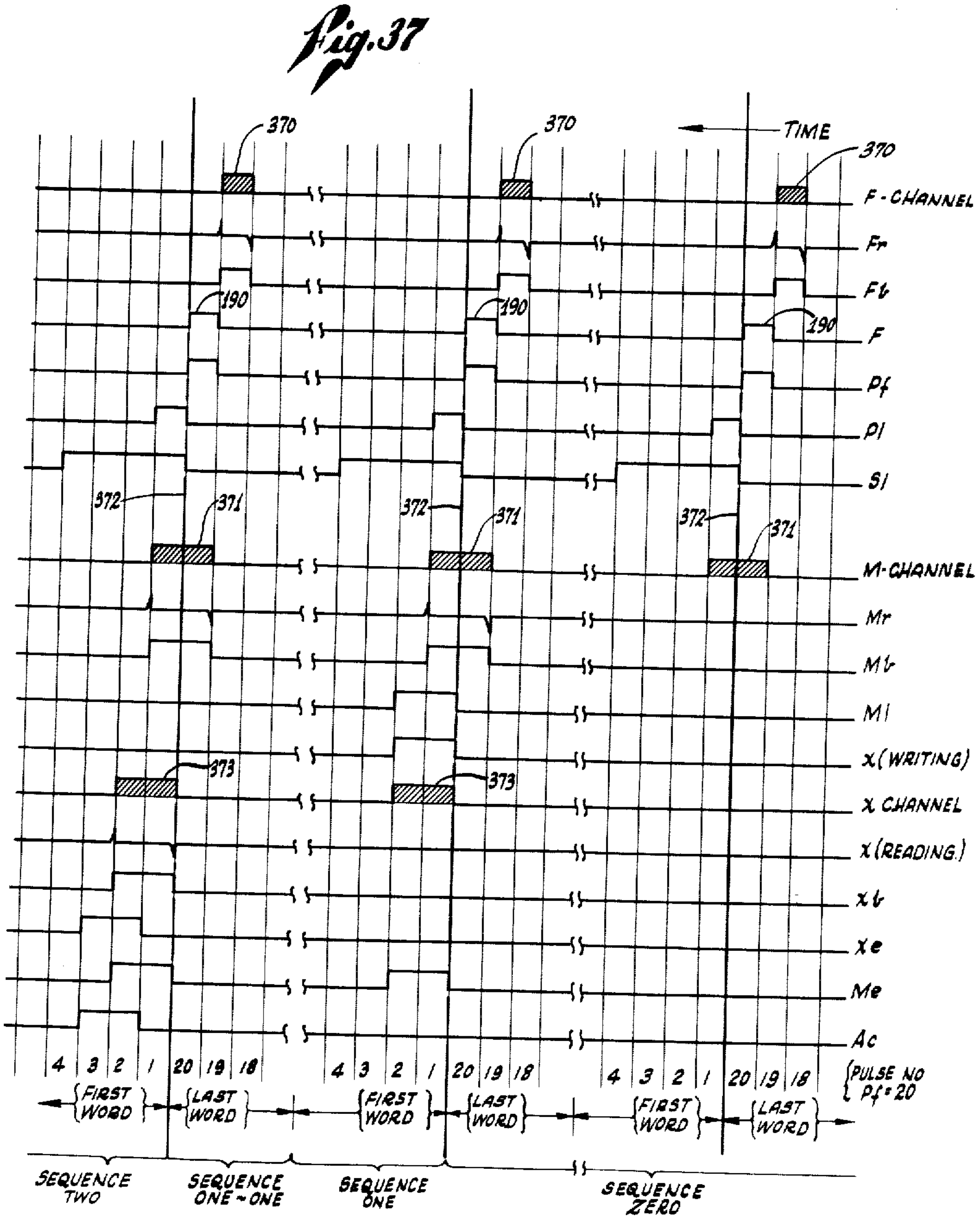
FIGURE 37 is a timing chart illustrating the relative timing of various signals showing the signal delays produced by certain components of the apparatus.

FIGURE 37 is a timing chart in which time is considered to flow from right to left. The last three bits of the last word and the first four bits of the first word are represented for four drum revolutions occurring during Sequence Zero, Sequence One, Squence One-One, and Sequence Two. It is assumed in FIGURE 37 that the F channel contains a recorded "1" only in the last bit of the last word as indicated by the shaded areas marked 370 in FIGURE 37, and that the selected memory channel contains "1's" only in the first and second bits of the first word of the channel as is represented by the shaded areas 371.

As may be seen form the first four lines of FIGURE 37, the previously mentioned synchronizing pulse 190, which is taken from the output of the flip-flop F, is delayed one pulse time from the output signals generated by the F channel read head Fr and the buffer flip-flop Fb. The next three lines indicate the times of occurrence of the synchronizing and the timing signals Pf, P1, and S1 which serve to mark the time of beginning of each word, such time being represented by the heavy vertical lines 372 in FIGURE 37.

These timing and synchronizing signals are the only signals shown during Sequence Zero, since it is during this sequence that the designated channel is selected. During Sequence One, the selected chanel is read by the read head Mr and the resulting signal used to control the buffer flip-flop Mb. As previously explained, the recording flip-flops M1 and M0 are controlled by the buffer flip-flops Mb, and because they are gated to the clock signal C, the output is delayed one pulse. The signal applied to the X head during the writing function follows M1 and M0; the resulting recorded signal in the X channel, represented by the shaded areas 373 in FIGURE 37, is displaced one pulse behind the corresponding signals recorded in the main memory channel.

During Sequence Two, the next reading of the main memory channel produces a like operation of the buffer flip-flop Mb, which in turn controls the input flip-flop Me, as previously described. The one pulse delay in Me causes the indicated "1's" to occur in pulse times 1 and 2 as indicated in FIGURE 37. However, the reading of the X channel during Sequence Two provides "1's" in pulses 1 and 2 at the output of Xb, but the output of the input flip-flop Xe is delayed one pulse so that the reproduced "1's" appear in pulse numbers 2 and 3. Since this is one pulse later than the appearance of the corresponding signals at the output of Me, it is necessary to introduce a one pulse delay in the signals produced by the reading of the main memory channel. Accordingly, Me is used to control flip-flop Ac which introduces an additional one pulse delay. Thus, as indicated in FIGURE 37, the two "1's" delivered by Ac as a result of the reading of the main memory channel occur at pulse numbers 2 and 3; i.e., coincidentally with the "1's" produced at the output of Xe during pulse numbers 2 and 3 by the reading of the X channel.

Figure 38:
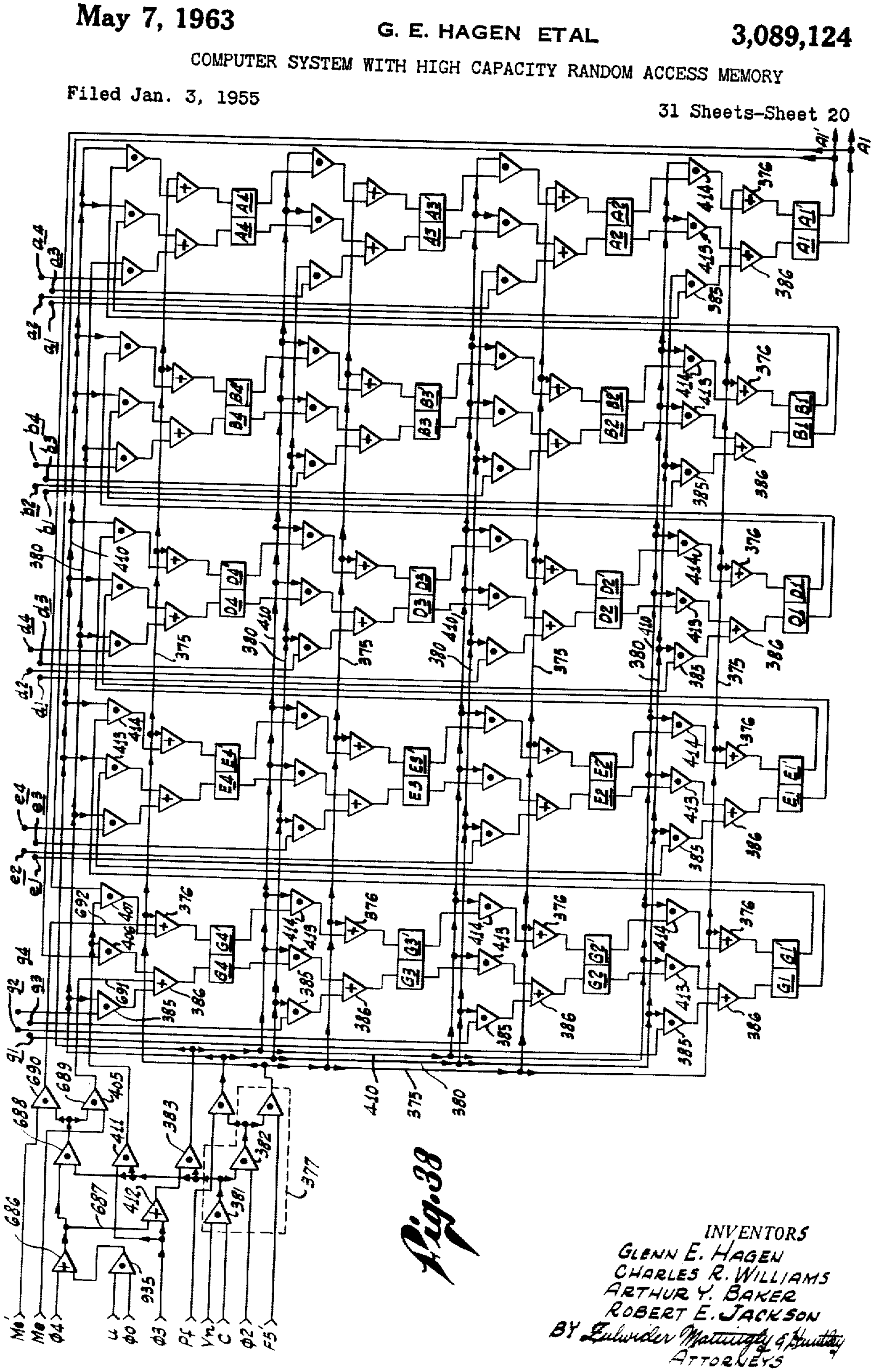
FIGURE 38 is a schematic diagram showing the components and circuitry comprising an input register portion of the arithmetic section of the apparatus.

*Numerical input.*—An additional operation which is performed during Sequence Two is the setting of all of the flip-flops in an input register portion of the arithmetic section 102 to their "off" condition during the first part of the sequence, and then transferring the signals from the numerical section 83 of the keyboard 60 to the same flip-flops. This register consists of twenty flip-flops (one for each bit required to represent the five digit decimal number in the excess-three code), interconnected through appropriate gates as shown in FIGURE 38. The setting of these twenty flip-flops to their "off" conditions is effected as indicated by the general expression:

$$\underline{S}'=\phi 2\ Vn\ F5'\ C$$

where $\underline{S}'$ represents the false input terminal of any of the twenty flip-flops. From the timing chart (FIGURE 22) it will be seen that the F5′ signal causes the setting to take place during the first eight pulse times of the selected word, and prevents such setting thereafter.

The circuits for so setting the twenty flip-flops include a reset bus 375 (FIGURE 38) which is connected to the "off" input terminals of all of the flip-flops, each such connection being effected through an "or" gate 376 associated with each flip-flop. The resetting signal $$(\phi 2\ Vn\ F5'\ C)$$

is produced by combining the individual signals in a suitable "and" network such as that represented, for example, at 377, the output from the network 377 being applied to the bus 375 as indicated at 378.

The twenty flip-flops may be thought of as comprising five groups of four flip-flops each, each group of four being associated with one of the decimal digits of the numerical section 83 of the keyboard 60. Each key column is provided with a group of four conductors that convey the information from the keyboard to the input register in the form of excess-three coded binary notation. The various groups of conductors are designated by the letters $\underline{a}$, $\underline{b}$, $\underline{d}$, $\underline{e}$, and $\underline{g}$, representing the key column or decimal denominational order (FIGURE 5), suffix numerals 1, 2, 3, and 4, being used to represent the particular conductor of the group of four, the suffix 1 representing the least significant bit. The twenty flip-flops are similarly designated, using capital letters in place of the lower case, as shown in FIGURE 38. There are thus provided twenty conductors $\underline{a1}$–$\underline{a4}$, $\underline{b1}$–$\underline{b4}$, $\underline{d1}$–$\underline{d4}$, $\underline{e1}$–$\underline{e4}$, and $\underline{g1}$–$\underline{g4}$ corresponding respectively to the twenty flip-flops $\underline{A1}$–$\underline{A4}$, $\underline{B1}$–$\underline{B4}$, $\underline{D1}$–$\underline{D4}$, $\underline{E1}$–$\underline{E4}$, and $\underline{G1}$–$\underline{G4}$.

Figure 39:
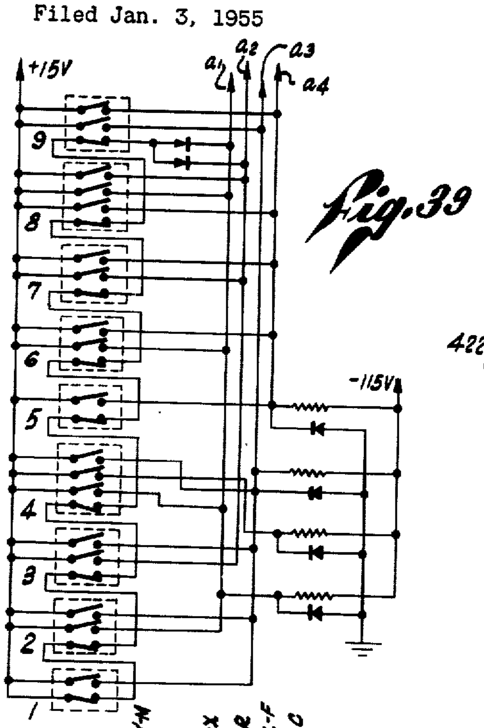
FIGURE 39 is a schematic wiring diagram for a plurality of switches which are controlled by the keys of one column of the numerical section of the keyboard, illustrating the input and output terminals, and the clamping circuits associated therewith.

The wiring for one column (the "*a*" column) of the numerical section 83 of the keyboard 60 is shown in FIGURE 39. The switching arrangement used is similar to that previously described with reference to FIGURE 18, differing mainly in the elimination of the four "false" conductors ($\underline{h1}'$, $\underline{h2}'$, $\underline{h3}'$, $\underline{h4}'$ of FIGURE 18). The system of FIGURE 39 uses the same series of normally closed switches to indicate a decimal zero, and also utilizes the clamping arrangement of FIGURE 19.

As previously mentioned, all of the flip-flops of the twenty flip-flop register are first turned to their off or false condition at the start of Sequence Two. Thereafter, each flip-flop is set to the condition required by the energization or deenergization of the individual conductor to which the flip-flop corresponds. The partial logic defining this control of the register is expressed generally by:

$$\underline{S}=\phi 2\ Vn\ Pf\ m\ C$$

where $\underline{S}$ represents the true input terminal of any one of the twenty flip-flops and "*m*" represents the signal on the corresponding keyboard conductor. The circuits for so setting the twenty flip-flops (FIGURE 38) include a control bus 380 for supplying to each flip-flop the timing control signal defined by the coincidence $\phi 2\ Vn\ Pf\ C$. This control signal is produced by an appropriate "and" network such as that comprising the "and" gates 381, 382, and 383 of FIGURE 38, the control signal being applied to the bus 380 as indicated at 384. At each flip-flop the control signal is combined with the appropriate keyboard signal in an "and" gate 385, the output being connected to the "on" input terminal through an "or" gate 386. In this manner, the information from the numerical section of the keyboard is transferred to the input register for use by the machine, the setting of the individual flip-flops occurring at the twentieth pulse time of the selected word as indicated by the signal configuration V*n* P*f* C.

If the comparison of the contents of the check channel and the main memory channel reveals no errors, the machine then transfers to Sequence Three when the selected word again comes under the read head $\underline{Mr}$; flip-flop $\underline{\phi 2}$ being turned off and $\underline{\phi 3}$ being turned on by that part of the circuitry of FIGURE 27 which is defined by:

$$\underline{\phi 2}'=\phi 2\ Ve\ Pf\ C$$
$$\underline{\phi 3}=\phi 2\ Ve\ Pf\ C$$

The signal configuration V*e* P*f* C, taken from the "and" gate 274, is combined in an "and" gate 390 with the signal $\phi 2$, and the resulting coincidence signal is applied to the "on" input terminal of $\underline{\phi 3}$ and to the "off" input terminal of $\underline{\phi 2}$ through an "or" gate 391. The gate 390 has for another input a signal Z1′ which must be present in order for the transfer to take place. However, since this signal will be present except under unusual circumstances described hereinafter, the present description assumes the presence of Z1′. Thus, at the pulse following $\phi 2$, V*e* P*f*, Sequence Two goes off, and Sequence Three comes on.

*Sequence Three*

One of the many important features of this invention resides in the provision of means for quickly amending the stored information in the light of current input data so that the stored information may be kept on a strictly current basis. In an inventory control device, such as is herein described, the new information is derived by a computation involving the stored data and the input information. It is during Sequence Three that this computation is performed and the original information contained in the selected word is revised in accordance with such computation. In the assumed example, the quantity 00339 (decimal), previously set into the keyboard and during Sequence Two transferred into the register in the excess-three code, will be subtracted from the quantity 01076 (decimal) expressed in the excess-three code by the selected word, and the difference, to-wit: the quantity 00737 (decimal), will be recorded in the excess-three code in the main memory as the selected word instead of the original word. The signal routing is indicated by the heavy lines in the functional diagram, FIGURE 40. The main memory read head $\underline{Mr}$ reads the selected word and the remainder of the channel, the information being routed, as indicated at 271, 395, and 396, to the arithmetic section 102.

The results of the computation (the difference 00737 expressed in the excess-three code followed by the unaltered balance of the channel) are routed to the delay channel write head $\underline{Rw}$ as indicated by the heavy lines 397, 398, and 399 to thereby record the information in the delay channel. The delay channel read head $\underline{Rr}$ is spaced slightly less than four words (74 pulse times) behind the write head $\underline{Rw}$ so that the recorded information is read from the delay channel approximately four word times later and routed as indicated by the heavy lines 400, 401, and 402 to the main memory write head $\underline{Mw}$ to thereby record the information in the main memory channel.

The write head $\underline{Mw}$ is positioned about four words (eighty-two pulse times) behind the read head $\underline{Mr}$ in such location that when the first pulse of the selected word comes under the write head $\underline{Mw}$, the write head is supplied with the first bit of the altered word. In this way the altered word is recorded on the selected channel in exactly the same location as that occupied by the original word. The computations are performed only on the selected word; the signals resulting from reading the remaining words of the selected channel are passed through the arithmetic section 102 without alteration of the information represented thereby, and this original information is rewritten in the original location.

*Input register circulation.*—The computations are performed on the selected word using the keyboard information previously stored in the input register. The computations are performed serially, the contents of the register being circulated so as to present to the computing circuits by the outputs of flip-flop $\underline{A1}$ the individual bits stored in the register coincidentally with the corresponding bits of the selected word as they come from Me, beginning with the least significant bit of the least significant digit. Thus, the four bits 1100 (the least significant decimal digit "9" in the register) are presented by flip-flop A1 in the order 0-0-1-1 in synchronism with the bits 1-0-0-1 (the least significant decimal digit "6" of the selected word) as they come from the flip-flop Me.

The circulation of the register contents is accomplished in Sequence Three by connecting the register flip-flops to each other in a manner common to circulating stepping flip-flop registers, each flip-flop being controlled by the one preceding and controlling the one following, and the initial flip-flop being controlled by the final flip-flop. The signals progress through the chain of interconnected flip-flops in the direction of decreasing significance, moving one step at each fall of the clock. The bits appearing at the output of the final flip-flop (A1) are returned to the other end of the chain (flip-flop G4) to preserve the information, it being understood that after the twentieth of such steps, the register flip-flops will each be in its original condition. Such an arrangement is defined generally by:

$$\underline{S}=\phi 3\ Vn\ Sp\ C$$
$$\underline{S'}=\phi 3\ Vn\ Sp'\ C$$

$$\underline{Si}=\phi 3\ Vn\ Sf\ C$$
$$\underline{Si'}=\phi 3\ Vn\ Sf'\ C$$

where S represents any stage of the register except the initial stage; Sp represents the stage preceding stage S; Si represents the initial stage; and Sf represents the final stage (wherein is stored the least significant bit).

Thus, during Sequence Three and for the twenty pulse times marking the duration of the selected word, the twenty flip-flops of the stepping register are at each clock pulse caused to assume the condition of the preceding flip-flop during the preceding pulse. At the end of the twenty pulses comprising the selected word, all twenty bits constituting the information held in the stepping register have been circulated and have appeared one after the other, at the outputs of flip-flop A1. Since all of the register flip-flops have been returned to their original condition, circulation is then arrested. The circuits shown in FIGURE 38 which control the circulating function are defined by the following partial logic:

$$\underline{G4}=\phi 3\ Vn\ A1\ C \qquad \underline{D2}=\phi 3\ Vn\ D3\ C$$
$$\underline{G4'}=\phi 3\ Vn\ A1'\ C \qquad \underline{D2'}=\phi 3\ Vn\ D3'\ C$$

$$\underline{G3}=\phi 3\ Vn\ G4\ C \qquad \underline{D1}=\phi 3\ Vn\ D2\ C$$
$$\underline{G3'}=\phi 3\ Vn\ G4'\ C \qquad \underline{D1'}=\phi 3\ Vn\ D2'\ C$$

$$\underline{G2}=\phi 3\ Vn\ G3\ C \qquad \underline{B4}=\phi 3\ Vn\ D1\ C$$
$$\underline{G2'}=\phi 3\ Vn\ G3'\ C \qquad \underline{B4'}=\phi 3\ Vn\ D1'\ C$$

$$\underline{G1}=\phi 3\ Vn\ G2\ C \qquad \underline{B3}=\phi 3\ Vn\ B4\ C$$
$$\underline{G1'}=\phi 3\ Vn\ G2'\ C \qquad \underline{B3'}=\phi 3\ Vn\ B4'\ C$$

$$\underline{E4}=\phi 3\ Vn\ G1\ C \qquad \underline{B2}=\phi 3\ Vn\ B3\ C$$
$$\underline{E4'}=\phi 3\ Vn\ G1'\ C \qquad \underline{B2'}=\phi 3\ Vn\ B3'\ C$$

$$\underline{E3}=\phi 3\ Vn\ E4\ C \qquad \underline{B1}=\phi 3\ Vn\ B2\ C$$
$$\underline{E3'}=\phi 3\ Vn\ E4'\ C \qquad \underline{B1'}=\phi 3\ Vn\ B2'\ C$$

$$\underline{E2}=\phi 3\ Vn\ E3\ C \qquad \underline{A4}=\phi 3\ Vn\ B1\ C$$
$$\underline{E2'}=\phi 3\ Vn\ E3'\ C \qquad \underline{A4'}=\phi 3\ Vn\ B1'\ C$$

$$\underline{E1}=\phi 3\ Vn\ E2\ C \qquad \underline{A3}=\phi 3\ Vn\ A4\ C$$
$$\underline{E1'}=\phi 3\ Vn\ E2'\ C \qquad \underline{A3'}=\phi 3\ Vn\ A4'\ C$$

$$\underline{D4}=\phi 3\ Vn\ E1\ C \qquad \underline{A2}=\phi 3\ Vn\ A3\ C$$
$$\underline{D4'}=\phi 3\ Vn\ E1'\ C \qquad \underline{A2'}=\phi 3\ Vn\ A3'\ C$$

$$\underline{D3}=\phi 3\ Vn\ D4\ C \qquad \underline{A1}=\phi 3\ Vn\ A2\ C$$
$$\underline{D3'}=\phi 3\ Vn\ D4'\ C \qquad \underline{A1'}=\phi 3\ Vn\ A2'\ C$$

During circulation, the inputs to G4 are taken from A1, a control signal $\phi 3$ V*n* C (produced by combining the output of gate 381 with the signal $\phi 3$ in an "and" gate 405) being combined in "and" gates 406 and 407 with signals A1 and A1′, respectively, and applied through "or" gates 386 and 376 to the "on" and "off" inputs, respectively, of G4. In a somewhat similar manner, the signal $\phi 3$ V*n* C is supplied to all of the other flip-flops by a bus 410 to which such signal is applied by a suitable gating network, such as that, for example, comprising "and" gates 381 and 411, and "or" gate 412, shown in FIGURE 38. At each flip-flop, the signal $\phi 3$ V*n* C is combined with the outputs from the preceding flip-flop in "and" gates 413 and 414 and applied through "or" gates 386 and 376 to the "on" and "off" input terminals, respectively, of the flip-flop.

As may be seen from the logic equations given above, the circulation of the input register is so arranged that at each pulse time during the reading of the selected word from the main memory, the outputs of flip-flop A1 represent the corresponding bit of the keyboard information. The computation to be performed therefore operates on signals from A1 (keyboard information) and signals from Me (stored information).

*Computations.*—The computing apparatus constituting the arithmetic section 102 of the machine is arranged to take full advantage of two unique properties of binary number systems. The first is a characteristic of the "excess-three" coding system utilized in this invention whereby a carry or borrow from one code group to another occurs simultaneously with a corresponding carry or borrow in a decimal system as previously described.

The second property utilized is the similarity of addition and subtraction. In other words, addition and subtraction are performed identically except for the manner in which the carries are produced. This may be seen from Table III which is a truth table showing for both subtraction and addition the result bit and the borrow or carry to the next higher order for the eight different combinations of Minuend/Augend, Subtrahend/Addend, and Carry In from the next lower order. As explained hereinafter, and as indicated in Table III, the Minuend/Augend bits are taken from the flip-flop Me, the Subtrahend/Addend bits are supplied by *A*1, and the Carry In bits come from a carry flip-flop K*a*. The bits of the Result are delivered by the computing flip-flop A*c*, and Carry Out bits are produced by the carry flip-flop K*a*. To facilitate an understanding of the arithmetic process, particularly that of subtraction, use is made of a carry which is added to the Subtrahend bit of the next higher order rather than a "borrow" from the Minuend, it being understood that such a carry is the arithmetic equivalent of the same quantity "borrowed" or subtracted from the corresponding bit of the Minuend.

TABLE III

| | | | | | | | | | |
|---|---|---|---|---|---|---|---|---|---|
| SUBTRACTION: | | | | | | | | | |
| Minuend | (Me) | 0 | 1 | 0 | 1 | 0 | 1 | 0 | 1 |
| Subtrahend | (A1) | 0 | 0 | 1 | 1 | 0 | 0 | 1 | 1 |
| Carry In | (Ka) | – | – | 1 | 1 | 1 | 1 | – | – |
| Result | (Ac) | 0 | 1 | 0 | 1 | 1 | 0 | 1 | 0 |
| Carry Out | (Ka) | – | – | 1 | 1 | 1 | – | 1 | – |
| ADDITION: | | | | | | | | | |
| Augend | (Me) | 0 | 1 | 0 | 1 | 0 | 1 | 0 | 1 |
| Addend | (A1) | 0 | 0 | 1 | 1 | 0 | 0 | 1 | 1 |
| Carry In | (Ka) | – | – | 1 | 1 | 1 | 1 | – | – |
| Result | (Ac) | 0 | 1 | 0 | 1 | 1 | 0 | 1 | 0 |
| Carry Out | (Ka) | – | – | 1 | 1 | – | 1 | – | 1 |

The above table shows that the bit of the Result (A*c*) to be entered in a given order is in each case the same for addition as it is for subtraction. Furthermore, a Carry Out (K*a*) to the next higher order is produced in both subtraction and addition whenever the Subtrahend/Addend (A1) is a "1" and there is a Carry In (K*a*). However, if the Subtrahend/Addend (A1) is a "1" and there is no Carry In (K*a*), or if the Subtrahend/Addend (A1) is a "0" and there is a Carry In (K*a*), the Carry Out (K*a*) depends on whether the arithmetic operation is subtraction or addition. In the case of subtraction under these conditions, a Carry Out (K*a*) occurs if the Minuend (M*e*) is a "0," while in the case of addition under such conditions, a Carry Out (K*a*) occurs if the Augend (M*e*) is a "1."

Serial addition or subtraction is thus accomplished by successively adding three bits; the Augend/Minuend (M*e*), the Addend/Subtrahend (A1), and a Carry In (K*a*) from the next lower order appropriate to whether the computation is an addition or a subtraction. If these three bits comprise an odd number of "1's," a "1" is to be entered as the Result, (A*c*) bit; otherwise, an "0" is to be entered. In the case of subtraction, if there is no Carry In, a Carry Out will be produced only if the Minuend (M*e*) is a "0" and the Subtrahend (A1) is a "1"; if there is a Carry In, a Carry Out will be produced unless the Minuend (M*e*) is a "1" and the Subtrahend (A1) is a "0." In the case of addition, if there is no Carry In, a Carry Out will be produced only if both the Augend (M*e*) and Addend (A1) are "1's"; if there is a Carry In, a Carry Out will be produced unless the Augend (M*e*) and Addend (A1) are both "0's." Since the Carry In to any order is the Carry Out resulting from the computation in the next lower order, and since there is no Carry In in the lowest order, the first step in performing the computation is to determine the Carry Out.

Figure 41:
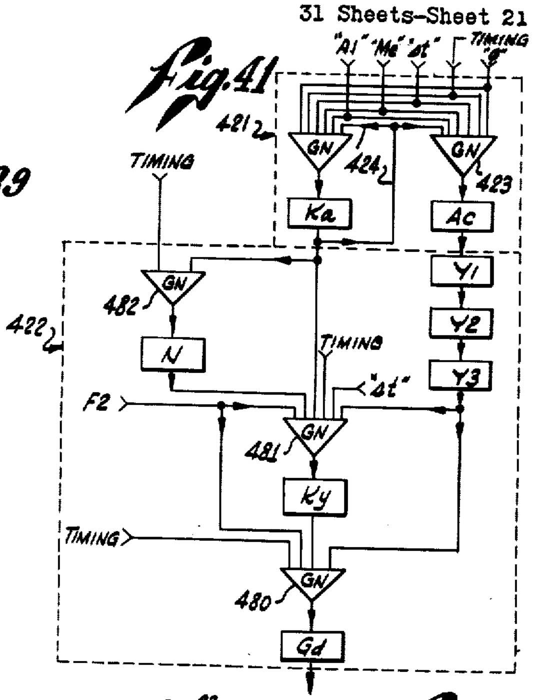
FIGURE 41 is a schematic block diagram of the computing portion of the arithmetic section of an individual computer.
Figure 40:
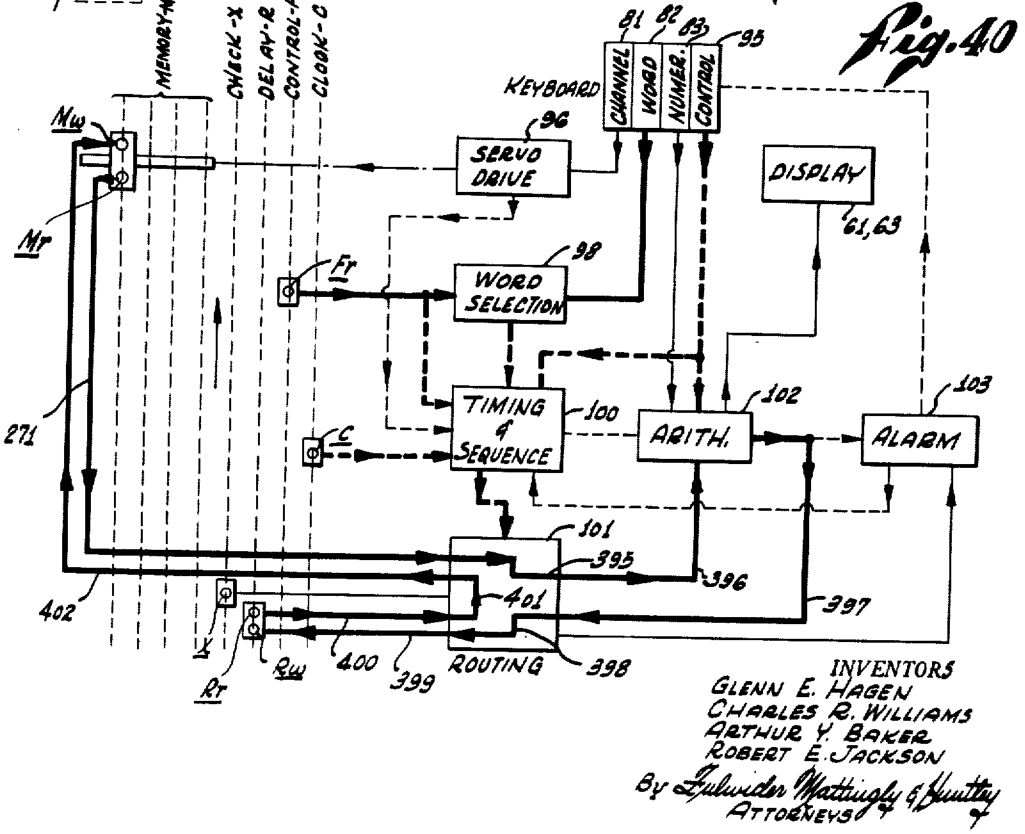
FIGURE 40 is the block diagram of FIGURE 6 reproduced to emphasize the functional correlations operative during Sequence Three.

According to the invention, the character of the Carry Out is ascertained by a gating network 420 controlling a Carry flip-flop $\underline{Ka}$, shown in Figure 41 where the arithmetic section 102 of the present invention is diagrammatically illustrated. The arithmetic section 102 comprises a computing section 421 and an excess-three corrector 422, the former comprising the flip-flops $\underline{Ka}$ and $\underline{Ac}$ and associated gating networks 420 and 423. The gating network 420 accepts six classes of signals, three of which constitute sequence signals, timing signals, and control signals from the keyboard defining the character of the computation (i.e., addition or subtraction). The other three constitute the two numbers (M*e* and A1) to be added or subtracted, and the Carry In which is taken from the output of the carry flip-flop $\underline{Ka}$ and fed back to the input as indicated at 424.

As is the case with all flip-flops which are gated to the clock, the output of $\underline{Ka}$ occurs one pulse time after the coincidence conditions producing operation. Thus, at any given time, the signals from $\underline{Ka}$ which are introduced into the gating network 420 along with the signals from $\underline{Me}$ and $\underline{A1}$ represent the Carry In from the next lower order than that represented by the signals from $\underline{Me}$ and $\underline{A1}$, and the output from $\underline{Ka}$ produced by those signals and occurring one pulse time later represents a Carry Out to the next higher order.

To consider the case of operation in Sequence Three with the keyboard calling for a subtraction, it may be seen from Table III above that the required functions of gating network 420 are as defined by the following partial logic:

$$\underline{Ka}=\phi 3\ s\ Me'\ A1\ Ka'\ C$$
$$\underline{Ka}'=\phi 3\ s\ Me\ A1'\ Ka'\ C+Ve\ Pf\ C$$

The final term (*Ve Pf* C) of $\underline{Ka'}$ is utilized to insure that $\underline{Ka}$ will be in the false condition (no Carry In) at the time the computation is begun; and the $\phi 3$ and "*s*" terms define the coincidence conditions for a subtraction operation, the "*s*" term constituting a signal delivered by the keyboard when the "subtract" key 87 is depressed (see FIGURES 5 and 28).

The computing section 421 is shown in FIGURE 35, wherein the circuits and components comprising the gating networks 420 and 423 are enclosed in dashed lines correspondingly marked. The gating network 420 includes an "and" gate 425 in which input signals $\phi 3$ and "*s*" are combined. The output ($\phi 3\ s$) from gate 425 is passed through an "or" gate 426 and applied as one of five inputs to an "and" gate 427, the other four inputs to which comprise signals M*e*′, A1, C, applied by conductors 428, 429, and 430 respectively, as shown, and a signal K*a*′ taken from the output of flip-flop $\underline{Ka}$ as shown at 431. The coincidence signal ($\phi 3\ s\ Me'\ \overline{A1}\ Ka'\ C$) from the output of gate 427 is passed through an "or" gate 432 and applied to the "on" input of $\underline{Ka}$. The "off" input of $\underline{Ka}$ is connected through an "or" gate 433 to the output of an "and" gate 434 having five inputs. The five inputs to gate 434 comprise the signal ($\phi 3\ s$) taken from gate 426 as indicated at 435, signals M*e*, A1′, and C applied by conductors 436, 437, and 430, respectively, as shown, and a signal K*a* taken from the output of $\underline{Ka}$ as shown at 438. The setting signal (V*e* P*f* C) is produced by an "and" gate 439 to which signals V*e*, P*f*, and C are applied by conductors 440, 441, and 430, respectively, the setting signal being passed through the "or" gate 433 and applied to the "off" terminal of $\underline{Ka}$, as shown.

As indicated by the logic equations set out above, the gating network just described operates to turn $\underline{Ka}$ off at the first bit of the selected word; whenever it is off, to turn it on for the bit following the occurrence of a "1" (A1) in the subtrahend and an "0" (M*e*′) in the minuend and whenever it is on, to turn it off for the bit following the occurrence of an "0" (A1′) in the subtrahend and a "1" (M*e*) in the minuend. Thus, $\underline{Ka}$ will be on during the bit following any bit in which the computation requires a carry to the next higher order; the signal K*a* indicates such a carry, and K*a*′ indicates no carry.

The process of adding together each of the bits delivered by $\underline{Me}$ and $\underline{A1}$, and any appropriate carry produced by $\underline{Ka}$, is performed by the aforementioned flip-flop $\underline{Ac}$ under the control of the aforementioned gating network 423. This network accepts as inputs the same sequence, timing, and control signals as are applied to the gating network 420, and the three numerical inputs from $\underline{Me}$, $\underline{A1}$ and $\underline{Ka}$. The partial logic for the computation flip-flop $\underline{Ac}$, which defines the operation under the conditions assumed, and which may be derived from Table III above, is:

$$\underline{Ac}=\phi 3\ Vn(Me\ A1'\ Ka'+Me'\ A1\ Ka'+Me'\ A1'\ Ka+Me\ A1\ Ka)C$$
$$\underline{Ac}'=\phi 3\ Vn(Me\ A1\ Ka'+Me\ A1'\ Ka+Me'\ A1\ Ka+Me'\ A1'\ Ka')C$$

The $\phi 3$ term above limits the computing operation to Sequence Three, and the V*n* term limits the computation to the twenty bits comprising the selected word. The results of the computation are represented by the outputs of the arithmetic flip-flop $\underline{Ac}$.

The gating network 423 embraces and includes the previously mentioned network 340 as is indicated by the dashed lines in FIGURE 35. As the logic equations indicate, the sequence, timing, and control signal ($\phi 3$ V*n* C) comprises a component part of the controls applied to both the "on" and "off" inputs to flip-flop $\underline{Ac}$. This signal is obtained by combining in an "and" gate 445 signals V*n* and C, supplied by conductors 446 and 430, respectively, with a signal $\phi 3$ taken from an "or" gate 447 to which signals $\phi 3$ and $\phi 4$ are applied by conductors 448 and 449, respectively. The resulting control signal ($\phi 3$ V*n* C) is applied as one of the two inputs to each of a pair of "and" gates 451 and 452, the outputs of which are connected through the "or" gates 346 and 352 of the network 340, previously described, to the "on" and "off" inputs, respectively, of the flip-flop $\underline{Ac}$.

Each of the gates 451 and 452 has a second input comprising, respectively, the signal configurations enclosed in parentheses in the above logic equations for $\underline{Ac}$ and $\underline{Ac}'$. These two signal configurations define, respectively, the four combinations of the three input bits which produce a "1" as the result bit, and the other four combinations which produce an "0." The four combinations producing a "1" are formed by four "and" gates 455, 456, 457, and 458, each having three inputs. Signals Me, A1' and Ka' are applied as inputs to gate 455 by conductors 436, 437, and 431, respectively; signals Me', A1, and Ka' are applied to gate 456 by conductors 428, 429, and 431, respectively; signals Me', A1', and Ka are applied to gate 457 by conductors 428, 437, and 438, respectively; and signals Me, A1, and Ka are applied to gate 458 by conductors 436, 429, and 438, respectively. The outputs from the gates 455–458 are applied as inputs to an "or" gate 459, as shown, the output from gate 459 comprising the above mentioned second input to gate 451 controlling the "on" side of Ac.

The four signal combinations producing an "0" are formed by four "and" gates 461, 462, 463, and 464, the outputs of which are applied as inputs to an "or" gate 465, as shown, the output from gate 465 comprising the above mentioned second input to gate 452 controlling the "off" side of Ac. Each of the gates 461–464 has three inputs comprising one or the other of the true or false outputs of flip-flops Me, A1, and Ka, each set of three inputs being supplied by three of six conductors 428, 429, 431, 436, 437, and 438 in the manner shown in FIGURE 35 to provide the four signal combinations *Me* A1 K*a'*, *Me* A1' K*a*, *Me'* A1 K*a*, and *Me'* A1' K*a'*.

As indicated by the logic equations set out above, the gating network just described operates during the selected word time of Sequence Three to turn Ac on if there is an odd number of "1's" represented by the outputs of Me, A1, and Ka, and to turn Ac off if there is an odd number of "0's."

*Excess-three code correction.*—As is well known, when two quantities expressed in the "excess-three" code are added or subtracted, correspondence with the code is destroyed and the result must be corrected. The apparatus for effecting this correction, previously referred to as the excess-three corrector 422 (FIGURE 41), is shown in detail in FIGURE 42. The desired correction consists in adding three to, or subtracting three from, each of the code groups of four bits that represent each decimal digit. The correction applied to a given code group is added or subtracted, depending upon whether the arithmetic process was a subtraction or an addition, and depending upon whether a carry was produced from that code group or decimal digit to the next higher group or decimal order. Under the conditions assumed, where the computation constituted a subtraction, the correction must be added if there was no carry and must be subtracted if a carry was produced.

Whether a carry from one code group to another is produced can be determined only at the first bit of the following code group; i.e., at pulse times 5, 9, 13, and 17. The correction, the character of which is thus ascertained, must, however, be made to the entire code group preceding. In order to permit the correction to be made under these conditions, the results of the computation are delayed four pulse times so that the first bit of a given delayed digit occurs one pulse time after the fourth bit of that digit not delayed. Thus, the first bit of a given delayed code group coincides in time with the first bit of the next following group not delayed. The excess-three correction is applied to the delayed code groups so that at the time the correction is begun (i.e., with the first bit of the delayed group), the carry flip-flop Ka indicates whether there was a carry to the next higher group. This four pulse delay is secured by feeding the output of the computation flip-flop Ac successively through three delay flip-flops Y1, Y2, and Y3, so that the output of Y3 is four pulses behind the input to Ac:

$$\underline{Y1}=Ac\ C$$
$$\underline{Y1'}=Ac'\ C$$

$$\underline{Y2}=Y1\ C$$
$$\underline{Y2'}=Y1'\ C$$

$$\underline{Y3}=Y2\ C$$
$$\underline{Y3'}=Y2'\ C$$

Figure 42:
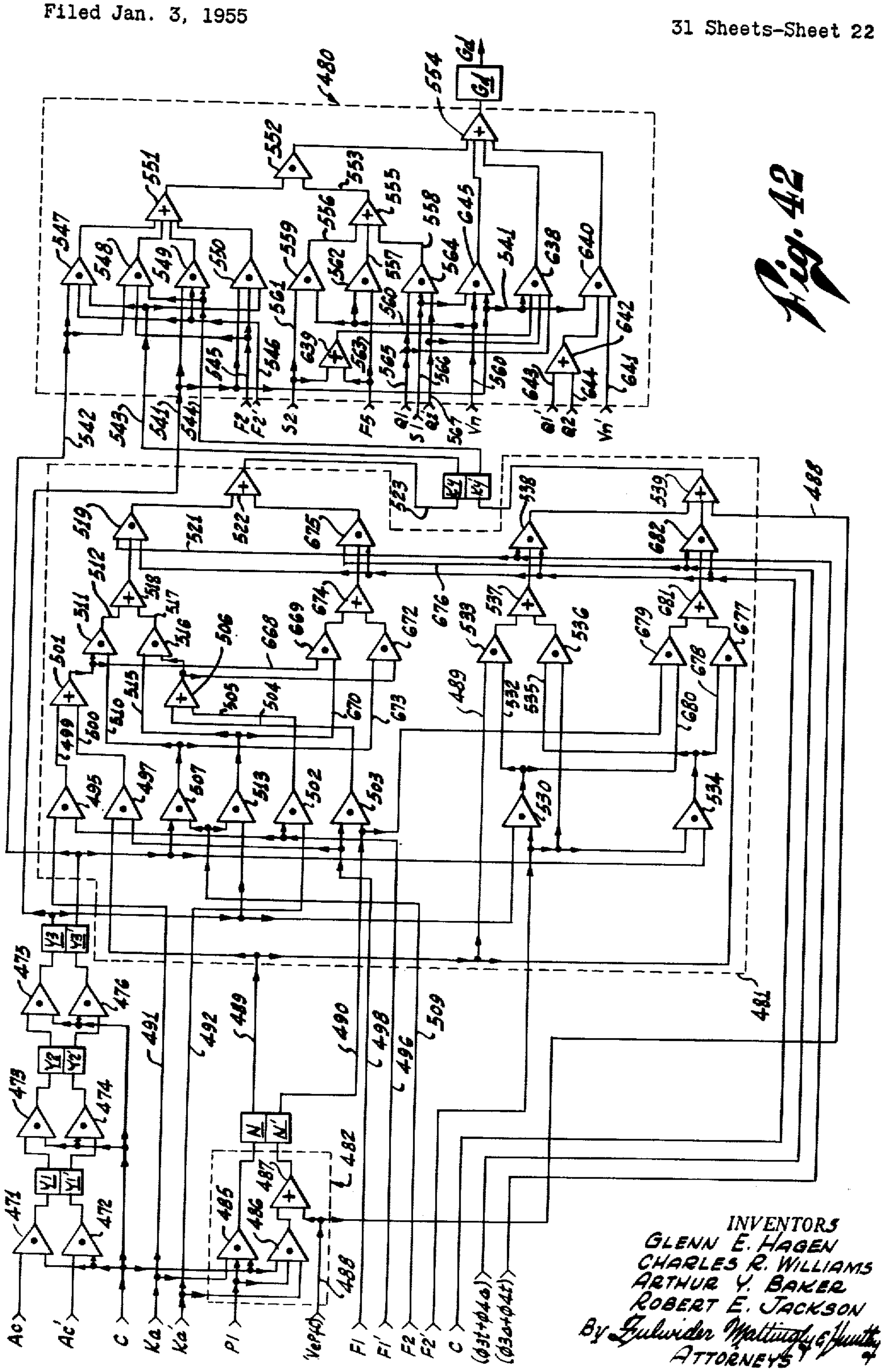
FIGURE 42 is a schematic diagram illustrating the components and circuitry comprising an "excess-three" corrector portion of the arithmetic section of the apparatus.

The circuits defined by these logic equations are shown in FIGURE 42. The signals Ac and Ac' are combined in "and" gates 471 and 472 with the clock signal C and applied to the "on" and "off" inputs, respectively, of flip-flop Y1. The outputs from Y1 control Y2, and the outputs from Y2 control Y3, flip-flops Y2 and Y3 being also gated to the clock signal C by gates 473, 474, and 475, 476, as shown.

The uncorrected result of the computation appears at the output of Y3 four pulses after the data are presented to the computing flip-flop Ac. The desired correction is effected without any further delay by a gating network 480, in cooperation with a driver Gd (FIGURE 41).

The driver Gd and its gating network 480 serve to add or subtract three from the uncorrected output of Y3, appropriate carries where required being produced by a flip-flop Ky controlled by a gating network 481.

In function, the networks 480 and 481 correspond to the networks 423 and 420 previously described, and the flip-flop Ky and driver Gd correspond in function to the flip-flops Ka and Ac previously mentioned, and operate in a similar fashion. However, the control of Ka to produce carries appropriate to addition or subtraction is effected by the corresponding keyboard control signals (*t* and *s*). In the case of the flip-flop Ky this keyboard control is modified by the output of Ka in accordance with whether a carry was produced from one code group to the other. Thus, the inputs to the gating network 481 comprise, in addition to the timing signals and the keyboard control signals, the arithmetic signal from Y3 and the quantity "three" which is obtained by feeding into the network 481 the timing signal F2 which, as may be seen from the timing chart, FIGURE 22, constitutes a repetition of a binary three, once in each code group. In addition, signals from Ka are introduced into the control of Ky since Ka indicates with reference to the first bit of each digit delivered by Y3 whether there was a carry from that digit to the next higher order digit, the signals from Ka being used to control the operation of the flip-flop Ky according to whether the correction process constitutes an addition or a subtraction.

It will be appreciated that while the condition of Ka at the first bit of each digit correctly reveals whether a dight-to-digit carry was produced, it does not necessarily truly represent that condition for the remaining three bits. Accordingly, Ka is used to control during the first bit only of each digit, the output of a control flip-flop N being used to control during the next three bits. Flip-flop N is controlled by a gating network 482 according to the following:

$$\underline{N}=P1\ Ka\ C$$
$$\underline{N'}=P1\ Ka'\ C+Ve\ Pf\ C$$

The signal P1 in the above logic defines the first bit of each digit. Thus N will be turned on or off at the end of the first bit to correspond to the condition of Ka during the first bit, and will then remain unchanged for four pulses. Thus a signal Ka in the first bit followed by a signal N in the second, third and fourth bits, indicates that during the computation a carry from that digit to the next higher order digit has been produced, whereas signals Ka' and N' in such bits indicate the absence of such a carry. The term Ve *Pf* C in the equation for N' serves to turn N off at the start of the computation to correspond to the then condition of Ka.

The circuits and components comprising the network 482 defined by the logic equations for the flip-flop N are shown in FIGURE 42 within the dashed line marked 482. An "and" gate 485 combines the clock signal C with the signal K*a* and the timing signal P1, and applies the resulting coincidence signal (P1 K*a* C) to the "on" input of flip-flop N. The clock signal C and the timing signal P1 are also combined with the signal K*a*′ in an "and" gate 486, the output of which is passed through an "or" gate 487 to the "off" input to N. The signal configuration V*e* P*f* C may be obtained by a suitable "and" gate such as the gate 439 of FIGURE 35 and applied as by conductor 488 to another input of the "or" gate 487 as shown to thereby control the "off" side of N as above described.

The signals produced by the control flip-flop N and signals from K*a* are applied to the gating network 480 as indicated at 489, 490, 491, and 492 to control the operation of the flip-flop K*y* as above described. The partial logic defining the operation of K*y* under the control of the network 481 for the conditions assumed (the machine in Sequence Three and a subtraction operation ordered by the keyboard) is as follows:

$$\underline{Ky}=\phi 3\ s[(Ka\,F1'+N\,F1)\ Y3'\ F2 +(Ka'\ F1'+N'\ F1)\ Y3\ F2]C$$

$$\underline{Ky'}=\phi 3\ s(NY3\ F2'+N'\ Y3'\ F2')C+Ve\ Pf\ C$$

In the above, the signals *φ3* and "*s*" define Sequence Three and the fact that a subtraction was ordered by the keyboard. The F1′ signal in the equation for K*y* is combined with K*a* and K*a*′ to limit control by K*a* to the first bit of each digit (the only times when F2 and F1′ coincide), and the F1 signal is combined with N and N′ to prevent any control by N during the first bit. The term (*Ka F1′+N F1*) in the equation for K*y* sets up the controls for the condition where there is a digit-to-digit carry, and the term (*Ka′ F1′+N′ F1*) sets up the controls for the condition where there has been no such carry. Similarly, the signals N and N′ in the equation for Ky′ control under corresponding conditions. The V*e* P*f* C term in Ky′ is used to insure that K*y* will be off at the time the correction is initiated.

The control signal (*Ka F1′+N F1*) is produced by combining signals K*a* and F1′ in an "and" gate 495 (FIGURE 42), the K*a* signal being taken from conductor 491 and the F1′ signal being applied as indicated at 496. Also, the signal N taken from conductor 489 is combined in an "and" gate 497 with a signal F1 applied as indicated at 498. The outputs of the "and" gates 495 and 497 are applied as indicated at 499 and 500 to the inputs of an "or" gate 501, the output of which thus comprises the control signal (*Ka F1′+N F1*).

In a like fashion the control signal (*Ka′ F1′+N′ F1*) is produced by combining in an "and" gate 502 the signal K*a*′ taken from conductor 492 with the signal F1′ taken from conductor 496, and by combining in an "and" gate 503 a signal N′ taken from conductor 490 with a signal F1 taken from conductor 498. The outputs of the gates 502 and 503 are applied as indicated at 504 and 505 to the inputs of an "or" gate 506, the output of which comprises the control signal (*Ka′ F1′+N′ F1*).

Signals Y3′ and F2 are combined in an "and" gate 507, signal Y3′ being applied to the gate as indicated at 508, and signal F2 being taken from a conductor 509. The output of gate 507 is applied as indicated at 510 to one input of an "and" gate 511 where the signal is combined with the output signal from the "or" gate 501. The "and" gate 511 delivers on an output conductor 512 the signal [(*Ka F1′+N F1*) *Y3′ F2*]. In a similar fashion signals Y3 and F2 are combined in an "and" gate 513, signal F2 being taken from conductor 409 and signal Y3 being applied to the input of the gate 513 as indicated at 514. The output of "and" gate 513 is applied at 515 to an "and" gate 516 where the signal is combined with theoutput from the "or" gate 506. Gate 516 delivers on an output conductor 517 the signal $$[(Ka'\ F1'+N'\ F1)\ Y3\ F2]$$

Output conductors 512 and 517 constitute the inputs to an "or" gate 518, the output of which is combined in an "and" gate 519 with the clock signal C supplied by a conductor 520 and a signal *φ3 s* supplied by a conductor

521 which may be connected, for example, to the output of gate 426 as by conductor 435 shown on FIGURE 35. The output signal from the gate 519 is passed through an "or" gate 522 and applied to the "on" input of flip-flop K*y* as indicated at 523.

Control for the "off" side of K*y* is obtained in a similar manner by combining in an "and" gate 530 signals Y3 and F2′ taken respectively from conductor 514 and a conductor 531. The output of gate 530 is applied as indicated at 532 to one input of an "and" gate 533 wherein the signal is combined with the signal N taken from aforementioned conductor 489. In similar fashion signals Y3′ and F2′ are combined in an "and" gate 534, signal F2′ being taken from conductor 531 and the signal Y3′ being taken from conductor 508. The output of gate 534 is applied as indicated at 535 to the input of an "and" gate 536 where the signal is combined with a signal N′ taken from the aforementioned conductor 490.

The outputs of gates 533 and 536 constitute the two inputs to an "or" gate 537, the output of which is combined in an "and" gate 583 with the clock signal C and the signal combination *φ3 s* taken respectively from conductors 520 and 521. The output of "and" gate 538 is passed through an "or" gate 539 and applied as indicated at 540 to the "off" input terminal of flip-flop K*y*. The resetting signal V*e* P*f* C comprising the last term in the logic for K*y*′ is taken from the conductor 488 previously mentioned and applied to the "off" input terminal of flip-flop K*y* through the "or" gate 539 as shown on FIGURE 42.

From the logic equations given above, and from the circuits described with reference to FIGURE 42, it will be seen that the flip-flop K*y* will be in its "off" condition at the start of the correction, having been turned off by the resetting term V*e* P*f* C. Thereafter, the control of K*y* is governed by flip-flops K*a* and N in terms of whether in the computation there was a carry from one code group to the next, the "on" condition of K*a* and N indicating such a carry, and the "off" condition indicating the absence of such a carry.

If there was a digit-to-digit carry, flip-flops K*a* and N will be "on" and K*y* will be controlled by the signals passed through gates 511 and 533 to produce bit-to-bit carries as required by the subtraction process employed for correction under these circumstances. Thus, K*y* will not be turned on until a zero from Y3 coincides with a "1" from F2, and it will be turned off whenever a "1" from Y3 coincides with a zero from F2.

If, on the other hand, there was no carry from one code group to the other, K*y* will be controlled by the outputs of gates 516 and 536 to produce bit-to-bit carries as required by the process of addition used for making the excess-three correction. Thus, if K*y* is off, it will be turned on when "1's" are delivered simultaneously by Y3 and F2. When on, it will be turned off when zeros appear simultaneously in these two signals. It will thus be seen that the signals produced by the flip-flop K*y* constitute arithmetic signals which, in cooperation with the other two arithmetic signals Y3 and F2, may yield a corrected result.

The three pairs of arithmetic signals produced by flip-flops Y3, F2 and K*y* are combined in the gating network 480 to control the driver G*d* and deliver as the output thereof the results of the computation correctly expressed in the "excess-three" code, such control being defined by the following partial logic:

$$(\underline{Gd})=(Y3'\ F2'\ Ky+Y3'\ F2\ Ky'+Y3\ F2'\ Ky' +Y3\ F2\ Ky)(Vn\ S2+Vn\ F5+Q2'\ Q1\ S1)$$

In the above the four terms enclosed in the first parentheses define the four conditions under which a "1" results from the addition of three bits delivered by Y3, F2 and K*y*. The three terms enclosed in the second parentheses define the time during which the "excess-three" correction is made; i.e., during the last four syllables of the selected word and the first syllable of the word next following, the former being defined by the first two terms and the latter being defined by the third term.

The six arithmetic signals Y3, Y3′, Ky, Ky′, F2, and F2′ are applied to the gating network 480 as by six conductors 541–556, respectively, as indicated in FIGURE 42. Four "and" gates 547–550 are provided, each having three inputs, the three inputs being connected to three of the six conductors 541–546 as shown in FIGURE 42 so that signals Y3′, F2′ and Ky are combined in gate 547; signals Y3′, F2 and Ky′ are combined in gate 548; signals Y3, F2′ and Ky′ are combined in gate 549; and signals Y3, F2 and Ky are combined in gate 550. The outputs of gates 547–550 thus represent the four combinations of the three pairs of input signals which produce a "1" as the result bit. These four outputs are applied as inputs to an "or" gate 551, the output of which is combined in an "and" gate 552 with certain timing signals applied to the input of gate 552 as indicated at 553. The output from the "and" gate 552 is passed through an "or" gate 554 to the input of the driver Gd as shown.

The timing signal supplied by the aforementioned conductor 553 is obtained from an "or" gate 555 having three inputs 556, 557, and 558. Input 556 constitutes the output of an "and" gate 559 in which signals Vn and S2 are combined, the signals being applied to the input of gate 559 as indicated at 560 and 561. The input 557 to the "or" gate 555 is taken from an "and" gate 562 in which signals Vn and F5 are combined, signal Vn being connected to the input of gate 562 as shown at 560, and signal F5 being supplied as by a conductor 563. The third input 558 to the "or" gate 555 is obtained from an "and" gate 564 in which certain timing signals Q1, S1, and Q2′ are combined, the three timing signals being supplied to the gate 564 as by conductors 565, 566, and 567.

The timing signals S2, F5, and S1 are taken from flip-flop F5 and drivers S1 and S2 of the "F" chain shown on FIGURE 25 and previously described. Timing signals Q1 and Q2′ are taken respectively from flip-flops Q1 and Q2 forming part of a supplementary timing system (hereinafter referred to as the "W" chain), illustrated in FIGURE 43. The signals produced by the "W" chain are shown in a timing chart, FIGURE 44, in which signals Ve, Vn, and Pf have been included for reference purposes.

Figure 44:
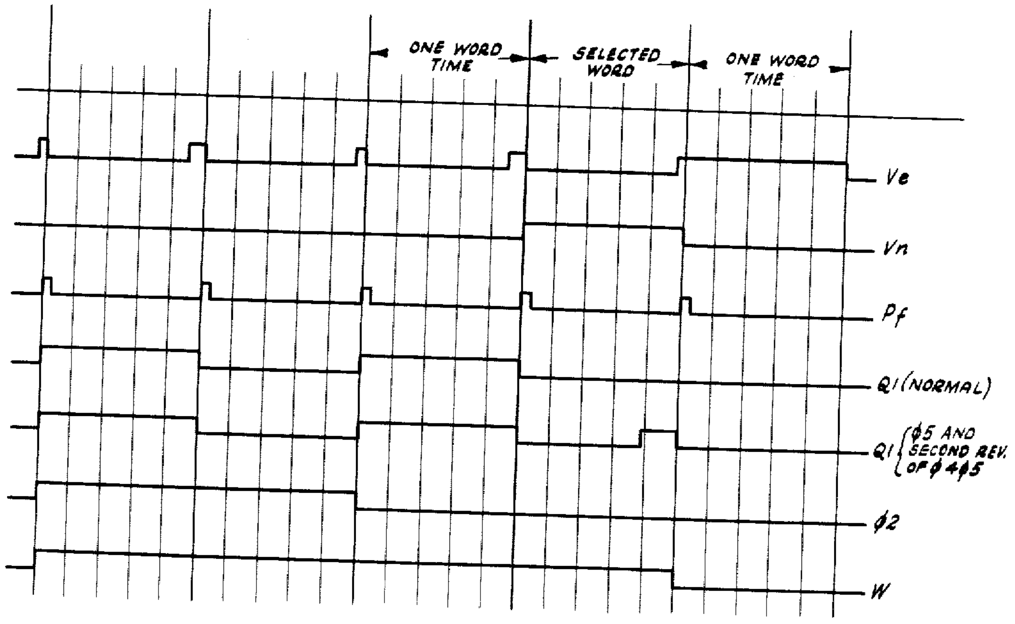
FIGURE 44 is a timing chart similar to FIGURE 22 and showing the relative timing of various signals produced by the auxiliary timing circuitry.

As shown in FIGURE 44, the signals produced by the "W" chain measure certain periods of time with reference to the beginning of the selected word. Flip-flop W comes on at the beginning of the selected word and remains on for precisely four word times. Flip-flop Q2 is on only during the third and fourth of these four word times, while Q1 is normally on during the second and fourth of these four word times. Flip-flop Q1 has two modes of operation; i.e., a normal mode as above described, and an alternative mode which is also shown on FIGURE 44, and which occurs only during Sequence Five and the second revolution of Sequence Four-Five. Consideration of this alternative mode of operation is deferred, and the ensuing description is concerned solely with the first or normal mode of operation of the flip-flop Q1.

Figure 43:
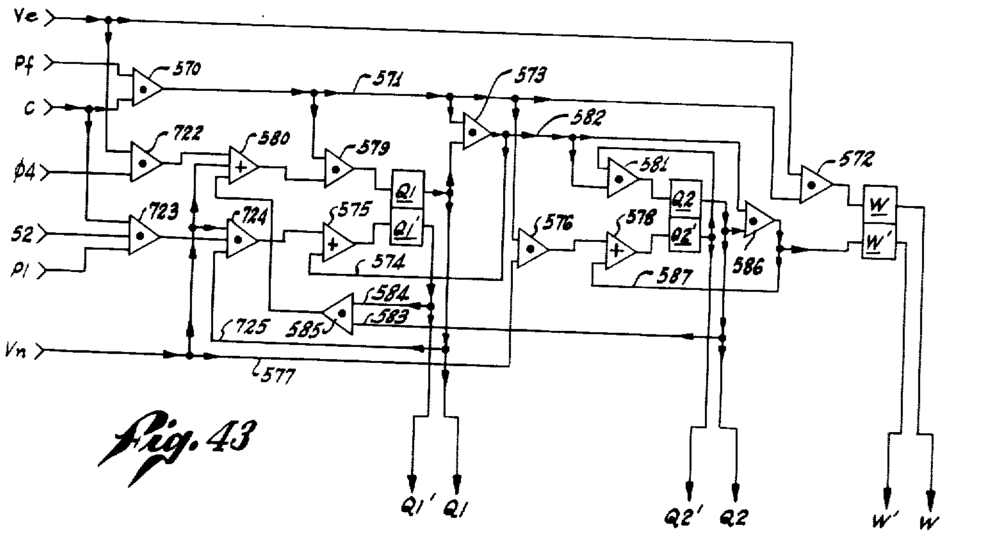
FIGURE 43 is a schematic diagram illustrating the components and circuitry comprising an auxiliary timing and control system herein designated as the "W" chain.

The operation of the flip-flops Q1, Q2 and W is controlled by the signals Ve, Vn, Pf, and C through the use of appropriate gating networks which are illustrated in FIGURE 43, and which are defined (with reference to the normal mode of operation of Q1 only) by the following partial logic:

$$\underline{Q1} = Vn\ Pf\ C + Q1'\ Q2\ Pf\ C$$
$$\underline{Q1}' = Q1\ Pf\ C$$
$$\underline{Q2} = Q1\ Q2'\ Pf\ C$$
$$\underline{Q2}' = Vn\ Pf\ C + Q1\ Q2\ Pf\ C$$
$$\underline{W} = Ve\ Pf\ C$$
$$\underline{W}' = Q1'\ Q2'\ Pf\ C$$

As is shown in FIGURE 43, signals Pf and C are combined in an "and" gate 570 to deliver to a bus 571 the signal configuration Pf C. This configuration is combined in an "and" gate 572 with the signal Ve to provide a signal configuration Ve Pf C which is applied to the "on" input of flip-flop W, this circuit serving to turn W on at the beginning of the selected word. If flip-flop Q1 should be on at this time, it is turned off coincidentally with the turning on of flip-flop W by a signal Q1 Pf C which is produced by combining in an "and" gate 573 a signal Q1 taken from the true output of flip-flop Q1 and the signal combination Pf C taken from the bus 571. The output of the gate 573 is applied as indicated at 574 to one input of an "or" gate 575, the output of which is applied to the "off" input terminal of Q1.

Flip-flop Q2, if not already off, is turned off at the end of the selected word by the signal configuration Vn Pf C. This configuration is obtained by combining in an "and" gate 576 the combination Pf C taken from the bus 571 and a signal Vn taken from a conductor 577. The output the gate 576 is passed through an "or" gate 578 and applied to the "off" input terminal of Q2. At the same time, that is, at the end of the selected word, flip-flop Q1 is turned on by the signal configuration Vn Pf C produced by an "and" gate 579, one input of which is taken from the Pf C bus 571 and the other of which constitutes a signal Vn taken from the conductor 577 and passed through an "or" gate 580. Thus, at the end of the selected word, flip-flop Q1 is turned on, Q2 is turned off, if it is not already off, and W remains on.

One word time later; that is, at the end of the word following the selected word, Q2 is turned on and Q1 is turned off. Q2 is turned on by the signal configuration Q1 Q2′ Pf C produced by an "and" gate 581, the output of which is connected to the "on" input terminal of Q2. Gate 581 has two inputs, one of which is connected to the "false" output terminal of Q2 so as to be supplied with a signal Q2′, and the other of which is connected as indicated at 582 to the output of gate 573 supplying the signal configuration Q1 Pf C. Q1 is at this time turned off by the signal configuration Q1 Pf C produced by the gate 573 and applied to the "off" input terminal of Q1 through the "or" gate 575 as previously described. Thus, at the end of the word following the selected word, Q1 is turned off, Q2 is turned on and W remains on.

One word time later; that is, at the end of the second word following the selected word, Q1 is turned on, while the status of Q2 and W is unchanged. Q1 is turned on by the signal configuration Q1′ Q2 Pf C. Signals Q2 and Q1′ are combined as indicated at 583 and 584 in an "and" gate 585, the output of which is passed through the aforementioned "or" gate 580 to be combined in gate 579 with the signal group Pf C taken from the bus 571. Thus, at the end of the second word following the selected word, Q1 is turned back on while Q2 and W remain in their "on" conditions.

At the end of the next word time; that is, at the end of the third word following the selected word, each of flip-flops Q1, Q2, and W is turned off. Q1 is turned off by the signal Q1 Pf C supplied through the "or" gate 575 as previously described. Q2 is turned off by a signal Q1 Q2 Pf C formed by an "and" gate 586, the output of which is applied as indicated at 587 to a second input of the "or" gate 578, the output of which is connected to the "off" terminal of Q2. Gate 586 has two inputs, one of which is connected to the "true" output terminal of Q2, and the other of which is connected as indicated at 588 to the output of gate 573, which, as previously described, supplies a signal Q1 Pf C.

The signal Q1 Q2 Pf C produced by the gate 586 is connected to the "off" terminal of flip-flop W, and serves to turn off flip-flop W along with Q1 and Q2 at the end of the third word time following the selected word, as shown in FIGURE 44.

The timing signals Q1 and Q2′ provided by flip-flops Q1 and Q2 are used in cooperation with timing signals S1, S2, and F5 to limit the operation of the excess-three corrector (gating nework 480 and driver Gd) to the twenty pulse times during which the results of the computation are delivered by flip-flop Y3. Because of the four-pulse delay occurring in flip-flops Ac, Y1, Y2, and Y3, these twenty pulse times constitute the second, third, fourth, and fifth syllables of the selected word time and the first syllable of the word time next following. This period of time is defined by the timing signal $$(Vn\ S2+Vn\ F5+Q2'\ Q1\ S1)$$

delivered by the "or" gate 555 in FIGURE 42. The first term of this signal ($Vn$ S2) defines the second syllable of the selected word time, while the second term ($Vn$ F5) defines the third, fourth, and fifth syllables of the selected word time, as may be seen from FIGURE 22. The third term (Q2′ Q1 S1) defines the first syllable of the word next following the selected word time, as may be seen from FIGURES 22 and 44.

The timing signal thus applied, as indicated at 553 (FIGURE 42), to the gate 552 serves to open the gate to the passage of signals delivered by the "or" gate 551 during the twenty pulse period above mentioned, and to close the gate 552 against the passage of such signals at all other times. In this connection it will be understood that the driver Gd operates differently from a flip-flop, as hereinbefore explained. The driver Gd will deliver on its "true" output terminal a signal (for example, +15 volts) during the twenty pulse period mentioned whenever a signal is delivered by any one of the gates 547–550. These gates collectively will deliver a signal whenever the three sets of arithmetic signals produced by flip-flops Y3, F2, and Ky have any one of the four relations requiring the entry of a "1" in the corresponding bit of the corrected result.

The excess-three corrector 422 thus operates to deliver at the output of the driver Gd signals representing the result of the computation called for by the keyboard setting and controls and so corrected as to be correctly expressed by the excess-three code. Each bit of the corrected result occurs four pulses later than the corresponding bits of the original data read from the main memory drum and delivered to the computing apparatus by the input flip-flop Me.

Figure 45:
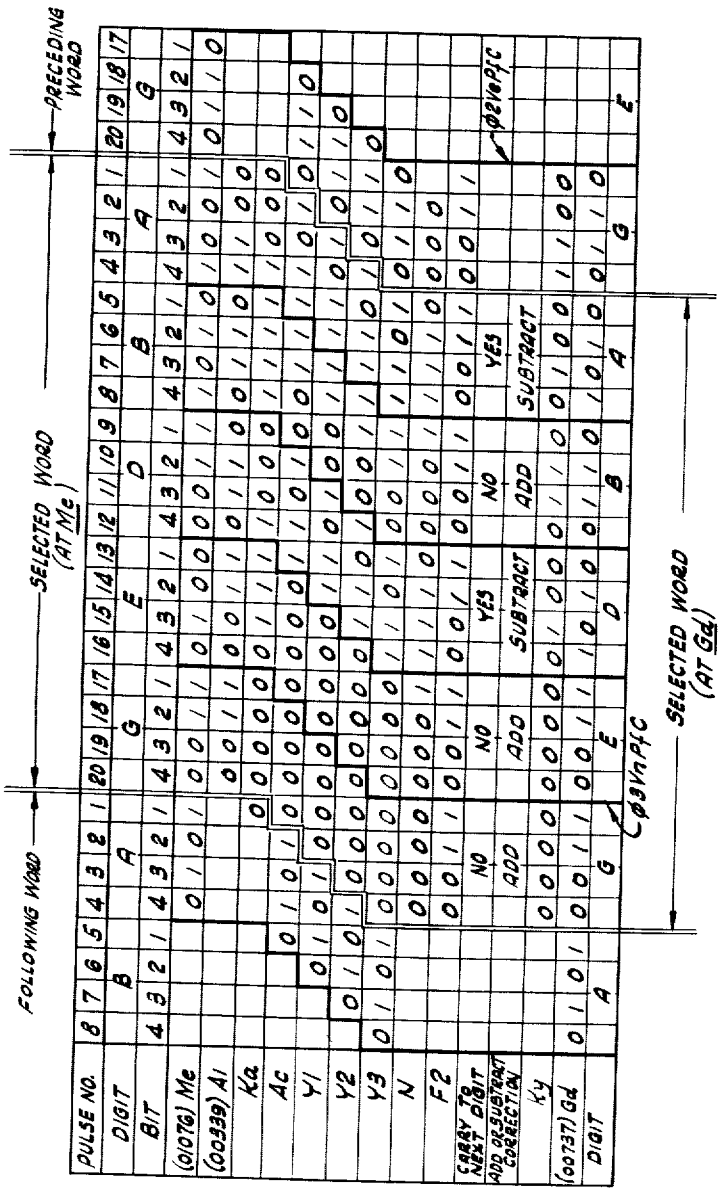
FIGURE 45 is a timing chart showing the various signals involved in an exemplary subtraction, the operations performed on the signals, and their progress through the computing section.

*Example of computation and correction.*—The operation of the above-described apparatus in handling a specific problem is illustrated by way of a timing chart in FIGURE 45. In this chart, since the least significant bits are processed first, time is considered as progressing from right to left so that the least significant bits may appear to the right of bits of higher order. The chart embraces the selected word and includes one digit of the preceding and following words. The first three rows of the chart identify the pulse number in each word and also identify each pulse by digit and bit number. The five digits of the selected word are set off from the other words by double lines, and the digits of each are set off from adjacent digits by heavy lines. In reading the chart, each vertical column represents a given pulse time referred to the outputs of flip-flops Me and F, and the bits appearing in any given column represent at that given time the signals identified by the signal designations heading each horizontal row.

FIGURE 45 shows the computation for a subtraction operation in Sequence Three where the selected word in the main memory is 01076 (decimal) and the subtrahend entered from the keyboard is 00339 (decimal), these words, expressed in the "excess-three" code, being represented respectively by rows of FIGURE 45 marked "Me" and "A1." The next row, marked "Ka," shows the operation of the carry flip-flop Ka, and the following row, marked "Ac," shows the uncorrected results of the computation.

The one pulse delay in Ac is seen in the shift of Ac one pulse to the left of the three inputs Me, A1, and Ka from which it is derived. The remaining three delays established by the delay flip-flops Y1, Y2, and Y3 are next shown, indicating that the information coming from Y3 occurs four bits later than the corresponding signals from Me, A1 and Ka from which it is derived. As a consequence, the first bit of the first digit occurs in Y3 at the same time as does the carry Ka into the first bit of the second digit. This permits the Ka signal at the first bit of the second digit to control the operation of the flip-flop Ky for the first bit of the first digit appropriate to whether the correction is to be added or subtracted.

The results of the computation, corrected to the "excess-three" code, are represented in the lowermost horizontal row marked "Gd," from an inspection of which it will be seen that the difference between 01076 (decimal) and 00339 (decimal) is correctly represented as 00737 (decimal) by the binary notation in the "excess-three" code.

The operation may be seen by tracing the sequential functioning of the apparatus, as shown in FIGURE 45. At the first pulse time, the two "0's" in Ka and A1 are subtracted from the "1" in Me to produce at pulse No. 2 a "0" in Ka and a "1" in Ac. At the same time (pulse No. 2), the three "0's" in Me, A1 and Ka produce in pulse No. 3 a "0" in Ac and a "0" in Ka. At this time, the "1" in Ac at pulse No. 2 is transferred to Y1. Also, in pulse No. 3, the "1" in A1 is subtracted from the "0" in Me to produce a "1" in Ka and a "1" in Ac at pulse No. 4. The "1" in Y1 is stepped to Y2 and the "0" in Ac is stepped to Y1. At the fourth pulse time, the sum of the two "1's" in Ka and A1 is subtracted from the "1" in Me to produce a "1" in Ka and a "1" in Ac at pulse No. 5. The "1" in Y2 is stepped into Y3, the "0" in Y1 is stepped into Y2, and the "1" in Ac is stepped into Y1. Thus at pulse No. 5, Y3 shows the results of the addition performed during the first pulse and Ka shows a carry from the first decimal digit to the next.

The remaining steps in the operation can be traced in a similar fashion to show that each digit of the result is delivered from Y3 four pulses after the computation was performed.

The "1" in Ka at pulse No. 5 produces "1's" in N at pulses Nos. 6–9. Similarly, "1's" are produced in N at pulses Nos. 14–17. The "0" in Ka at pulse No. 9 produces "0's" in N at pulses Nos. 10–13, and, in a similar fashion, N is caused to produce "0's" for pulses Nos. 18–20 and for the next four pulse times.

The "1" in Ka at pulse No. 5, followed by the "1's" in N at pulses Nos. 6–8, reveals a carry from the second to the third decimal digit, and so requires addition for the excess-three correction. Similar conditions obtain for the fourth and fifth decimal digits.

The sum of the "1" in F2 and the "0" in Ky is subtracted from the "1" in Y3 at pulse No. 5 to produce a "9" in Gd at pulse No. 5 and a "0" in Ky at pulse No. 6. Also, in pulse No. 6, the sum of the "1" in F2 and the "0" in Ky is subtracted from the "0" in Y3 to produce a "1" in Gd at pulse No. 6 and a "1" in Ky at pulse No. 7. In pulse No. 7, the sum of the "0" in F2 and the "1" in Ky is subtracted from the "1" in Y3 to produce a "0" in Gd at pulse No. 7, and a "0" in Ky at pulse No. 8. In pulse No. 8, the sum of the two "0's" in F2 and Ky is subtracted from the "1" in Y3 to produce a "1" in Gd at pulse No. 8 and a "0" in Ky at pulse No. 9. In the next digit, during pulses Nos. 9–12, a similar operation is performed except that the arithmetic process is addition. The same mode of operation obtains during correction of the three remaining digits.

Figure 46:
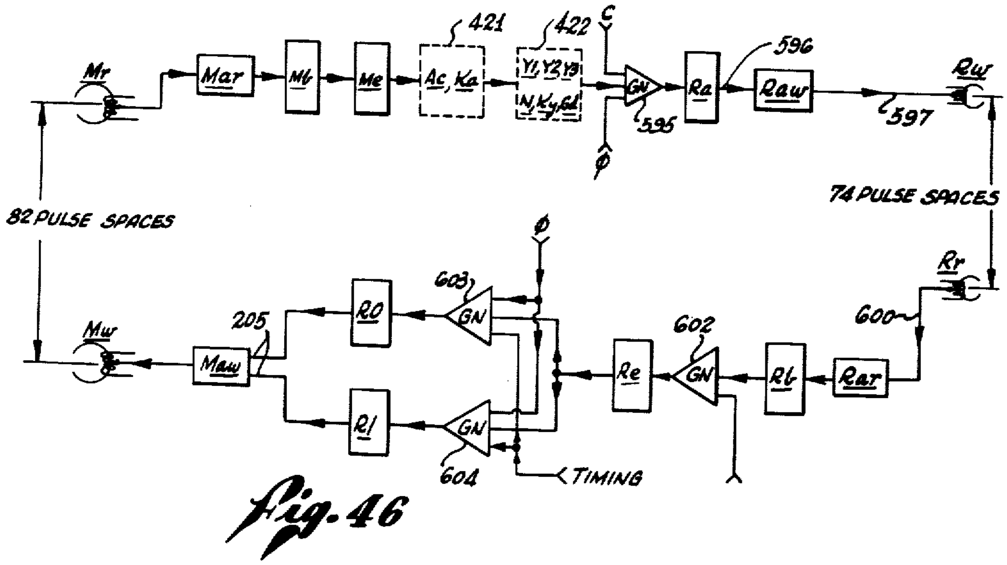
FIGURE 46 is a schematic block diagram illustrating the circuitry used to read information from the main memory, perform the computations, and write the result of the computation in the main memory in place of the original information.

*Entry of result in memory.*—As mentioned earlier, the selected word, altered by the computation, and the remaining unaltered words on the channel are recorded in the main memory channel in the same location as previously occupied by the corresponding words. The circuitry by which this is accomplished is represented diagrammatically in FIGURE 46. As is shown therein, the output of the driver Gd of the excess-three corrector 472 is used to operate a recording flip-flop Ra controlled by gating network 595.

The output of the recording flip-flop Ra is fed as indicated at 596 to a recording amplifier Raw, the output of which is delivered as indicated at 597 to the delay channel write head Rw, so that there is recorded on the delay channel the same information as is delivered by Gd. The delay channel read head Rr is positioned seventy-four pulse spaces behind the write head Rw so that a given bit is read seventy-four pulses after it is recorded. The signal generated by the delay channel read head Rr is passed as indicated at 600 through a read amplifier Rar to a buffer flip-flop Rb as shown at 601, the output of the buffer flip-flop Rb being applied to a gating network 602 used to control an input flip-flop Re.

In Sequence Three, the output from the flip-flop Re is used to actuate a pair of recording flip-flops R0 and R1, these flip-flops being controlled during this sequence by gating networks 603 and 604. The recording flip-flops R0 and R1 are used to drive the recording amplifier Maw as shown at 605 to record "0's" and "1's" respectively, the amplifier Maw being connected to the main memory write head Mw. Two recording flip-flops (R0 and R1) are utilized for the reasons explained hereinbefore with reference to the recording flip-flops M0 and M1 and the check channel write amplifier Xaw.

The main memory write head Mw is positioned eighty-two pulse spaces behind the read head Mr so that a given bit will come beneath the write head Mw eighty-two pulses after it passes beneath the read head Mr. Since there is a total delay of eighty-two pulses from the read head Mr through the arithmetic section, the delay channel, and back to the write head Mw, the write head Mw records the altered information in exactly the same location as that occupied by the original. The eighty-two pulse delay mentioned comprises the seventy-four pulse delay in the delay channel itself and eight pulse delay in the circuitry, consisting of one pulse each in the flip-flops Me, Ac, Y1, Y2, Y3, Ra, Re, R0/R1.

Figure 47:
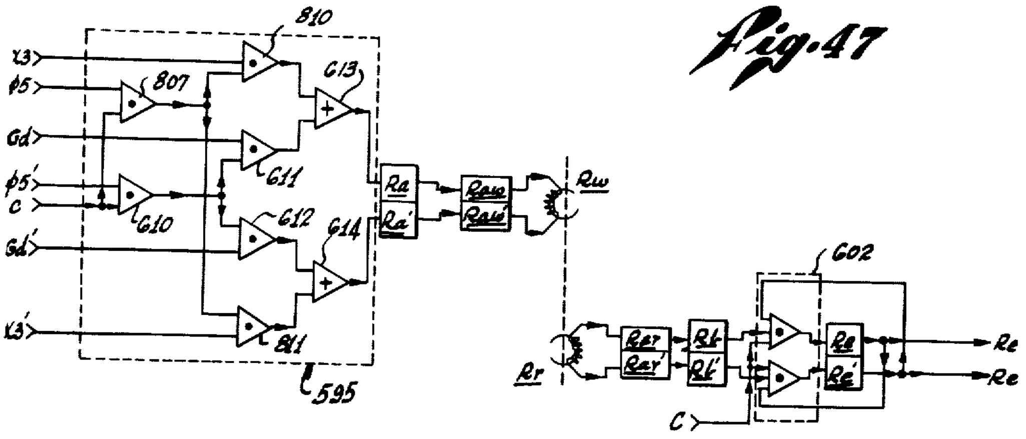
FIGURE 47 is a schematic diagram showing the delay channel read and write heads, the amplifiers associated therewith, and the various flip-flops and gating networks cooperating therewith, comprising the delay channel read circuitry and the delay channel write circuitry.

The delay channel read and write circuitry, including the gating networks 595 and 602, are illustrated in FIGURE 47 and, with reference to the operation during Sequence Three, are defined by the following partial logic:

$$Ra=\phi 5'\ Gd\ C$$
$$Ra'=\phi 5'\ Gd'\ C$$

$$(Raw)=Ra$$
$$(Raw')=Ra'$$

$$(Rw)=Raw$$
$$(Rw')=Raw'$$

$$(Rar)=Rr$$
$$(Rar')=Rr'$$

$$Rb=Rar$$
$$Rb'=Rar'$$

$$Re=Rb\ Re'\ C$$
$$Re'=Rb'\ Re\ C$$

As shown in FIGURE 47, the gating network 595 controlling the operation of flip-flop Ra includes an "and" gate 610 in which the signals C and $\phi 5'$ are combined to produce an output ($\phi 5'$ C) which is combined with the signal Gd in an "and' gate 611 and with the signal Gd' in an "and" gate 612, the outputs of gates 611 and 612 being applied to the "on" and "off" input terminals respectively of flip-flop Ra through associated "or" gates 613 and 614. Since the signal configuration $\phi 5'$ C exists at all times except during Sequence Five, flip-flop Ra follows the output of driver Gd in all sequences except Sequence Five.

The two outputs of flip-flop Ra are connected, as indicated in FIGURE 47, to corresponding inputs of the delay channel write amplifier Raw, and the outputs of this amplifier are applied to the delay channel write head Rw as shown. The delay channel write amplifier Raw may be of any suitable construction, for example, of the character illustrated in FIGURE 32 previously described.

Signals produced by the delay channel read head Rr are amplified in a suitable read amplifier Rar which may be of any suitable construction, for example, of the character illustrated in FIGURE 21 and previously described. The amplified signals delivered by the read amplifier Rar operate the buffer flip-flop Rb and the resulting outputs are passed through the gating network 602 to control the operation of the input flip-flop Re, the circuitry utilized in the flip-flops Rb and Re and the gating network 602 being identical preferably with the F channel read circuitry hereinbefore described with reference to FIGURE 20.

The main memory channel write circuitry including the gating networks 603, 604 and flip-flops R0/R1 are illustrated in detail in FIGURE 31 and, insofar as they are operative during Sequence Three, are defined by the following partial logic:

$$R0=\phi 3\ W'\ Re\ C$$
$$R0'=\phi 3\ W'\ Re'\ C$$

$$R1=\phi 3\ W'\ Re'\ C$$
$$R1'=\phi 3\ W'\ Re\ C$$

$$(Maw)=R1'$$
$$(Maw')=R0'$$

$$(Mw)=Maw$$
$$(Mw')=Maw'$$

As is shown in FIGURE 31, signals Re' and C are combined in an "and" gate 618, while signals Re and C are combined in an "and" gate 619. The output of each of these two gates is applied as one input to a corresponding one of a pair of "and" gates 620 and 621, the other input of each of said gates being connected as indicated at 622 and 623 to the output of an "or" gate 624. One of the inputs of the "or" gate 624 comprises the signal configuration $\phi 3$ W' which is formed in an "and" gate 625. Gate 625 has a third input to which a signal Z0' is applied. Since this signal is normally present, as is explained hereinafter, its presence is assumed in this portion of the description.

The output of "and" gate 620 is applied directly, as indicated at 626, to the "off" input terminal of flip-flop R0 and also through an "or" gate 627 to the "on" input terminal of the flip-flop R1. In a similar manner, the output of "and" gate 621 is applied directly, as shown at 628, to the "off" input terminal of flip-flop R1 and also through an "or" gate 629 to the "on" input terminal of flip-flop R0. The false output terminals of flip-flops R1 and R0 are connected to the true and false input terminals, respectively, of the main memory write amplifier Maw. The write amplifier Maw may be of any suitable construction, for example, of the character illustrated in FIGURE 32 previously described.

Except for the four word times during which flip-flop W is on (see timing chart, FIGURE 44), flip-flops R0 and R1 will follow Re so that an R1' signal will result from an Re signal and an R0' signal will result from an Re' signal. The W' term is included in the timing control signal ($\phi 3$ W') to prevent recording in the main memory channel during the selected word time and the three words next following, since during these four word times Re may be reproducing unrelated and incorrect signals previously recorded on the delay channel during other sequences or cycles of operation.

It will be appreciated that the first bit of the altered word will not be presented to the gating network 603, 604 until after flip-flop W has been turned off. This results from the eighty pulse delay in transmission consisting of the previously mentioned four pulse delay between Mc and Gd, the one pulse delay in each of flip-flops Ra and Rc, and the seventy-four pulse delay in the delay channel proper. In this way, the gating network 603, 604 is rendered operative by the signal W′ coincidentally with the arrival of the first bit of the altered word, and the main memory writing circuitry operates to record each bit of the altered word in exactly the same location as is occupied by the word so altered.

The unaltered portion of the channel (all except the selected word) is transcribed in the same way, except that the information as read from the memory drum by the read head Mr is passed through the arithmetic section without alteration. This is accomplished by the following additional terms in the logic of the computation flip-flop Ac and the driver Gd of the "excess-three" corrector:

$$\underline{Ac}=\phi 3\ Vn'\ Me\ C$$
$$\underline{Ac'}=\phi 3\ Vn'\ Me'\ C$$
$$(\underline{Gd})=Q1\ Q2'(S2+F5)Y3+Vn'(Q2+Q1')Y3+Vn\ S1\ Y3$$

The circuit arrangement defined by the above additional terms in the logic for the flip-flop Ac may be seen in FIGURE 35, wherein the signal $\phi 3$, supplied by conductor 448 and passed through the "or" gate 447, is combined in an "and" gate 633 with the signal V*n*′ supplied by a conductor 634. The output of the "and" gate 633 constitutes the second input to the "or" gate 348 from which the signal configuration $\phi 3$ V*n*′ is applied as indicated at 349 and 350 to the "and" gates 345 and 351 to which the signals M*e* C and M*e*′ C are applied as previously described. Thus, throughout all of Sequence Three, except for the one-word time occupied by the selected word, flip-flop Ac follows flip-flop Mc. As previously described, Ac controls Y1, Y1 controls Y2, and Y2 controls Y3 so that the output of flip-flop Y3 also follows flip-flop Mc. As is indicated by the above additional logic for Gd, the output of Y3 is passed through Gd without change, and the output of Gd is ultimately recorded in the main memory as hereinabove described.

Because the signals delivered by Gd have been delayed four pulses, the above additional logic for Gd is arranged to exclude the time occupied by the altered word (i.e., the last sixteen pulses of the selected word time and the first four pulses of the word following) by including all of the word time next following except the first four pulses thereof (the first term of the above Gd logic) and all of the remainder of the channel around to the selected word time (the second term) and the first four pulses of the selected word time (the third term), as may be seen from FIGURES 22 and 44.

The additional circuits defined by the additional logic for Gd given above may be seen in FIGURE 42. The first term of this additional logic is supplied by an "and" gate 638 in which are combined the signal Y3 taken from conductor 541, the signal Q1 taken from conductor 565, the signal Q2′ taken from conductor 567, and alternative signals ($S2+F5$) supplied by an "or" gate 639, the inputs of which are connected to conductors 561 and 653 as shown. The second term of the additional logic is supplied by an "and" gate 640 in which are combined the signal Y3 taken from conductor 541, a signal V*n*′ taken from a conductor 641, and alternative signals ($Q1'+Q2$) supplied by an "or" gate 642 to which signals Q1′ and Q2 are applied as inputs as by conductors 643 and 644, respectively. The third additional term in the above logic is supplied by an "and" gate 645 in which are combined the signal Y3 taken from conductor 541, the signal V*n* taken from conductor 560, and signal S1 taken from conductor 566. The outputs of the "and" gates 638, 640 and 645 constitute the three alternative inputs to the "or" gate 554 connected to the input of the driver Gd.

Since the signal Y3 is applied as an input to each of the three "and" gates 638, 640 and 645, Gd will follow Y3 during the times defined by the signals applied as additional inputs to the three mentioned "and" gates. Thus, except for the twenty pulses when driver Gd functions in cooperation with the excess-three corrector, the driver Gd operates to pass on without change the information represented by the Y3 signal. As previously pointed out, this information is ultimately recorded in the proper location in the main memory channel.

Sequence Three terminates when the selected word again comes under the main memory read head, flip-flop $\phi 3$ being turned off, and $\phi 4$ being turned on. The circuitry producing this function is shown in FIGURE 27 and defined by the following partial logic:

$$\underline{\phi 3'}=\phi 3\ Ve\ Pf\ C$$
$$\underline{\phi 4}=\phi 3\ Ve\ Pf\ C$$

As is shown in FIGURE 27, the signal $\phi 3$ taken from the true output of flip-flop $\phi 3$ is combined in an "and" gate 650 with the signal configuration V*e* P*f* C taken from the "and" gate 247. The output of the "and" gate 650 is applied through an "or" gate 651 to the "off" input terminal of flip-flop $\phi 3$. The "and" gate 650 has a third input to which a signal Z0′ is applied. As explained in more detail hereinafter, this signal is normally present and it will be so assumed for the purpose of the present description.

The output of the "and" gate 650 is also applied through an "or" gate 652 to the "on" input terminal of flip-flop $\phi 4$.

The above circuitry functions at the time V*e* P*f* when the selected word again comes under the main memory read head to turn off flip-flop $\phi 3$ and to turn on flip-flop $\phi 4$.

At the time Sequence Three goes off and Sequence Four comes on, four words in the delay channel remain to be copied onto the main memory channel. The writing operation in the main memory is therefore continued through the first four words of Sequence Four by appropriate gating controls shown in FIGURE 31 and defined by the following partial logic:

$$\underline{R0}=\phi 4\ W\ Re\ C \qquad \underline{R1}=\phi 4\ W\ Re'\ C$$
$$\underline{R0'}=\phi 4\ W\ Re'\ C \qquad \underline{R1'}=\phi 4\ W\ Re\ C$$

The signal ($\phi 4$ W) appearing in each of the above four equations defines the first four words of Sequence Four, as may be seen by reference to FIGURE 44. During this four word period, flip-flops R0 and R1 are caused to follow flip-flop Re in a manner identical to that above described in connection with the operation during Sequence Three so that R1 will be turned off to effect the recording of "1's" and R0 will be turned off to effect the recording of "0's."

The signal configuration ($\phi 4$ W) is produced by an "and" gate 655 (FIGURE 31) in which the signals $\phi 4$ and W are combined. The output of gate 655 is applied as one of the inputs to the aforementioned "or" gate 624, thus controlling the operation of the flip-flops R0 and R1 in a manner identical to the control exercised by the signal configuration ($\phi 3$ W′) hereinabove described.

By the means just described, writing in the main memory channel is continued for the additional four words required to complete the writing operation.

*Sequence Four*

In accordance with one of the major purposes of this invention, and to the end that the possibilities of errors or loss of data may be reduced to a minimum, Sequence Four is utilized to check the computation and the copying functions to ensure that the information just placed in the main memory is correct and involves no errors of computation or transcription. Therefore, in Sequence Four, the computation and copying are checked by a proof computation; that is, if a subtraction operation was performed in Sequence Three, the subtraction is proved in Sequence Four by adding the subtrahend to the difference to obtain a figure which (if there were no errors in computation or copying) is equal to the original minuend. During this computation, the subtrahend is stepped out of the input register and replaced by the difference resulting from the computation in Sequence Three, this altered word then being read out by the visual display 61 or output printer 63. The detection of errors by means of a proof computation is made possible by the previously mentioned important feature of the invention providing for the previous preparation of a verified copy of the original data. Thus, the proof figure obtained from the computation in Sequence Four is compared, bit-by-bit, with the verified copy of the original channel currently stored in the check channel. If these two figures compare in all respects, Sequence Four goes off and Sequence Zero comes on, the normal cycle of operation of the machine being completed.

Figure 48:
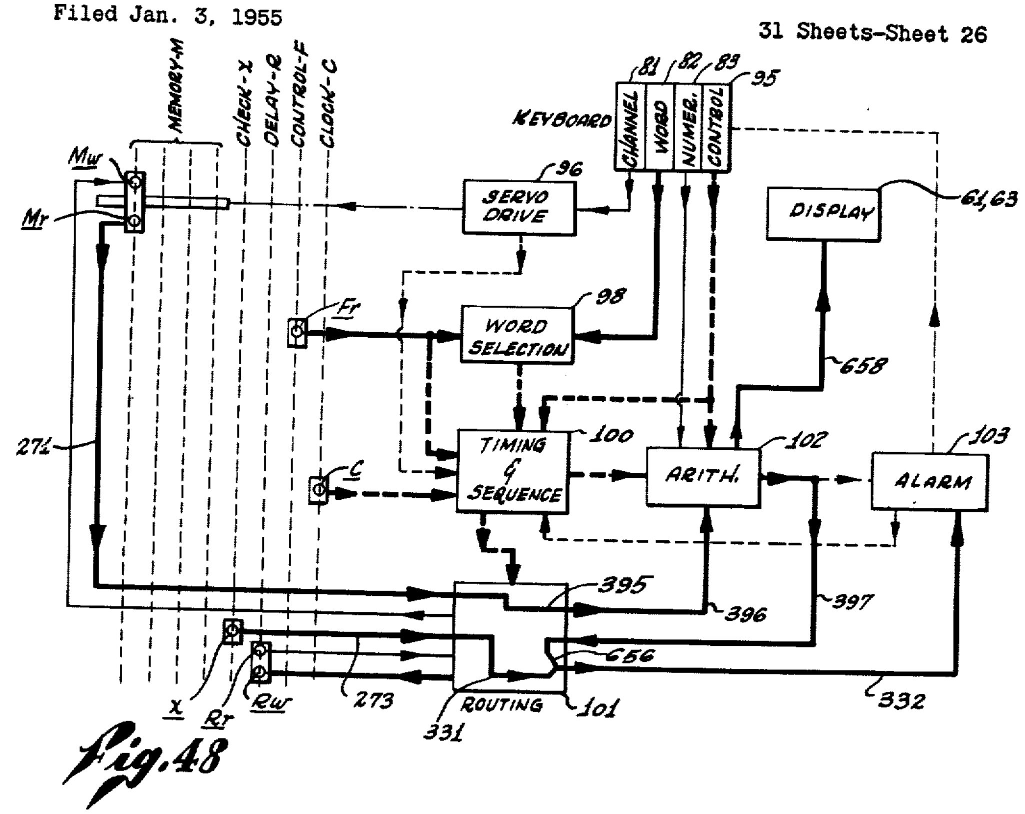
FIGURE 48 is the block diagram of FIGURE 6 reproduced to emphasize the functional correlations operative during Sequence Four.

The manner in which the signals are handled and routed during Sequence Four is illustrated in the functional diagram FIGURE 48. As shown therein, information read from the main memory channel by the read head $\underline{Mr}$ is conducted, as indicated by the heavy lines 271, 395, and 396, to the arithmetic section 102 where the proof computation takes place. The results of the computation are conveyed to the error detector and alarm 103, as indicated by the heavy lines 397, 656, and 332. At the same time, the verified copy contained in the check channel is read by the check channel head $\underline{X}$ and delivered to the error detector and alarm 103, as indicated by the heavy lines 273, 331, and 332. The bit-by-bit comparison of the two sets of information is made by the error detector and alarm 103 in the manner hereinafter described.

As soon as the altered word has been read, it is transmitted from the input or stepping register to the display device 61 or printer 63, as indicated by the heavy line 658.

*Proof computation*.—The proof computation is performed by the arithmetic section 102 in substantially the same way as has been described above with reference to Sequence Three. However, since the proof computation will constitute an addition, if a subtraction was performed in Sequence Three, and vice versa, the logic for the gating networks 420 and 423 and flip-flops $\underline{Ac}$ and $\underline{Ka}$ of the computing section 421, and the logic for the gating networks 481 and flip-flop $\underline{Ky}$ of the "excess-three" corrector 422 include the necessary terms for effecting this modification in operation. The circuits of the computing section operative during Sequence Four (when the keyboard orders a subtraction in Sequence Three) are shown on FIGURE 35 and are expressed by the following partial logic:

$$\underline{Ac}=\phi 4\ Vn(Me\ A1'\ Ka'+Me'\ A1\ Ka'+Me'\ A1'\ Ka+Me\ A1\ Ka)C$$

$$\underline{Ac'}=\phi 4\ Vn(Me\ A1\ Ka'+Me\ A1'\ Ka+Me'\ A1\ Ka+Me'\ A1'\ Ka')C$$

$$\underline{Ka}=\phi 4\ s\ Me\ A1\ Ka'\ C$$

$$\underline{Ka'}=\phi 4\ s\ Me'\ A1'\ Ka\ C+Ve\ Pf\ C$$

The logic for $\underline{Ac}$ is identical with that previously given except for the substitution of the term $\phi 4$ for the signal $\phi 3$. This substitution is effected by applying the signal $\phi 4$ to one of the inputs of the "or" gate 447 (FIGURE 35) so that the flip-flop $\underline{Ac}$ will be controlled identically in both Sequence Three and Sequence Four. The logic for $\underline{Ka}$ is likewise similar to that previously given, except that it is appropriate for addition where the former logic was appropriate for subtraction. As the above logic indicates, $\underline{Ka}$ is turned on to provide a carry to the next bit whenever two or more "1's" are added together; with $\underline{Ka}$ initially off (having been turned off by the setting signal $Ve\ Pf\ C$), it will be turned on when "1's" are delivered by both $\underline{Me}$ and $\underline{A1}$ and will then remain on until "0's" are delivered by both $\underline{Me}$ and $\underline{A1}$. In other words, if there is no Carry In from a preceding bit, a Carry Out will be produced when the two numbers added are both "1's," and if there is a Carry In from a preceding bit, $\underline{Ka}$ will produce a Carry Out if the two bits being added are not both "0's."

As is shown in in FIGURE 35, signals $\phi 4$ and "$s$" are combined in an "and" gate 660, the output of which is coupled through an "or" gate 661 to an "and" gate 662. In gate 662 the signal configuration ($\phi 4\ s$) is combined with the clock signal C supplied by conductor 430, signal $Me$ supplied by conductor 436, signal A1 supplied by conductor 429, and signal $Ka'$ supplied by conductor 431. The output of gate 662 is passed through the "or" gate 432 to control the "on" input of flip-flop $\underline{Ka}$ in the manner indicated by the above logic equation.

The output of "or" gate 661 is also connected, as indicated at 663, to the input of an "and" gate 664 where the signal configuration ($\phi 4\ s$) is combined with the clock signal C supplied by conductor 430, signal $Me'$ supplied by conductor 428, signal $A1'$ supplied by conductor 437, and signal $Ka$ supplied by conductor 438. The output of "and" gate 664 is applied as one of the inputs to the "or" gate 433 to thereby control the "off" input of flip-flop $\underline{Ka}$ in the manner set forth by the above logic equations.

The circuits of the "excess-three" corrector 422 which are operative during Sequence Four are identical to those described with reference to Sequence Three, except for the controls for flip-flop $\underline{Ky}$ which, during Sequence Four with a subtraction ordered by the keyboard, involve logic appropriate to effecting the proper correction to the result of an addition. The circuits associated with $\underline{Ky}$ and operative during Sequence Four under the assumed conditions are shown in FIGURE 42 and defined by the following partial logic:

$$\underline{Ky}=\phi 4\ s[(Ka\ F1'+N\ F1)Y3\ F2+(Ka'\ F1'+N'\ F1)Y3'\ F2]C$$

$$\underline{Ky'}=\phi 4\ s(N\ Y3'\ F2'+N'\ Y3\ F2')C+Ve\ Pf\ C$$

Since the excess-three correction required in addition is the addition of three if there has been a carry from one code group to the next, and subtraction if there has been no carry, the correction to be applied is the converse of that described with reference to the subtraction operation performed during Sequence Three. Thus, as shown by the above logic, the particular combinations of the outputs of $\underline{Y3}$ and $\underline{F2}$ which were previously combined with $Ka'$ and $N'$ signals (indicating no digit-to-digit carry) are now combined with the $Ka$ and $N$ signals (indicating a digit-to-digit carry), and vice versa.

Thus, as may be seen from FIGURE 42, the signal configuration ($Ka\ F1'+N\ F1$) from the "or" gate 501 is combined as indicated at 668 in an "and" gate 669 with the signal Y3 F2 taken from gate 513 as shown at 670. Similarly, the signal configuration ($Ka'\ F1+N'\ F1$) from the "or" gate 506 is combined as indicated at 671 in an "and" gate 672 with the signal $Y3'$ F2 taken from gate 507 as indicated at 673. The outputs from gates 669 and 672 are both passed through an "or" gate 674 to an "and" gate 675 where they are combined with the clock signal C supplied by conductor 520 and with a signal ($\phi 4\ s$) taken from a conductor 676 to which the signal ($\phi 4\ s$) is supplied by a suitable gate such as the gate 661 of FIGURE 35. The output of gate 675 is connected to the input of "or" gate 522 to supply one of the "on" inputs to $\underline{Ky}$.

An "and" gate 677 is used to combine the signal N from conductor 489 with the signal Y3′ F2′ taken from gate 534 as indicated at 678, and an "and" gate 679 is used to combine the signal N′ from conductor 490 with the signal Y3 F2′ taken from gate 530 as indicated at 680. The outputs from gates 677 and 679 are both passed through an "or" gate 681 to an "and" gate 682 where they are combined with the signals C and ($\phi 4$ *s*) from conductors 520 and 676, respectively. The output of gate 682 is applied to one input of "or" gate 539 to control the "off" input of $\underline{Ky}$.

From the foregoing logic equations, and from the circuitry described above, it will be seen that if there has been a digit-to-digit carry ($\underline{Ka}$ and $\underline{N}$ on), $\underline{Ky}$ will be turned on if "1's" are delivered by both $\underline{Y3}$ and $\underline{F2}$; once on, it will stay on until "0's" are delivered by both $\underline{Y3}$ and $\underline{F2}$. On the other hand, where there is no digit-to-digit carry ($\underline{Ka}$ and $\underline{N}$ off), $\underline{Ky}$ will be turned on when a "1" from $\underline{F2}$ coincides with a "0" from $\underline{Y3}$; once on, it will remain on until a "0" from $\underline{F2}$ coincides with a "1" from $\underline{Y3}$.

Thus, the proof computation performed in Sequence Four is the converse of the computation in Sequence Three. In the assumed case, where a subtraction was performed in Sequence Three, the difference is added to the subtrahend in Sequence Four. The results is corrected to conform to the "excess-three" code, and the corrected result of the proof computation appears at the output of the driver $\underline{Gd}$.

Figure 50:
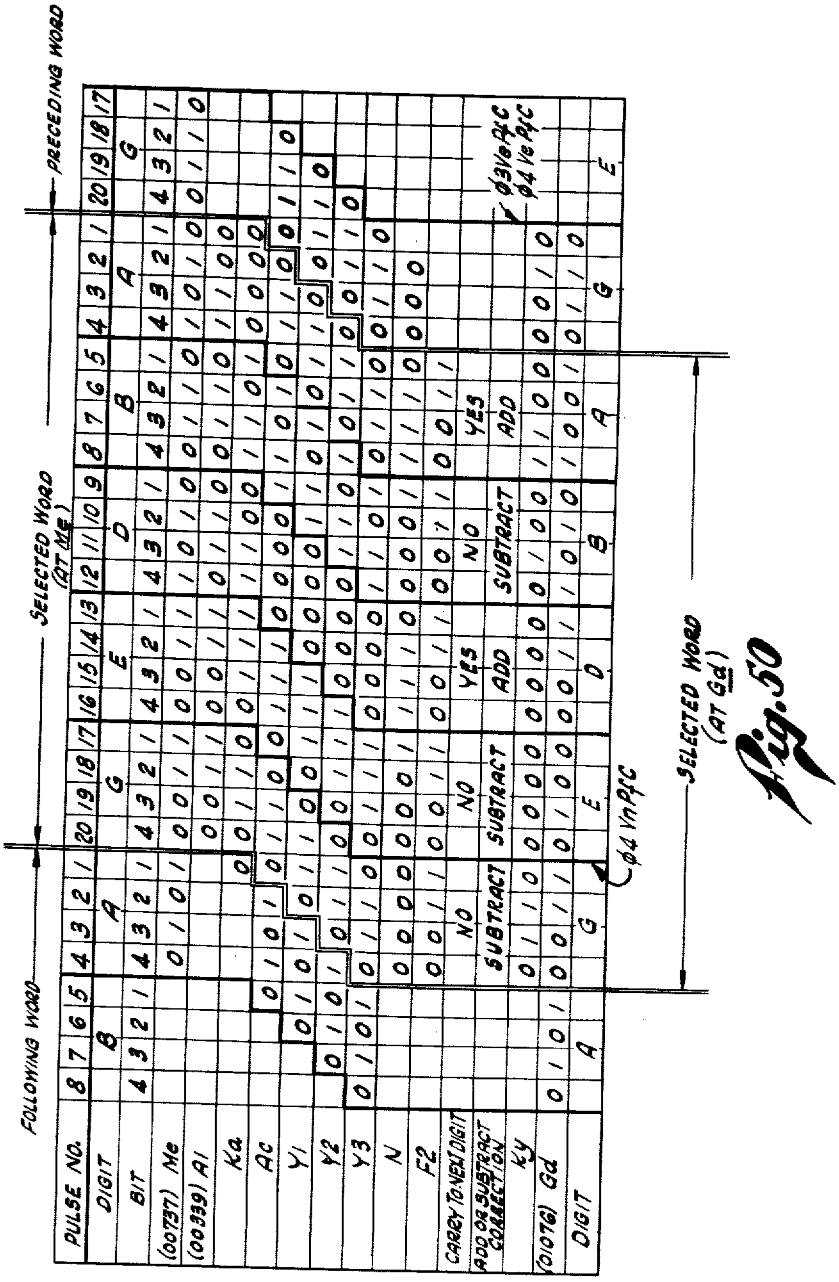
FIGURE 50 is a timing chart generally similar to the chart shown in FIGURE 45 but illustrating the converse operation of addition which is performed during Sequence Four to prove the results of the subtraction performed during Sequence Three.

The manner in which the proof addition for the assumed example is carried out is shown by FIGURE 50 which is a timing chart similar to FIGURE 45.

*Input register stepping.*—In order to perform the above-described proof computation, it is necessary that the bits of the subtrahend held in the input register be presented serially to the flip-flops $\underline{Ac}$ and $\underline{Ka}$ in synchronism with the bits of the result delivered by $\underline{Me}$. In Sequence Three a similar function was performed by circulating the contents of the register so that the bits appeared sequentially at the output of $\underline{A1}$. In Sequence Four this is acomplished by stepping into one end of the register (at flip-flop $\underline{G4}$) the altered word read from the main memory channel whereby to step out of the other end the original register contents, thus causing the bits of the subtrahend to appear sequentially at the output of $\underline{A1}$. In this way, the altered word read from the main memory is placed in the register for transmission to display apparatus 61, 63. The general case for the stepping register logic in Sequence Four is as follows:

$$\underline{S}=\phi 4\ Vn\ Sp\ C$$
$$\underline{S'}=\phi 4\ Vn\ Sp'\ C$$

$$\underline{Si}=\phi 4\ Vn\ Me\ C$$
$$\underline{Si'}=\phi 4\ Vn\ Me'\ C$$

Thus, the initial flip-flop $\underline{G4}$ (represented by $\underline{Si}$ in the above) is caused to follow $\underline{Me}$; each of the other flip-flops follow the flip-flop preceding. A given bit delivered by $\underline{Me}$ is stored in $\underline{G4}$ at the next fall of the clock; one pulse later it is transferred to $\underline{G3}$, and so on, the data moving from one flip-flop to the next at each fall of the clock until all twenty bits of the altered word have been stored in the register. At the start of this stepping operation, the least significant bit of the subtrahend appears at the outputs of $\underline{A1}$. At the first step, this bit is replaced by the next most significant bit. At each step following, the bit then appearing at the outputs of $\underline{A1}$ is replaced by the next most significant bit until all twenty bits of the subtrahend have been thus shifted out of the register. This operation differs from the circulation occurring in Sequence Three in that in Sequence Three the input to $\underline{G4}$ was taken from $\underline{A1}$, whereas in Sequence Four, the input to $\underline{G4}$ is taken from $\underline{Me}$.

The Sequence Four logic for the individual flip-flops of the stepping register is thus the same as that given above for Sequence Three, except that the signal $\phi 4$ is substituted for the signal $\phi 3$ and the previous $\underline{G4}$ logic is replaced by the following:

$$\underline{G4}=\phi 4\ Vn\ Me\ C$$
$$\underline{G4'}=\phi 4\ Vn\ Me'\ C$$

The substitution of the signal $\phi 4$ for the signal $\phi 3$ is accomplished as to all of the register flip-flops, except flip-flop $\underline{G4}$, by supplying the signal $\phi 4$ to the "or" gate 412 (FIGURE 38). For the reasons which will appear hereinafter, the signal $\phi 4$, supplied as by conductor 685, is passed through an "or" gate 686 and applied as indicated at 687 to the second input of the "or" gate 412. In this way the signal $\phi 4$ is combined in gate 411 with signals V*n* and C to provide the signal configuration $\phi 4$ V*n* C which is conveyed by the bus 410 to all of the gates 413 and 414 controlling the "on" and "off" sides, respectively, of all of the register flip-flops, except flip-flop $\underline{G4}$.

The control of flip-flop $\underline{G4}$ peculiar to Sequence Four, as indicated by the above logic equations, is also shown in FIGURE 38. The signal $\phi 4$ after passing through an "or" gate 686 is combined in an "and" gate 688 with the signal V*n* C supplied by the gate 381. The output of gate 688 is combined in an "and" gate 689 with the signal M*e* and in an "and" gate 690 with the signal M*e*′ to provide at the outputs of gates 689 and 690, respectively, the signal configuration ($\phi 4$ V*n* M*e* C) and ($\phi 4$ V*n* M*e*′ C). These two signals are applied as indicated at 691 and 692 to the "or" gates 386 and 376 controlling the "on" and "off" inputs, respectively, of flip-flop $\underline{G4}$.

It will be noted that during Sequence Four, the feed back from flip-flops $\underline{A1}$ to flip-flop $\underline{G4}$, previously described with reference to Sequence Three, is blocked at the gates 406 and 407 due to the absence of the control signal $\phi 3$ V*n* C required to open these gates.

As the altered word read from the main memory channel is stepped into the rigister at the input flip-flop $\underline{G4}$, the subtrahend previously stored in the register is stepped out so that the individual bits of the subtrahend appear at the outputs of $\underline{A1}$ in synchronism with the appearance of the corresponding bits of the altered word at the outputs of flip-flop $\underline{Me}$, the signals from $\underline{Me}$ and $\underline{A1}$ being used in the proof computation above described.

After the selected word is passed through the arithmetic section, the computing flip-flop $\underline{Ac}$ and the excess-three corrector $\underline{Gd}$ are conditioned to pass unaltered the bits read from the balance of the selected main memory channel, the logic for $\underline{Gd}$ being as given in connection with the description of Sequence Three, and the logic for $\underline{Ac}$ including the following additional term:

$$\underline{Ac}=\phi 4\ Vn'\ Me\ C$$
$$\underline{Ac'}=\phi 4\ Vn'\ Me'\ C$$

Flip-flop $\underline{Ac}$ is thus caused to follow $\underline{Me}$ during all of Sequence Four, except during the selected word time, the selected word time being excluded from such operation by the signal V*n*′ included in the above logic equations. The circuits operative to so control flip-flop $\underline{Ac}$ during this portion of Sequence Four are shown on FIGURE 35 as comprising the "or" gate 447 to which the signal $\phi 4$ is applied from conductor 449. Signal $\phi 4$ is combined with signal V*n*′ in gate 633 and passed through gate 348 to "and" gates 345 and 351 where they are combined with the clock signal C and with signals M*e* and M*e*′, as previously described. The outputs of gate 345 and 351 are applied to the "on" and "off" input terminals respectively of flip-flop $\underline{Ac}$ through the "or" gates 346 and 352.

During the first twenty pulses of Sequence Four (the selected word time) $\underline{Ac}$ delivers the results of the proof computation which should correspond exactly to the selected word originally contained in the main memory channel. For the balance of Sequence Four, $\underline{Ac}$ reproduces the unalterated contents of the main memory channel. Thus, if there have been no errors in computation or copying, the output of flip-flop $\underline{Ac}$ as relayed through the driver Gd will correspond in every particular with the verified copy contained in the check channel.

*Error detection.*—The detection of errors in computation or copying is effected by comparing the output of the excess-three corrector Gd bit-by-bit with the verified copy contained in the check channel. This is accomplished by means of a gating network controlling the error flip-flop Z1 as shown in FIGURE 30. The operation is similar to that previously described with reference to the operation of the machine during Sequence Two when the outputs of Ac and Xe were compared. However, in Sequence Four, since the output of Gd is delayed three pulses with respect to the output of Ac, it is necessary to delay correspondingly the output of Xe in order to preserve the synchronism of two sets of signals. This three pulse delay is provided by a chain of flip-flops X1, X2 and X3, interconnected as shown in FIGURE 33 and as defined by the following logic equations:

$$\underline{X1} = Xe\ C$$
$$\underline{X1'} = Xe'\ C$$
$$\underline{X2} = X1\ C$$
$$\underline{X2'} = X1'\ C$$
$$\underline{X3} = X2\ C$$
$$\underline{X3'} = X2'\ C$$

As is shown in FIGURE 33, the delay chain comprising flip-flops X1, X2, and X3 is identical to the delay chain Y1, Y2, Y3, illustrated in FIGURE 42 and previously described the input signals (in this case, from Xe) being appropriately gated to the clock signal C. The outputs of each of flip-flops X1 and X2 are similarly gated to the clock signal C and applied as inputs to flip-flops X2 and X3, respectively. A given bit represented by the status of Xe at a given time is transferred to Y1 at the next fall of the clock. In the two clock falls next following the bit is transferred from X1 to X2 and then from X2 to X3 so that a given bit will appear at the output of X3 three pulses after it appears at the output of Xe.

As pointed out in connection with the description of Sequence Two, the outputs of Ac and Xe are synchronized. Therefore, since the outputs of Ac and Xe are delayed three pulses by the delay chains X1, X2, X3, and Y1, Y2, Y3, the outputs of the driver Gd and the flip-flop X3 are also synchronized.

The bit-by-bit comparison of the outputs of Gd and X3 is effected by that part of the gating network shown in FIGURE 36 which is defined by the following partial logic:

$$\underline{Z1} = (\phi 4\ \phi 5' + \phi 4'\ \phi 5\ Vn\ S1)(Gd\ X3' + Gd'\ X3)C$$

In the above, signals enclosed by the first parentheses constitute the timing signals, and the signals enclosed by the second parentheses are the information signals which are compared. During the time defined by the timing signals, Z1 will be turned on whenever the comparison fails; i.e., whenever a "1" delivered by Gd coincides with a "0" delivered by X3, or vice versa. The $\phi 4$, $\phi 5'$ portion of the timing signal defines the entirety of Sequence Four, and the remaining portion of the timing signal defines the first four pulses of Sequence Five, the sequence next following Sequence Four.

As shown in FIGURE 36, signals $\phi 4$ and $\phi 5'$ are combined in an "and" gate 695, while an "and" gate 696 is used to combine signals $\phi 4$, $\phi 5$, V*n*, and S1. The outputs of gates 695 and 696 are both passed through "or" gate 697 to an "and" gate 698 where they are combined with the clock signal C, supplied as by a conductor 699, and with the information signals taken, as indicated at 700, from an "or" gate 701. The information signals are combined in a pair of "and" gates 702 and 703, signals G*d* and X3′ being combined in gate 702 and signals G*d*′ and X3 being combined in gate 703. The outputs of gates 702 and 703 comprise the two inputs to the aforementioned "or" gate 701. The signal configuration delivered at the output of "and" gate 698 corresponds to the logic equation above given and is passed through the "or" gate 363 to control the "on" input of flip-flop Z1, operating to turn Z1 on whenever a "1" from G*d* coincides with a "0" from X3, or vice versa.

The comparison thus effected begins when the first bit of the selected word is delivered by the input flip-flop Mc; that is, at the pulse following $\phi 3$ V*e* P*f*, and continues for one full revolution of the drum. When the selected word again comes under the read head, sequence flip-flop $\phi 4$ is turned off, and flip-flop $\phi 5$ is turned on, as will be explained subsequently.

Flip-flop $\phi 5$ normally will be on for only five pulse times, during which the comparison is continued. It is necessary to continue the checking operation these extra five pulse times in order to check the last four bits of the channel. As shown by FIGURE 50, the four bits delivered by Gd following the pulse $\phi 3$ V*e* P*f* are the last four bits of the channel, because of the four pulse delay of the signals in passing through Ac, Y1, Y2, and Y3. Since the operation of copying the altered word into the selected channel during Sequence Three began with the first bit of the selected word delayed four word times, and since four complete words were transcribed onto the selected channel during the first four word times of Sequence Four, the first four bits coming out of Gd at the beginning of Sequence Four are read from the main memory channel before the copying process takes place. It is necessary, therefore, to check the bits in these four pulse times (the four pulses following $\phi 4$ V*e* P*f*—see FIGURE 50) a second time at the end of Sequence Four to check such bits after the copying is performed. It is for this reason that flip-flop $\phi 5$ is turned on for five pulse times following $\phi 4$ V*e* P*f*, four of these pulse times being used for checking purposes, and the fifth being utilized to permit actuation of the error flip-flop Z1 in the event an error should be discovered in the immediately preceding bit.

The circuitry for turning flip-flop $\phi 4$ off and $\phi 5$ on following $\phi 4$ V*e* P*f* is illustrated in FIGURE 27 and defined by the following partial logic:

$$\underline{\phi 4'} = \phi 4\ \phi 5'\ Ve\ Pf\ C$$
$$\underline{\phi 5} = \phi 4\ Ve\ Pf\ C$$

Signal $\phi 5'$ is included in the logic for $\phi 4'$ in order to permit the establishment of a Sequence Four-Five in which both of the flip-flops $\phi 4$ and $\phi 5$ are one, as later explained.

Signals $\phi 4$ and $\phi 5'$ taken from the true and false outputs respectively of the flip-flops $\phi 4$ and $\phi 5$ are combined in an "and" gate 705. The output of gate 705 is passed through an "or" gate 706 and combined in an "and" gate 707 with the signal configuration V*e* P*f* C taken from the output of gate 247, as indicated at 708. The output of gate 707 is applied through an "or" gate 709 to the "off" input terminal of flip-flop $\phi 4$. To turn on flip-flop $\phi 5$, signal $\phi 4$ is passed through an "or" gate 710 to an "and" gate 711 where the signal $\phi 4$ is combined with the signal configuration V*e* P*f* C taken from the gate 247. The output of gate 711 is applied as indicated at 712 to the "on" input terminal of flip-flop $\phi 5$.

The consequences of a failure of comparison and the resulting operation of the error flip-flop Z1 are discussed in detail in an ensuing section of this description. Therefore, it will be assumed that the bits coming out of Gd are identical with the bits coming out of X3 and that Z1 is not operated. At the end of the fifth pulse time following $\phi 4$ V*e* P*f*, sequence flip-flop $\phi 5$ is turned off and sequence flip-flop $\phi 0$ is turned on to place the machine in readiness for another cycle of operation. The circuits so controlling the sequence flip-flops are shown in FIGURE 27 and defined by the following partial logic:

$$\underline{\phi5'}=\phi5\ Vn\ Q1\ S2\ P1\ C$$
$$\underline{\phi0}=\phi5\ Vn\ Q1\ S2\ P1\ C$$

The signal that is used to turn on flip-flop $\underline{\phi0}$ is used also to turn off flip-flop $\underline{\phi5}$. As may be seen from the timing chart, FIGURE 22, the signal V*n* identifies the selected word time, signals S2 and P1 together define the fifth pulse of that selected word time. The signal Q1, which is included to prevent faulty operation at the beginning of a subsequent sequence (designated Sequence Four-Five), as will be explained shortly, is caused to be on for the first five pulse times following the end of Sequence Four and following the end of Sequence Four-Five, but to be off during the first five pulses of Sequence Four-Five.

As is shown in FIGURE 27, signals V*n*, Q1, S2, P1, $\phi5$, and the clock signal C are combined in an "and" gate 715, and the resulting output is passed through an "and" gate 716 to a bus 717. Bus 717 connects through an "or" gate 718 to the "off" terminal of flip-flop $\underline{\phi5}$ and through an "or" gate 719 to the "on" terminal of flip-flop $\underline{\phi0}$.

Signals Z1' and Z2' shown in FIGURE 27 as inputs to the gates 715 and 716 are required to be present in order for the described operation to take place. However, since these signals are present except in certain unusual circumstances described hereinafter, the present description assumes the presence of these required signals. Thus, at the conclusion of the fifth pulse time following the end of Sequence Four, the flip-flop $\underline{\phi5}$ will be turned off, and flip-flop $\underline{\phi0}$ will be turned on to transfer control to Sequence Zero and ready the machine for another cycle of operation.

As above mentioned, flip-flop $\underline{Q1}$ is caused to be on for five pulse times to allow an extra pulse for the operation of the error flip-flop $\underline{Z1}$ before the transfer to Sequence Zero. This is accomplished by a special control of flip-flop $\underline{Q1}$ which is not effective before Sequence Four. This control is effected by the circuits shown in FIGURE 43 and defined by the following partial logic:

$$\underline{Q1}=\phi4\ Ve\ Pf\ C$$
$$\underline{Q1'}=Vn\ S2\ P1\ Q1\ C$$

Flip-flop $\underline{Q1}$ is thus turned on at the same time as $\underline{\phi5}$ (at the pulse following $\phi4$ V*e* P*f*) and is turned off five pulses later coincidentally with the transfer from Sequence Five to Sequence Zero, the S2 P1 term defining the fifth pulse time, and the signal V*n* defining the selected word time.

As is shown in FIGURE 43 siganls $\phi4$ and V*e* are combined in an "and" gate 722 and passed through the "or" gate 520 to the "and" gate 579 where they are combined with the signals P*f* and C supplied by the conductor 571, the output of 579 being applied to the "on" input terminal of $\underline{Q1}$. Signals S2, P1, and C are combined in an "and" gate 723 and passed to an "and" gate 724 where they are combined with signal V*n* from conductor 577, and the signal Q1 taken from the true output terminal of flip-flop $\underline{Q1}$, as shown at 725. The output of gate 724 comprises one of the inputs to the "or" gate 575 which controls the "off" side of flip-flop $\underline{Q1}$.

The circuitry just described provides the alternative mode of operation previously referred to in connection with FIGURE 43 and as illustrated in the fourth line of FIGURE 44, $\underline{Q1}$ being turned on at the first pulse of the selected word time whenever flip-flop $\underline{\phi4}$ is on. Flip-flop $\underline{\phi4}$ will be on during Sequence Four and, as is explained hereinafter, during Sequence Four-Five, and at no other times, so that the five pulses during which $\underline{Q1}$ is on fall in Sequence Five (which follows Sequence Four) and the second revolution of Sequence Four-Five. The circuits controlling the "off" side of $\underline{Q1}$ operate to turn $\underline{Q1}$ off at the fifth pulse of the selected word time whenever it is then on.

This alternative function of the flip-flop $\underline{Q1}$ is provided for the purpose of controlling flip-flops $\underline{\phi5}$ and $\underline{\phi0}$, as above described, so that Sequence Four and Sequence Four-Five may both be extended five pulses beyond their normal one full revolution of the main memory drum, whereby to provide the additional time for error detection purposes as described.

Figure 49:
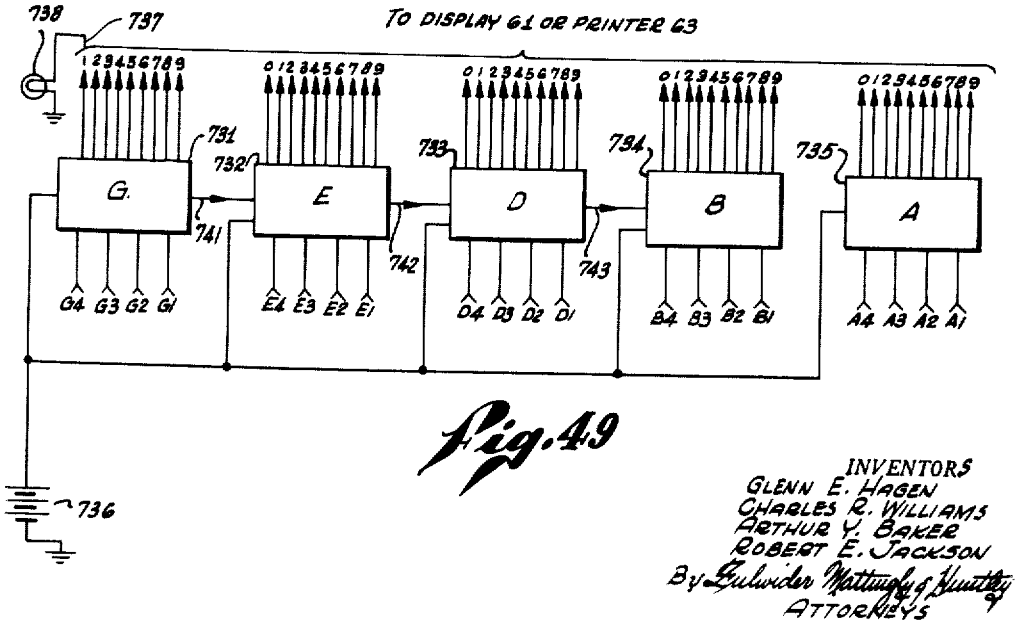
FIGURE 49 is a block diagram of a decoder used to decode coded binary information from the computing section and provide decimal information that may be indicated or printed by the output device.

*Read out result.*—Coincidentally with the proof computation in Sequence Four, the altered word read from the main memory channel is placed in the stepping register in the manner previously explained, thus permitting that information subsequently to be read out by the display device 61 or output printer 63. The contents of the stepping register are transmitted to the display device 61 or printer 63 in the manner indicated functionally in FIGURE 49. As is shown therein, five decoders 731, 732, 733, 734, and 735, are provided, each having four inputs. The inputs of decoder 731 are connected to the true outputs of flip-flops $\underline{G1}$, $\underline{G2}$, $\underline{G3}$, and $\underline{G4}$ of the stepping register; the inputs of the remaining decoders 732, 733, 734, and 735 are similarly connected to the true outputs of register flip-flops $\underline{E1}$–$\underline{E4}$, $\underline{D1}$–$\underline{D4}$, $\underline{B1}$–$\underline{B4}$, and $\underline{A1}$–$\underline{A4}$, respectively. A suitable source of power such as represented by the battery 736 is connected to each of the decoders for appropriate connection thereby to a device to be controlled. Each of the four decoders 732–735 provides ten output terminals represented in FIGURE 49 by the ten conductors marked "0" to "9" inclusive, each representing one of the decimal digits from zero to nine. Decoder 731 is provided with nine such output terminals, the "0" terminal being omitted.

Each of the decoders is operated by four input signals representing (in the excess-three binary code) a given decimal digit, and each serves to connect the source of power 736 to the one of the output terminals representing that given decimal digit. The output terminals may be connected to any suitable type of indicating or printing device. For example, each of the output terminals may be connected as indicated at 737 to a suitable indicating light 738, the other terminal of which is grounded. Alternatively, the wires may be connected to energizing solenoids or magnets of any of a number of well-known printing devices such as, for example, the remotely and electrically actuated decimal printer sold commercially under the trademark "Clary."

As will be explained in more detail hereinafter, decoders 731–734 are interconnected by zero suppression circuits 741–743 which operate to prevent the indication or printing of zeros preceding the most significant digit. For example, if the information supplied to the five decoders represents the five place decimal number "00737," the zero suppression included in the decoder 731 and zero suppression circuit 741 will prevent indication of the first two zeros so that the indicator or printer will merely show the number "737."

Figure 51:
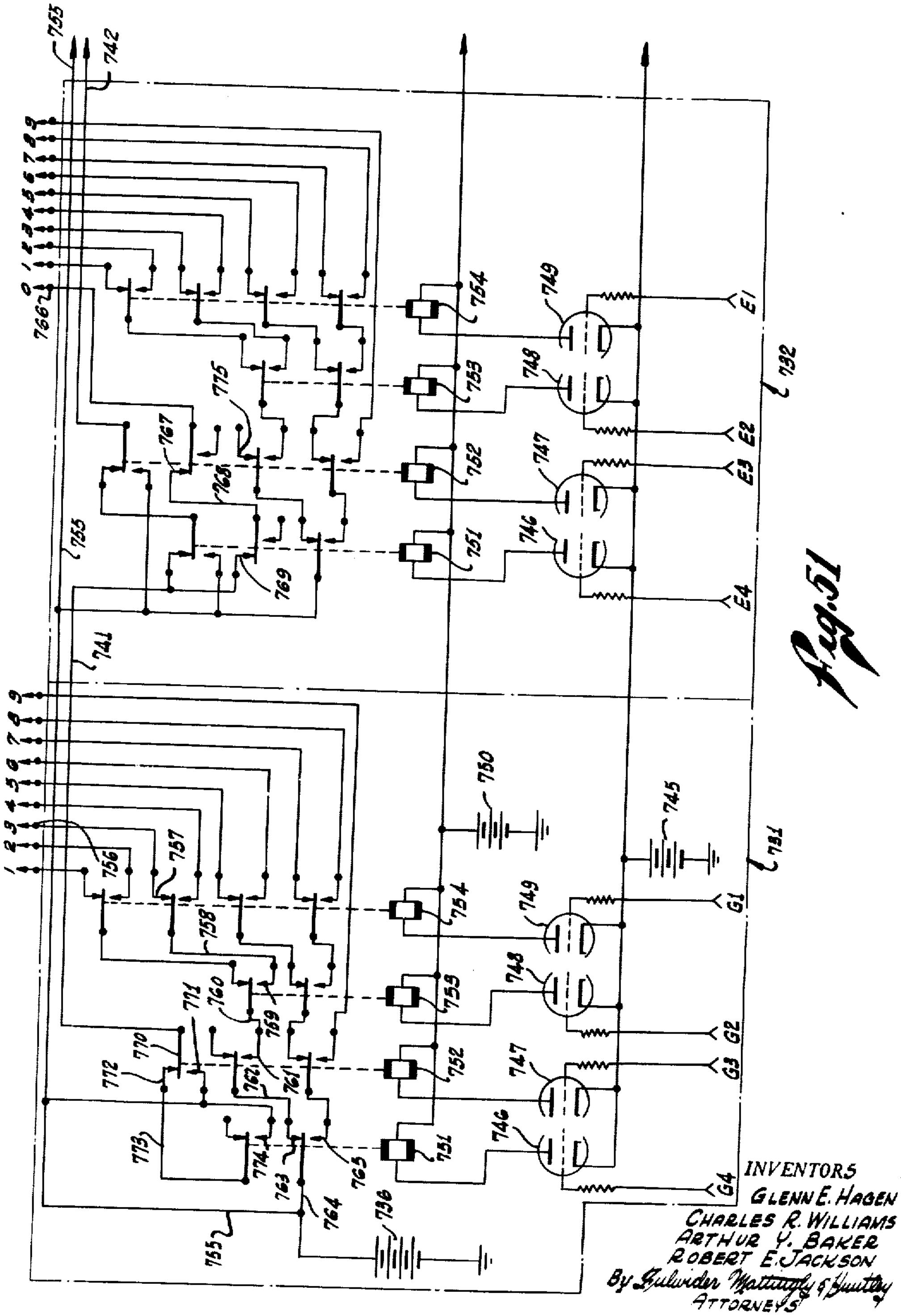
FIGURE 51 is a schematic wiring diagram of two of the decoding elements shown in FIGURE 49.

The construction and operation of the decoders and zero suppression circuits will be best understood from a consideration of FIGURE 51 which illustrates the various electrical components and the circuit arrangement used in the first two decoders 731 and 732. Each decoder utilizes four thermionic tubes 746, 747, 748, and 759, the control grids of which are connected as indicated by the designations on FIGURE 51 to the "true" output terminals of the four flip-flops of the corresponding group in the stepping register. The cathodes of the tubes 746–749 are connected in parallel and to a suitable source of positive bias potential such as is represented by the battery 745. The anodes of the tubes 746–749 are connected to a suitable source of positive operating potential, such as is represented by battery 750, through the operating coils of relays 751, 752, 753, and 754, respectively.

The positive bias applied to cathodes of tubes 746–749 is chosen to bias the tubes substantially at cut-off when there is no signal (0 volts) applied to the control grid, but so as to cause the tube to draw substantially saturated plate current when a signal (+15 volts) is applied to the grid. With this arrangement, the energized or deenergized states of relays 751–754 directly correspond to the true or false states of the four corresponding flip-flops in the stepping register, being energized to correspond to "1's," and deenergized to correspond to "0's," the least significant bit being represented by relay 754, and the most significant bit by relay 751.

A suitable source of power for operating the indicator 61 or printing device 63 is represented diagrammatically in FIGURE 51 as comprising the aforementioned battery 736, and power from this source is supplied to all of the decoders as by means of a bus 755. The contacts of the relays 751–754 are interconnected with each other, and between the bus 755 and the output terminals of the decoder, in such wise as to connect a different one of these output terminals to the supply bus 755 for each of the various conditions of energization or deenergization of the relays 751–754. For example, if the four register flip-flops occupy states representative of the decimal digit "3" ("0110" in the excess-three code), relays 751 and 754 will be deenergized, and relays 752 and 753 will be energized. Under these conditions, the "3" output terminal 756 is connected to the supply bus 755, the circuit extending from the output terminal 756 through normally closed contact 757 of relay 754, conductor 758, normally open (now closed) contact 759 of relay 753, conductor 760, normally open (now closed) contact 761 of relay 752, conductor 762, normally closed contact 763 of relay 751, and conductor 764 to the supply bus 755. The circuits for energizing each of the nine output terminals under the nine conditions of energization or deenergization of the relays 751–754 to represent the corresponding decimal digits may be traced in a similar manner in FIGURE 51.

Decoder 731 does not furnish a "zero" terminal, and, in the event the four register flip-flops hold a decimal zero (binary "0011"), relays 753 and 754 will be energized and relays 751 and 752 will be deenergized so that the nine output terminals will be each disconnected from the supply bus 755, the three possible circuits from the supply bus 755 through the contacts of relays 751 and 752 being interrupted at the relay contacts 765 and 761.

The circuits of decoder 732 (which is typical of decoders 733 and 734, as well), for controlling the energization of the output terminals "1"–"9," are identical with those just mentioned with reference to decoder 731. Decoders 732, 733, and 734 include, however, an additional or "zero" terminal which is normally connected to the associated one of the aforementioned zero suppression circuits. This connection extends from the "zero" terminal 766 through normally closed contact 767 of the relay 752, conductor 768 and normally closed contact 769 of the relay 751, to the zero suppression circuit 741. Thus, a zero may be indicated by the decoder 732 only if the zero suppression circuit 741 is energized.

The zero suppression circuit 741 is arranged to be energized by decoder 731 unless that decoder indicates a decimal "zero," in which event the zero suppression circuit 741 is deenergized. This is accomplished by connecting the circuit 741 in decoder 731 to the movable element 770 of a double throw switch actuated by the relay 752, the normally open contact 771 thereof being connected to the supply bus 755 and the normally closed contact 772 thereof being connected to the bus 755 through a conductor 773 and a normally open contact 774 of the relay 751. Thus, the zero suppression circuit 741 will be disconnected from the supply bus 755 unless one or the other or both of the relays 751 and 752 are energized; that is, unless the decoder 731 indicates some decimal digit other than "zero," the decimal digit "zero" being the only circumstance when both of the relays 751 and 752 are deenergized:

If the decoder 731 is in a "zero" condition, decoder 732 cannot indicate a zero but may indicate any of the other digits. However, if decoder 731 indicates a decimal digit other than "zero," the zero suppression circuit 741 will be energized through relay contacts 767, 769, and conductor 768, to permit a "zero" to be indicated by the other decoders, as previously described. Like contacts of the relays 751 and 752 in decoders 732 and 733 are used to control the energization of the zero suppression circuits 742 and 743 by the preceding zero suppression circuits 741 and 742, respectively. In this way, "zeros" following any other digit in any of the higher orders are indicated by each of the decoders 732, 733, and 734.

Figure 52:
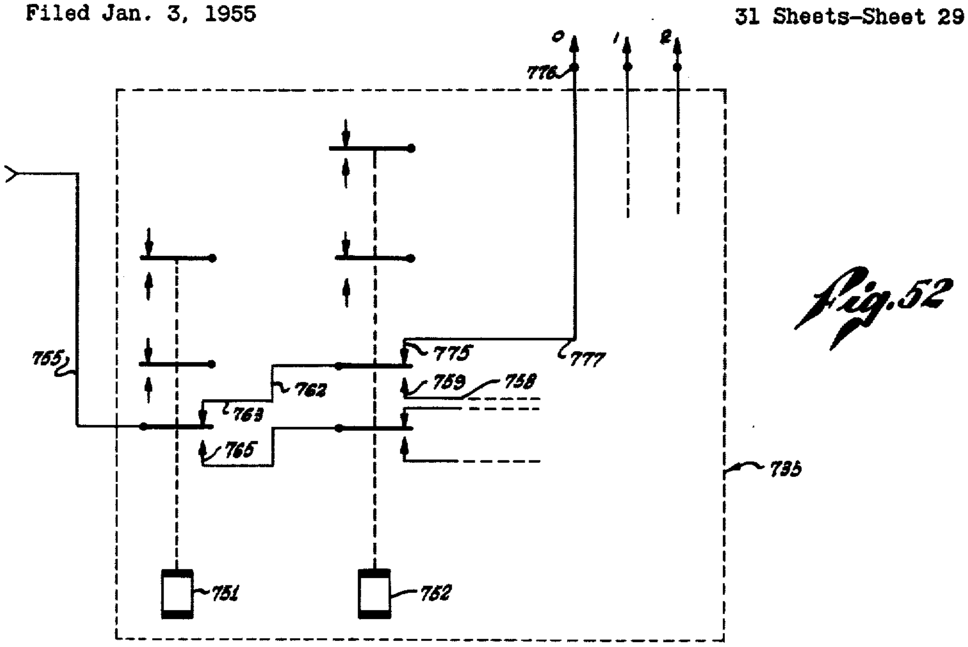
FIGURE 52 is a schematic diagram representing certain of the circuits used in the decoding element of FIGURE 49 relating to the least significant digit.
Figure 53:
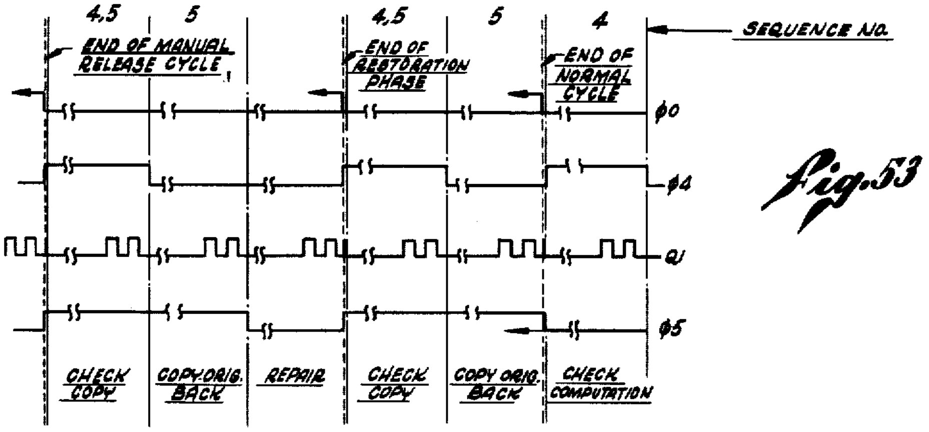
FIGURE 53 is a sequence timing chart generally similar to FIGURE 26, but illustrating an abnormal cycle of operation created by the detection of a non-correctable error.
Figure 54:
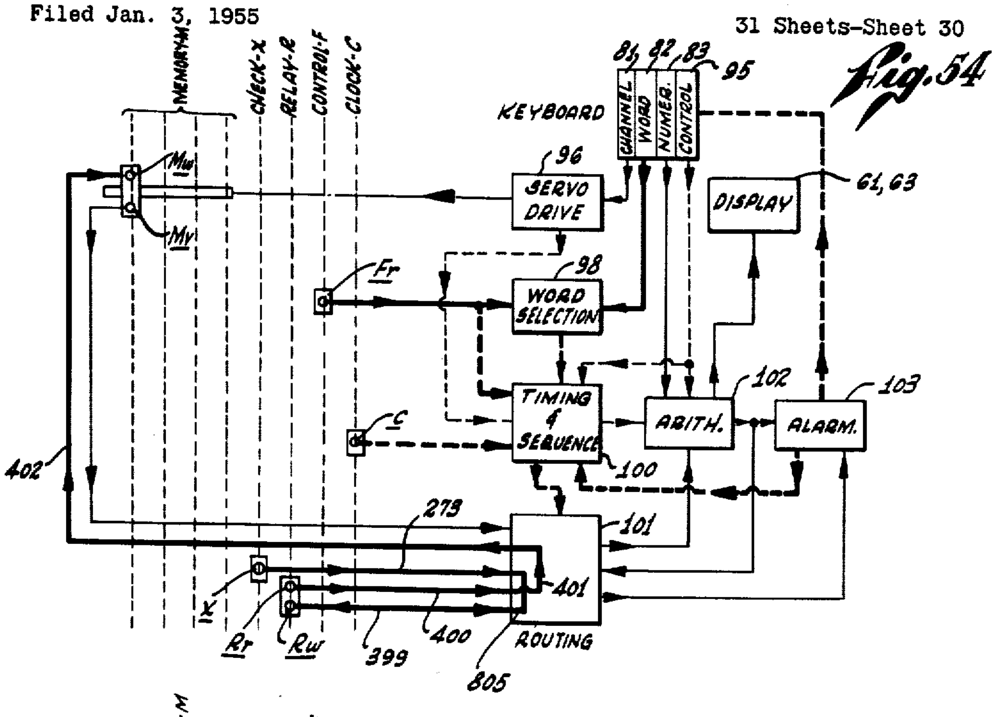
FIGURE 54 is the block diagram of FIGURE 6 reproduced to emphasize the functional relationships obtaining during Sequence Five.
Figure 55:
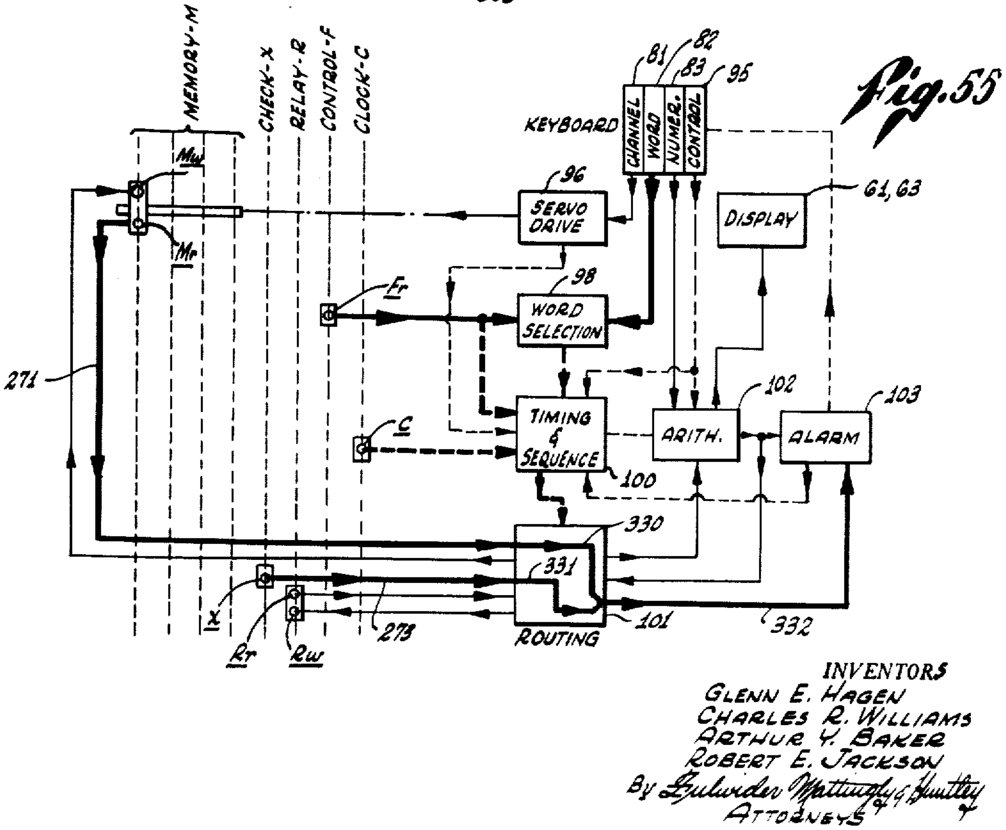
FIGURE 55 is the block diagram of FIGURE 6 reproduced to emphasize the functional correlations operative during Sequence Four-Five.
Figure 56:
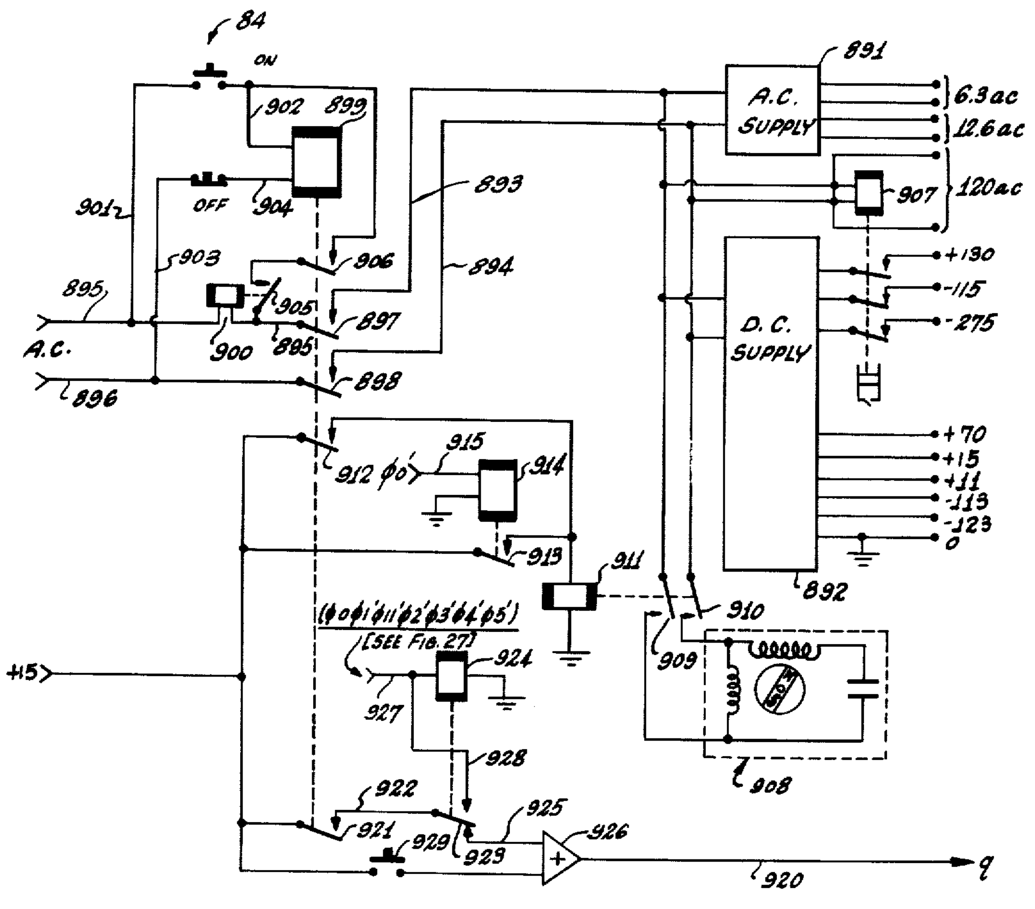
FIGURE 56 is a schematic wiring diagram illustrating the power supply and associated protective devices used to ensure the proper starting and operation of the entire computer.

The decoder 735 for the least significant digit is arranged to permit a zero to be indicated at any time. This is accomplished simply by connecting the "zero" terminal to the normally closed relay contact corresponding to the contact 775 of relay 752 shown in FIGURE 51, instead of the connection to contact 767 shown. This connection is illustrated in FIGURE 52 which is a wiring diagram showing only the connections utilized in decoder 735 for indicating a decimal zero. As therein illustrated, zero terminal 776 is connected as by conductor 777 to the above mentioned normally closed contact 775 of relay 752. When a decimal zero is to be indicated, relays 751 and 752 are both deenergized as shown, and the zero terminal 776 is connected through conductor 777, contact 775 of relay 752, conductor 762, and contacts 763 of relay 751, to the supply bus 755. Thus, there will always be an indication in the least significant digit, and even if the five decimal digits contained in the stepping register are all decimal "zeros," the decoder system described will operate to indicate a "zero" as the least significant digit, and the other digits will be merely blank.

The above described read out apparatus serves to display the altered word as soon as that word is placed in the stepping register during Sequence Four. As explained, this is done concurrently with the proof computation so that the altered word is displayed as soon as the proof computation is completed. The altered word will thereafter be held in the stepping register and displayed by the read out apparatus until the stepping register is cleared at the beginning of Sequence Two of the next cycle of operation.

As previously explained, when the proof computation and checking for detection of errors during Sequence Four is completed, the sequence counter resets to Sequence Zero, thus completing the normal cycle of machine operation and placing the machine in readiness for the initiation of a new cycle.

*Alternative Computations*

In the preceding description of the operation of the machine during Sequences Three and Four, it was assumed that a subtraction was ordered by the keyboard so that a subtraction was effected in Sequence Three and proof addition was performed in Sequence Four. The keyboard is arranged also to call for an addition, in which case during Sequence Three the quantity indicated in the keyboard is added to the quantity recorded in the main memory, and the proof computation during Sequence Four constitutes a subtraction. Under these alternative conditions, the addition which is performed in Sequence Three is identical to the addition described above in connection with Sequence Four, and conversely, the subtraction performed during Sequence Four is identically the same as the subtraction operation described above as occurring during Sequence Three.

Appropriate control of the computation in accordance with an addition order by the keyboard is effected by including in the logic of the carry flip-flops $\underline{Ka}$ and $\underline{Ky}$ additional alternative terms including the signal "t" which is generated by actuation of the "add" key 88, as previously described with reference to FIGURE 28. When these alternative terms are included, the complete logic for $\underline{Ka}$ and $\underline{Ky}$ is obtained, as follows:

$$\underline{Ka}=(\phi3\ s+\phi4\ t)(Me'\ A1\ Ka')C+(\phi3\ t+\phi4\ s)(Me\ A1\ Ka')C$$

$$\underline{Ka'}=(\phi3\ s+\phi4\ t)(Me\ A1'\ Ka)C+(\phi3\ t+\phi4\ s)(Me'\ A1'\ Ka)C+Ve\ Pf\ C$$

$$\underline{Ky}=(\phi3\ s+\phi4\ t)[(Ka\ F1'+N\ F1)Y3'\ F2+(Ka'\ F1'+N'\ F1)\ Y3\ F2]C+(\phi3\ t+\phi4\ s)[(KaF1'+N\ F1)Y3\ F2+(Ka'\ F1'+N'\ F1)\ Y3'\ F2]C$$

$$\underline{Ky'}=(\phi3\ s+\phi4\ t)(N\ Y3\ F2'+N'\ Y3'\ F2')C+(\phi3\ t+\phi4\ s)(N\ Y3'\ F2'+N'\ Y3\ F2')C+Ve\ Pf\ C$$

The "($\phi3\ s+\phi4\ t$)" terms of each of the above equations define the operation appropriate to subtraction, the function required in Sequence Three by a subtraction order ($\phi3\ s$) and required in Sequence Four by an addition order ($\phi4\ t$). The "($\phi3\ t+\phi4\ s$)" terms define the operations appropriate to addition, the function required in Sequence Three by an addition order ($\phi3\ t$) and required in Sequence Four by a subtraction order ($\phi4\ s$).

The circuits for providing the alternative control signals ($\phi3\ s+\phi4\ t$) and ($\phi3\ t+\phi4\ s$) are shown in FIGURE 35. An "and" gate 780 is used to combine signals $\phi4$ and "t," and the output ($\phi4\ t$) is passed through the "or" gate 426 along with the signal ($\phi3\ s$) produced by the gate 425, thus providing at the output of gate 426 the signal configuration ($\phi3\ s+\phi4\ t$). This control signal is applied to gates 427 and 434 to control $\underline{Ka}$, and is also applied to gates 519 and 538 (FIGURE 42) to control $\underline{Ky}$, all in the manner previously described with reference to the operation during Sequence Three.

Also, as is shown in FIGURE 35, signals $\phi3$ and "t" are combined in an "and" gate 781, the output ($\phi3\ t$) of which is passed through the "or" gate 661 along with the signals ($\phi4\ s$) produced by the gate 660, thus providing at the output of gate 661 the signal configuration ($\phi3\ t+\phi4\ s$). This control signal is applied to gates 662 and 664 to control $\underline{Ka}$, and is also applied to gates 675 and 682 (FIGURE 42) to control $\underline{Ky}$, all in the manner previously described with reference to the operation during Sequence Four.

COMPLETE LOGIC

In the foregoing, the logic equations have been presented in many instances as "partial logic," setting forth in each such instance only those terms which define the effective control under the conditions or circumstances then considered. In order that any person skilled in this art may be enabled to make and use this invention, the complete logic equations are set forth:

$$\underline{Ac}=(\phi11+\phi2+\phi3\ Vn'+\phi4\ Vn')\ Me\ C+(\phi3+\phi4)Vn(Me\ A1'\ Ka'+Me'\ A1\ Ka'+Me'\ A1'\ Ka+Me\ A1\ Ka)C$$

$$\underline{Ac'}=(\phi11+\phi2+\phi3\ Vn'+\phi4\ Vn')\ Me'\ C+(\phi3+\phi4)\ Vn(Me\ A1\ Ka'+Me\ A1'\ Ka+Me'\ A1\ Ka+Me'\ A1'\ Ka')C$$

$$\underline{A1}=(u\ \phi0+\phi3+\phi4)Vn\ A2\ C+\phi2\ Vn\ Pf\ a1\ C$$
$$\underline{A1'}=(u\ \phi0+\phi3+\phi4)Vn\ A2'\ C+\phi2\ Vn\ F5'\ C$$

$$\underline{A2}=(u\ \phi0+\phi3+\phi4)Vn\ A3\ C+\phi2\ Vn\ Pf\ a2\ C$$
$$\underline{A2'}=(u\ \phi0+\phi3+\phi4)Vn\ A3'\ C+\phi2\ Vn\ F5'\ C$$

$$\underline{A3}=(u\ \phi0+\phi3+\phi4)Vn\ A4\ C+\phi2\ Vn\ Pf\ a3\ C$$
$$\underline{A3'}=(u\ \phi0+\phi3+\phi4)Vn\ A4'\ C+\phi2\ Vn\ F5'C$$

$$\underline{A4}=(u\ \phi0+\phi3+\phi4)Vn\ B1\ C+\phi2\ Vn\ Pf\ a4\ C$$
$$\underline{A4'}=(u\ \phi0+\phi3+\phi4)Vn\ B1'\ C+\phi2\ Vn\ F5'\ C$$

$$\underline{B1}=(u\ \phi0+\phi3+\phi4)Vn\ B2\ C+\phi2\ Vn\ Pf\ b1\ C$$
$$\underline{B1'}=(u\ \phi0+\phi3+\phi4)Vn\ B2'\ C+\phi2\ Vn\ F5'\ C$$

$$\underline{B2}=(u\ \phi0+\phi3+\phi4)Vn\ B3\ C+\phi2\ Vn\ Pf\ b2\ C$$
$$\underline{B2'}=(u\ \phi0+\phi3+\phi4)Vn\ B3'\ C+\phi2\ Vn\ F5'\ C$$

$$\underline{B3}=(u\ \phi0+\phi3+\phi4)Vn\ B4\ C+\phi2\ Vn\ Pf\ b3\ C$$
$$\underline{B3'}=(u\ \phi0+\phi3+\phi4)Vn\ B4'\ C+\phi2\ Vn\ F5'\ C$$

$$\underline{B4}=(u\ \phi0+\phi3+\phi4)Vn\ D1\ C+\phi2\ Vn\ Pf\ b4\ C$$
$$\underline{B4'}=(u\ \phi0+\phi3+\phi4)Vn\ D1'\ C+\phi2\ Vn\ F5'\ C$$

$$\underline{D1}=(u\ \phi0+\phi3+\phi4)Vn\ D2\ C+\phi2\ Vn\ Pf\ d1\ C$$
$$\underline{D1'}=(u\ \phi0+\phi3+\phi4)Vn\ D2'\ C+\phi2\ Vn\ F5'\ C$$

$$\underline{D2}=(u\ \phi0+\phi3+\phi4)Vn\ D3\ C+\phi2\ Vn\ Pf\ d2\ C$$
$$\underline{D2'}=(u\ \phi0+\phi3+\phi4)Vn\ D3'\ C+\phi2\ Vn\ F5'\ C$$

$$\underline{D3}=(u\ \phi0+\phi3+\phi4)Vn\ D4\ C+\phi2\ Vn\ Pf\ d3\ C$$
$$\underline{D3'}=(u\ \phi0+\phi3+\phi4)Vn\ D4'\ C+\phi2\ Vn\ F5'\ C$$

$$\underline{D4}=(u\ \phi0+\phi3+\phi4)Vn\ E1\ C+\phi2\ Vn\ Pf\ d4\ C$$
$$\underline{D4'}=(u\ \phi0+\phi3+\phi4)Vn\ E1'\ C+\phi2\ Vn\ F5'\ C$$

$$\underline{E1}=(u\ \phi0+\phi3+\phi4)Vn\ E2\ C+\phi2\ Vn\ Pf\ e1\ C$$
$$\underline{E1'}=(u\ \phi0+\phi3+\phi4)Vn\ E2'\ C+\phi2\ Vn\ F5'\ C$$

$$\underline{E2}=(u\ \phi0+\phi3+\phi4)Vn\ E3\ C+\phi2\ Vn\ Pf\ e2\ C$$
$$\underline{E2'}=(u\ \phi0+\phi3+\phi4)Vn\ E3'\ C+\phi2\ Vn\ F5'\ C$$

$$\underline{E3}=(u\ \phi0+\phi3+\phi4)Vn\ E4\ C+\phi2\ Vn\ Pf\ e3\ C$$
$$\underline{E3'}=(u\ \phi0+\phi3+\phi4)Vn\ E4'\ C+\phi2\ Vn\ F5'\ C$$

$$\underline{E4}=(u\ \phi0+\phi3+\phi4)Vn\ G1\ C+\phi2\ Vn\ Pf\ e4\ C$$
$$\underline{E4'}=(u\ \phi0+\phi3+\phi4)Vn\ G1'\ C+\phi2\ Vn\ F5'\ C$$

$$\underline{F}=Fb\ F'\ C$$
$$\underline{F'}=Fb'\ F\ C$$

$$(\underline{Far})=Fr$$
$$(\underline{Far'})=Fr'$$

$$\underline{Fb}=Far$$
$$\underline{Fb'}=Far'$$

$$\underline{F1}=(F4+F'\ F4')F1'\ C$$
$$\underline{F1'}=(F4+F'\ F4')F1\ C+Pf\ C$$

$$\underline{F2}=F1\ F2'\ C+Pf\ C$$
$$\underline{F2'}=(F4+F'\ F4')F1\ F2\ C$$

$$\underline{F3}=F1\ F2'\ F3'\ F4\ C$$
$$\underline{F3'}=F1\ F2'\ F3\ C+Pf\ C$$

$$\underline{F4}=Pf\ C$$
$$\underline{F4'}=F1\ F2'\ F4\ F5\ C$$

$$\underline{F5}=F1\ F2'\ F3\ F5'\ C$$
$$\underline{F5'}=Pf\ C$$

$$(\underline{Gd})=Vn\ S1\ Y3+(Vn\ S2+Vn\ F5+Q2'\ Q1\ S1)(Y3'\ F2'\ Ky+Y3'\ F2\ Ky'+Y3\ F2'\ Ky'+Y3\ F2\ Ky)+Q1\ Q2'(S2+F5)Y3+Vn'(Q1'+Q2)Y3$$

$$\underline{G1}=(u\ \phi0+\phi3+\phi4)Vn\ G2\ C+\phi2\ Vn\ Pf\ g1\ C$$
$$\underline{G1'}=(u\ \phi0+\phi3+\phi4)Vn\ G2'\ C+\phi2\ Vn\ F5'\ C$$

$$\underline{G2}=(u\ \phi0+\phi3+\phi4)Vn\ G3\ C+\phi2\ Vn\ Pf\ g2\ C$$
$$\underline{G2'}=(u\ \phi0+\phi3+\phi4)Vn\ G3'\ C+\phi2\ Vn\ F5'\ C$$

$$\underline{G3}=(u\ \phi0+\phi3+\phi4)Vn\ G4\ C+\phi2\ Vn\ Pf\ g3\ C$$
$$\underline{G3'}=(u\ \phi0+\phi3+\phi4)Vn\ G4'\ C+\phi2\ Vn\ F5'\ C$$

$$\underline{G4}=(u\ \phi0+\phi4)Vn\ Me\ C+\phi3\ Vn\ A1\ C+\phi2\ Vn\ Pf\ g4\ C$$
$$\underline{G4'}=(u\ \phi0+\phi4)Vn\ Me'\ C+\phi3\ Vn\ A1'\ C+\phi2\ Vn\ F5'\ C$$

$$\underline{Ka}=(\phi3\ s+\phi4\ t)(Me'\ A1\ Ka')C+(\phi3\ t+\phi4\ s)(Me\ A1\ Ka')C$$

$$\underline{Ka'}=(\phi3\ s+\phi4\ t)(Me\ A1'\ Ka)C+(\phi3\ t+\phi4\ s)(Me'\ A1\ Ka)C+Ve\ Pf\ C$$

$$\underline{Ky}=(\phi3\ s+\phi4\ t)[(Ka\ F1'+N\ F1)Y3'\ F2+(Ka'\ F1'+N'\ F1)Y3\ F2]C+(\phi3\ t+\phi4\ s)[(Ka\ F1'+N\ F1)Y3\ F2+(Ka'\ F1'+N'\ F1)Y3'\ F2]C$$

$$\underline{Ky'}=(\phi3\ s+\phi4\ t)(N\ Y3\ F2'+N'\ Y3'\ F2')C+(\phi3\ t+\phi4\ s)(N\ Y3'\ F2'+N'\ Y3\ F2)C+Ve\ Pf\ C$$

$$(\underline{Mar})=Mr$$
$$(\underline{Mar'})=Mr'$$

$$(\underline{Maw})=R1'$$
$$(\underline{Maw'})=R0'$$

$\underline{Mb}=Mar$
$\underline{Mb'}=Mar'$ $\underline{Me}=Mb\ Me'\ C$
$\underline{Me'}=Mb'\ Me\ C$ $(\underline{Mw})=Maw$
$(\underline{Mw'})=Maw'$ $\underline{M0}=\phi 1\ Mb\ M0'\ C+\phi 1'\ M0'\ C$
$\underline{M0'}=\phi 1\ Mb'\ M0\ C$ $\underline{M1}=\phi 1\ Mb'\ M1'\ C+\phi 1'\ M1'\ C$
$\underline{M1'}=\phi 1\ Mb\ M1\ C$ $\underline{N}=P1\ Ka\ C$
$\underline{N'}=P1\ Ka'\ C+Ve\ Pf\ C$ $(\underline{Pf})=F\ F4'$ $(\underline{P1})=F2\ F1'$
$(\underline{P2})=F2\ F1$
$(\underline{P3})=F2'\ F1'$
$(\underline{P4})=F2'\ F1$ $\underline{Q1}=Vn\ Pf\ C+Q1'\ Q2\ Pf\ C+\phi 4\ Ve\ Pf\ C$
$\underline{Q1'}=Q1\ Pf\ C+Q1\ Vn\ S2\ P1\ C$ $\underline{Q2}=Q1\ Q2'\ Pf\ C$
$\underline{Q2'}=Vn\ Pf\ C+Q1\ Q2\ Pf\ C$ $\underline{Ra}=\phi 5\ X3\ C+\phi 5'\ Gd\ C$
$\underline{Ra'}=\phi 5\ X3'\ C+\phi 5'\ Gd'\ C$ $(\underline{Rar})=Rr$
$(\underline{Rar'})=Rr'$ $(\underline{Raw})=Ra$
$(\underline{Raw'})=Ra'$ $\underline{Rb}=Rar$
$\underline{Rb'}=Rar'$ $\underline{Re}=Rb\ Re'\ C$
$\underline{Re'}=Rb'\ Re\ C$ $(\underline{Rw})=Raw$
$(\underline{Rw'})=Raw'$ $\underline{R0}=\phi 0\ R0'\ C+\phi 3\ W'\ Z0'\ Re\ C+\phi 4(W\ Re+W'\ R0')C$
$\quad +\phi 5\ Re\ C+Z0\ C$
$\underline{R0'}=\phi 3\ W'\ Z0'\ Re'\ C+\phi 4\ W\ Re'\ C+\phi 5\ Re'\ C$ $\underline{R1}=\phi 0\ R1'\ C+\phi 3\ W'\ Z0'\ Re'\ C+\phi 4(W\ Re'+W'\ R1')C$
$\quad +\phi 5\ Re'\ C+Z0\ C$
$\underline{R1'}=\phi 3\ W'\ Z0'\ Re\ C+\phi 4\ W\ Re\ C+\phi 5\ Re\ C$ $(\underline{S1})=F5'\ F3'$
$(\underline{S2})=F5'\ F3$
$(\underline{S3})=F5\ F4$ $\underline{Ve}=Pf\ C$
$\underline{Ve'}=S1\ P1(F\ h1'+F'\ h1)C$
$\quad +S1\ P2(F\ h2'+F'\ h2)C$
$\quad +S1\ P3(F\ h3'+F'\ h3)C$
$\quad +S1\ P4(F\ h4'+F'\ h4)C$
$\quad +S2\ P1(F\ j1'+F'\ j1)C$
$\quad +S2P2(F\ j2'+F'j2)C$
$\quad +S2\ P3(F\ j3'+F'j3)C$
$\quad +S2\ P4(F\ j4'+F'\ j4)C$
$\quad +S3\ P1(F\ k1'+F'\ k1)C$
$\quad +S3P2(F\ k2'+F'\ k2)C$
$\quad +S3\ P3(F\ k3'+F'\ k3)C$
$\quad +S3\ P4(F\ k4'+F'\ k4)C$ $\underline{Vn}=Ve\ Pf\ C$
$\underline{Vn'}=Vn\ Pf\ C$ $\underline{W}=Ve\ Pf\ C$
$\underline{W'}=Q1\ Q2\ Pf\ C$ $\left.\begin{array}{l}(\underline{X})=Xaw\\ (\underline{X'})=Xaw'\end{array}\right\}$ (Writing)

$\left.\begin{array}{l}(\underline{Xar})=X\\ (\underline{Xar'})=X'\end{array}\right\}$ (Reading)

$(\underline{Xaw})=M1'$
$(\underline{Xaw'})=M0'$ $\underline{Xb}=Xar$
$\underline{Xb'}=Xar'$ $\underline{Xe}=Xb\ Xe'\ C$
$\underline{Xe'}=Xb'\ Xe\ C$ $\underline{X1}=Xe\ C$
$\underline{X1'}=Xe'\ C$ $\underline{X2}=X1\ C$
$\underline{X2'}=X1'\ C$ $\underline{X3}=X2\ C$
$\underline{X3'}=X2'\ C$ $\underline{Y1}=Ac\ C$
$\underline{Y1'}=Ac'\ C$ $\underline{Y2}=Y1\ C$
$\underline{Y2'}=Y1'\ C$ $\underline{Y3}=Y2\ C$
$\underline{Y3'}=Y2'\ C$ $\underline{Z0}=\phi 3\ Q1\ Q2'\ S1\ P1\ Ka\ C$
$\underline{Z0'}=\phi 3\ Z0\ Pz\ C+\phi 0\ Ve\ Pf\ C$ $\underline{Z1}=(\phi 11\ Ve\ Pf+\phi 2)(Ac\ Xe'+Ac'\ Xe)C$
$\quad +(\phi 4\ \phi 5'+\phi 4'\ \phi 5\ Vn\ S1)(Gd\ X3'+Gd'\ X3)C$
$\underline{Z1'}=(\phi 0+\phi 4\ \phi 5)Ve\ Pf\ C+\phi 2\ Z1\ Pz\ C$ $\underline{Z2}=\phi 4\ \phi 5\ (Ac\ Xe'+Ac'\ Xe)C$
$\underline{Z2'}=\phi 0\ Ve\ Pf\ C+Ve\ Pf\ Sz\ C$ $\underline{\phi 0}=\phi 5\ Vn\ Q1\ S2\ P1\ Z1'\ Z2'\ C$
$\quad +(\phi 2\ Z1+\phi 3\ Z0)Pz\ C+q\ C$
$\underline{\phi 0'}=(\phi 0\ \phi 1'\ \phi 11'\ \phi 2'\ \phi 3'\ \phi 4'\ \phi 5')(Ve\ Pf)(s+t)Sr'\ C$ $\underline{\phi 1}=(\phi 0\ \phi 1'\ \phi 11'\ \phi 2'\ \phi 3'\ \phi 4'\ \phi 5')(Ve\ Pf)(s+t)Sr'\ C$
$\underline{\phi 1'}=\phi 1\ Ve\ Pf\ C+q\ C$ $\underline{\phi 11}=\phi 1\ Ve\ Pf\ C$
$\underline{\phi 11'}=\phi 11\ Ve\ Pf\ C+q\ C$ $\underline{\phi 2}=\phi 11\ Ve\ Pf\ C$
$\underline{\phi 2'}=\phi 2\ Ve\ Pf\ Z1'\ C+\phi 2\ Z1\ Pz\ C+q\ C$ $\underline{\phi 3}=\phi 2\ Ve\ Pf\ Z1'\ C$
$\underline{\phi 3'}=\phi 3\ Ve\ Pf\ Z0'\ C+\phi 3\ Z0\ Pz\ C+q\ C$ $\underline{\phi 4}=(\phi 3\ Z0'+\phi 5)(Ve\ Pf)C$ $\underline{\phi 4'}=\phi 4\ \phi 5'\ Ve\ Pf\ C+\phi 4\ \phi 5\ Vn\ Q1\ S2\ P1\ Z2'\ C$
$\quad +Ve\ Pf\ Sz\ C+q\ C$ $\underline{\phi 5}=\phi 4\ Ve\ Pf\ C+Ve\ Pf\ Sz\ C$
$\underline{\phi 5'}=\phi 5\ Vn\ Q1\ S2\ P1\ Z1'\ Z2'\ C+q\ C$ From the foregoing it will be seen that this invention provides a computing system fully capable of achieving the objects and securing the advantages heretofore set forth. By using the relatively large diameter magnetic drum, together with the various fixed and movable heads, a memory having a high capacity and affording rapid random access has been provided. A large amount of information can be carried on one channel of the drum, and this channel can be scanned in one-quarter of a second. By providing a plurality of such channels which may be selected as the need arises, the quantity of information is multiplied, and the time of access to any desired unit of data is reduced only slightly.

Such a memory system conveniently forms a central data repository that can be utilized simultaneously by a number of operators, controlling the system from a number of different points. Thus, each operator may have an associated computer, and the various magnetic heads associated with each computer may simultaneously read in and read out information from the permanent memory without, except in rare instances, any interference or blocking by any of the other computers. In those rare instances where two computers might otherwise simultaneously perform operations in the same channel, an interlock prevents the operation of the second computer until the first has finished its computation. As a result, the large capacity of the memory system can be used to best advantage.

In addition, the computer, as previously pointed out, makes a copy of the individual data read from the main memory before any computation is performed, checks this copy, and after the computation is completed, proves or verifies the computation before discarding the verified copy so that the original information contained in the memory system cannot be lost. In the event of any malfunctioning of the machine, this verified copy if available for replacement on the main memory, and consequently, the possibility of losing information by reason of a fault of the machine is reduced to a minimum. The use of a single memory system with a plurality of computers means that the maximum capability of the memory system may be fully utilized, and the overall expense of a system of this type and size is greatly reduced. The information within the machine may readily be read at any time, and the results of all computations are read out immediately and automatically.

As applied to an inventory machine, the computer herein described is simple to operate; it requires only the entry of the catalogue number into the keyboard, the entry into the keyboard of the number that is to be added to or subtracted from the quantity in stock, and the actuation of the appropriate add or subtract control. When the add or the subtract button has been pressed, further operation of the machine is rapid and automatic, and the result quickly appears on the printing or display register. The machine thus described is also equipped to complete its computation and prevent the loss of data in the event of a failure of the primary power supply.

These and other objects and features of the invention as heretofore set forth are believed to have been fully and completely disclosed, although it will be recognized that many changes may be made by those skilled in the art without departing from the invention. Consequently, this invention is not to be limited to the particular form, arrangement of parts, or sequence of operation herein described and shown except as defined by the following claims.

We claim:

1. A computer which includes: an information storage element having a plurality of memory channels and an operating channel; a plurality of information handling means; a plurality of corresponding transfer heads cooperating with said storage element and operatively associated with a corresponding one of said information handling means, each of said heads acting to transfer information between the associated information handling means and said storage element; a plurality of driving means each associated with one of said information handling means and connected to the corresponding one of said transfer heads for moving said head into alignment with any selected one of said memory channels; interlock means connected to said plurality of information handling means, responsive to alignment of a plurality of transfer heads with any one of said memory channels to prevent operation of more than one of the associated information handling means; and a plurality of corresponding operating heads each aligned with said operating channel and each connected to a corresponding one of said information handling means, whereby all of said information handling means may be simultaneously operated.

2. A computer which includes: an information storage element having a plurality of memory channels and an operating channel; a plurality of information handling means; a plurality of corresponding transfer heads cooperating with said storage element and each operatively associated with a corresponding one of said information handling means, each of said heads acting to transfer information between the associated information handling means and said storage element; a plurality of driving means each associated with one of said information handling means and connected to the corresponding one of said transfer heads for moving said head into alignment with any selected one of said memory channels; interlock means connected to said plurality of information handling means responsive to alignment of a plurality of transfer heads with any one of said memory channels to prevent operation of more than one of the associated information handling means; and a plurality of sequence control means each connected to a corresponding one of said driving means and the said associated information handling means for preventing the transfer of information between said information handling means and said storage element until alignment is established between said selected memory channel and the said head associated with said information handling means.

3. A computer which includes: a rotatable drum having a magnetizable surface adapted to receive, store, and reproduce information in the form of magnetic signals, said surface having a plurality of memory channels and an operating channel; a plurality of information handling means; a plurality of corresponding magnetic transfer heads cooperating with said drum and each operatively associated with a corresponding one of said information handling means, each of said heads acting to transfer information between the associated information handling means and said surface; a plurality of driving means each associated with one of said information handling means and connected to the corresponding one of said transfer heads for moving said head across said surface and into alignment with any selected one of said memory channels; interlock means connected to said plurality of information handling means, responsive to alignment of a plurality of transfer heads with any one of said memory channels to prevent operation of more than one of the associated information handling means; a plurality of sequence control means each connected to one of said driving means and the said associated information handling means for preventing the transfer of information between said information handling means and said surface until alignment is established between said selected memory channel and the said head associated with said information handling means; and a plurality of corresponding magnetic operating heads each aligned with said operating channel and each connected to a corresponding one of said information handling means, whereby all of said information handling means may be simultaneously operated.

4. In combination: a rotatable magnetic storage unit having a plurality of axially spaced annular magnetic record areas each capable of having recorded therein a large, selected number of bits; drive means for imparting continuous rotation to said storage unit, a plurality of coincidentally operable magnetic elements each including recording means for storing information in said storage unit and pick-up means for retrieving information from said storage unit; rigid support means mounting each of said magnetic elements for movement in a rectilinear path parallel to the axis of rotation of said storage unit while said storage is rotating for alignment axially of said unit with a selected annular record area; means for positioning each of said elements in information storing and retrieving relationship to a selected one of said record areas including a reversibly rotatable drive shaft, means connecting said element to said shaft to move said element in opposite directions along said path in response to rotation of said shaft in opposite directions, a capstan fixed for rotation with said reversibly rotatable drive shaft, a cable fixed to said element at its opposite ends and in drive engagement with said capstan, and cable guide means for controlling the position of the runs of said cable between said capstan and its ends, reversible drive means for said shaft, and means including a null-seeking feed-back-control system for selectively actuating said reversible drive means independently of said storage unit rotating means; and access control means for preventing coincident operation of a plurality of said elements positioned in information storing and retrieving relationship to the same one of said record areas.

5. The combination defined in claim 4 wherein said magnetic element comprises a pair of relatively fixed electrically distinct magnetic circuits.

6. The combination defined in claim 5 wherein one of said magnetic circuits is an electromagnetic transducer.

7. The combination defined in claim 4 wherein said magnetic element mounting means comprises a rectilinear track disposed in parallel relation to the rotation axis of said storage unit and a carriage mounted for movement along said track and supporting said magnetic element.

8. The combination defined in claim 7 including means movably mounting said magnetic element on said carriage.

9. The combination defined in claim 8 wherein said last named means includes means for injecting air under pressure between said magnetic element and a selected annular magnetic record area of said storage unit.

10. In combination with a rotatable magnetic storage unit having a plurality of axially spaced annular magnetic record areas each capable of having recorded therein a large, selectively variable number of bits; means for imparting continuous rotation to said storage unit; a plurality of coincidentally operable transducer heads each including recording means for storing information in said storage unit and pick-up means for retrieving information from said storage unit; rigid support means mounting each of said transducer heads for movement in a rectilinear path parallel to the axis of rotation of said storage unit while said storage unit is rotating; means for positioning each of said heads in information storing and retrieving relationship to a selected one of said record areas including a reversibly rotatable drive shaft structurally distinct from said mounting means, means connecting said drive shaft to said head to move said head in opposite directions along said path in response to rotation of said shaft in opposite directions, reversible drive means for said shaft, and means for selectively actuating said reversible drive means independently of said storage unit rotating means; and access control means for preventing coincident operation of a plurality of said heads positioned in information storing and retrieving relationship to the same one of said record areas.

11. In combination with a continuously rotatable magnetic storage unit having a plurality of axially spaced annular magnetic record areas each capable of having recorded therein a large, selectively variable number of bits; a plurality of coincidentally operable transducer heads each including recording means for storing information in said storage unit and pick-up means for retrieving information from said storage unit; rigid support means mounting each of said transducer heads for movement in a rectilinear path parallel to the axis of rotation of said storage unit while said storage unit is rotating; means including a position responsive control system for moving each of said heads in opposite directions along said rectilinear path to operatively associate said transducer head in information storing and retrieving relationship with one of said record areas; access control means for preventing coincident operation of a plurality of said heads positioned in information storing and retrieving relationship to the same one of said record areas; and means including a source of air at superatmospheric pressure for injecting air under pressure between each of said heads and a selected annular record area and thereby maintaining a film of air between said head and said record area while said head is operatively associated therewith.

12. In combination, a rotatable magnetic storage unit having a plurality of axially spaced annular magnetic record areas each capable of having recorded therein a large, selectively variable number of bits; drive means imparting continuous rotation to said storage unit; a plurality of coincidentally operable magnetic elements each including recording means for storing information in said storage unit and pick-up means for retrieving information from said storage unit; rigid support means mounting each of said magnetic elements for movement in a rectilinear path parallel to the axis of rotation of said storage unit while said storage unit is rotating to axially align said magnetic element with a selected annular record area; means for positioning said elements in information storing and retrieving relationship to a selected one of said record areas including a reversibly rotatable drive shaft structurally distinct from said mounting means, means connecting said element to said shaft to move said element in opposite directions along said path in response to rotation of said shaft in opposite directions, reversible drive means for said shaft and means including a null-seeking, feed-back-control system for selectively actuating said reversible drive means independently of said storage unit rotating means; and access control means for preventing coincident operation of a plurality of said elements positioned in information storing and retrieving relationship to the same one of said record areas.

13. A computer which includes: a continuously rotatable data storage unit having a magnetizable surface adapted to receive, store and reproduce information in the form of magnetic signals in any of a plurality of coaxial channels across which a magnetic head may move, each of said channels being capable of having recorded therein a large selectively variable number of bits; a plurality of coincidentally operable movable magnetic heads each including recording means for storing information in said storage unit and pick-up means for retrieving information from said storage unit; rigid support means mounting each of said magnetic heads for movement across said surface and said channels as said unit is rotated; means for positioning each of said magnetic heads in information storing and retrieving relationship to a selected one of said record areas including a reversibly rotatable drive shaft structurally distinct from said mounting means, means connecting said head to said shaft to move said head in opposite directions across said surface and said channels in response to rotation of said shaft in opposite directions, reversible drive means for said shaft, and means including a null-seeking, feed-back-control system for selectively actuating said reversible drive means independently of said storage unit rotating means; and access control means for preventing coincident operation of a plurality of said heads positioned in information storing and retrieving relationship to the same one of said record areas.

14. In combination, a continuously rotatable unit having a magnetizable surface providing a plurality of coaxial channels across which a magnetic head may move, each of said channels being capable of having recorded therein a large, selectively variable number of bits; a plurality of coincidentally operable movable magnetic heads each including recording means for storing information in said storage unit and pick-up means for retrieving information from said storage unit; means mounting each of said magnetic heads each for movement across said surface and said channels as said unit is rotated; means for positioning each of said heads in information storing and retrieving relationship to a selected one of said channels including a reversibly rotatable drive shaft structurally distinct from said mounting means, means connecting said head to said shaft to move said head in opposite directions across said surface and said channels in response to rotation of said shaft in opposite directions, reversible drive means for said shaft, and means including position responsive control means for selectively actuating said reversible drive means independently of said storage unit rotating means; and access control means for preventing coincident operation of a plurality of said heads positioned in information storing and retrieving relationship to the same one of said record areas.

References Cited in the file of this patent

UNITED STATES PATENTS

| | | |
|---|---|---|
| 1,585,729 | Matte | May 25, 1926 |
| 1,990,548 | Keller | Feb. 12, 1935 |
| 2,106,968 | Dannheiser | Feb. 1, 1938 |
| 2,175,142 | Andres | Oct. 3, 1939 |
| 2,370,616 | Bryce | Mar. 6, 1945 |
| 2,416,445 | Jensen | Feb. 25, 1947 |
| 2,432,324 | May | Dec. 9, 1947 |
| 2,462,435 | Stanton | Feb. 22, 1949 |
| 2,484,049 | Putt | Oct. 11, 1949 |
| 2,503,127 | Mumma | Apr. 4, 1950 |
| 2,597,866 | Gridley | May 27, 1952 |
| 2,609,143 | Stibitz | Sept. 2, 1952 |
| 2,634,052 | Bloch | Apr. 7, 1953 |
| 2,645,943 | Mendelson | July 21, 1953 |
| 2,648,589 | Hickman | Aug. 11, 1953 |
| 2,652,196 | Sterling | Sept. 15, 1953 |
| 2,690,913 | Rabinow | Oct. 5, 1954 |
| 2,733,425 | Williams et al. | Jan. 31, 1956 |
| 2,734,186 | Williams | Feb. 7, 1956 |
| 2,735,091 | Burkhart | Feb. 14, 1956 |
| 2,737,342 | Nelson | Mar. 6, 1956 |
| 2,765,895 | Higgonett et al. | Oct. 9, 1956 |
| 2,772,135 | Hollabaugh | Nov. 27, 1956 |
| 2,789,759 | Tootill et al. | Apr. 23, 1957 |
| 2,832,841 | Eldridge | Apr. 29, 1958 |
| 2,855,585 | Quinby | Oct. 7, 1958 |
| 2,860,867 | Allen | Nov. 18, 1958 |
| 2,879,000 | MacDonald | Mar. 24, 1959 |
| 2,905,768 | Cronquist | Sept. 22, 1959 |
| 2,919,429 | Hamilton | Dec. 29, 1959 |
| 2,919,854 | Singman | Jan. 5, 1960 |
| 2,931,571 | Trimble | Apr. 5, 1960 |
| 2,935,734 | Donan | May 3, 1960 |
| 2,954,164 | Schreiner | Sept. 27, 1960 |
| 2,954,546 | Burns | Sept. 27, 1960 |
| 2,972,127 | Lukoff et al. | Feb. 14, 1961 |

FOREIGN PATENTS

| | | |
|---|---|---|
| 703,593 | Great Britain | Feb. 3, 1954 |
| 532,316 | Belgium | Oct. 30, 1954 |

OTHER REFERENCES

Electrical Engineering, August 1952, pp. 745–749 (by Rabinow).

Mullaney: Design Features of the E.R.A. 1101, Review of Elect. Dig. Computers, February 1952, page 45.

Proceedings of Conference on Automatic Computing Machines, Univ. of Sydney, August 1951, published by Comm. Scientific and Industrial Research Organization and Univ. of Sydney, Melbourne, April 1952, pages 164 to 167, and Figs. 1, and 5, on two pp.

Harvard Comp. Lab. Description of a Magnetic Drum Calculator, vol. XXV, Harvard Univ. Press, Cambridge, Mass., copyright Aug. 22, 1952, pages 9, 10.

Frizzell: Eng. Description of the I.B.M. Type 701 Computer, Proc. of the I.R.E., October 1953, pp. 1277, 1285.

UNITED STATES PATENT OFFICE

CERTIFICATE OF CORRECTION

Patent No. 3,089,124 May 7, 1963

Glenn E. Hagen et al.

It is hereby certified that error appears in the above numbered patent requiring correction and that the said Letters Patent should read as corrected below.

Column 8, line 24, for "(127)" read -- (127) --; column 20, line 12, strike out "in the logic for F and F', respectively, require F to be"; column 22, line 17, for "including" read -- included --; column 24, line 3, for "F4+F' F4')" read -- (F4+F' F4') --; line 9, for "twentienth" read -- twentieth --; line 11, for "time" read -- time. --; same column 24, line 68, for "F5" read -- F5 --; column 26, line 59, for "$\phi$0, $\phi$1, $\phi$11, $\phi$2, $\phi$3, $\phi$4, and $\phi$5" read -- $\phi$0, $\phi$1, $\phi$11, $\phi$2, $\phi$3, $\phi$4, and $\phi$5 --; column 27, line 34, after "244" insert a comma; line 75, after "device" insert -- 270 --; column 31, line 35, for "$\phi$2" read -- $\phi$2 --; line 36, for "$\phi$11" read -- $\phi$11 --; column 35, line 28, for "1" read -- 1 --; column 36, line 52, for "Rw" read -- Rw --; column 38, line 42, for "Al" read -- Al --; column 45, line 6, for "541-556" read -- 541-546 --; column 46, line 23, for "the" read -- of --; column 48, line 9, for "Al" read -- Al --; column 55, line 26, for "results" read -- result --; column 56, line 37, for "rigister" read -- register --; column 57, line 58, for "$\phi$4, $\phi$5'" read -- $\phi$4 $\phi$5' --; line 65, for "$\phi$4" read -- $\phi$4' --; column 60, line 6, for "function" read -- functioning --; column 63, line 45, for "Ky" read -- Ky --; column 64, line 71, for "F2)" read -- F2') --; column 68, line 65, after "storage" insert -- unit --.

Signed and sealed this 12th day of May 1964.

(SEAL)
Attest:

ERNEST W. SWIDER
Attesting Officer

EDWARD J. BRENNER
Commissioner of Patents